(12) United States Patent
Kondo et al.

(10) Patent No.: US 7,154,541 B2
(45) Date of Patent: Dec. 26, 2006

(54) IMAGE PROCESSING DEVICE

(75) Inventors: Tetsujiro Kondo, Tokyo (JP); Naoki Fujiwara, Tokyo (JP); Junichi Ishibashi, Saitama (JP); Takashi Sawao, Tokyo (JP); Takahiro Nagano, Kanagawa (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 689 days.

(21) Appl. No.: 10/240,640

(22) PCT Filed: Feb. 5, 2002

(86) PCT No.: PCT/JP02/00918

§ 371 (c)(1),
(2), (4) Date: Apr. 14, 2003

(87) PCT Pub. No.: WO02/063565

PCT Pub. Date: Aug. 15, 2002

(65) Prior Publication Data

US 2003/0156203 A1    Aug. 21, 2003

(30) Foreign Application Priority Data

Feb. 5, 2001   (JP)   ............................... 2001-28222

(51) Int. Cl.
*H04N 5/228*   (2006.01)

(52) U.S. Cl. ................ 348/222.1; 348/169; 348/208.1; 348/586; 382/107; 382/173; 382/255; 382/254

(58) Field of Classification Search ........ 348/169–172, 348/208.1, 486, 597, 700–702, 222.1, 586; 382/266, 254–255, 107, 173
See application file for complete search history.

(56) References Cited

U.S. PATENT DOCUMENTS

| | | | | |
|---|---|---|---|---|
| 5,402,186 A | * | 3/1995 | Kawai | .................... 348/448 |
| 6,631,210 B1 | * | 10/2003 | Mutoh et al. | ................ 382/176 |
| 6,977,664 B1 | * | 12/2005 | Jinzenji et al. | ............. 345/629 |

FOREIGN PATENT DOCUMENTS

| | | |
|---|---|---|
| EP | 0 771 107 | 5/1997 |
| EP | 0 933 727 | 8/1999 |
| JP | 5-153493 | 6/1993 |
| JP | 7-336688 | 12/1995 |
| JP | 10-164436 | 6/1998 |
| JP | 2001-250119 | 9/2001 |

* cited by examiner

*Primary Examiner*—David Ometz
*Assistant Examiner*—Usman Khan
(74) *Attorney, Agent, or Firm*—Frommer Lawrence & Haug LLP; William S. Frommer; Thomas F. Presson

(57) ABSTRACT

In accordance with the present invention, a mixture ratio indicating the state of mixture of a plurality of objects such as a background image and the image of an object is detected. A pixel value setter 502 extracts background pixel data while also extracting the date of a target pixel and a pixel in the vicinity of the target pixel. The pixel value setter 502 generates a plurality of relational equations indicating data of the target pixel and the pixel in the vicinity of the target pixel and the background pixel data. An arithmetic unit 503 calculates a mixture ratio indicating a mixed state of the plurality of objects in the real world with respect to the target pixel based on the relational equations. The present invention is applicable to an image processing apparatus that accounts for a difference between a signal detected by a sensor and the real world.

30 Claims, 81 Drawing Sheets

FIG. 5
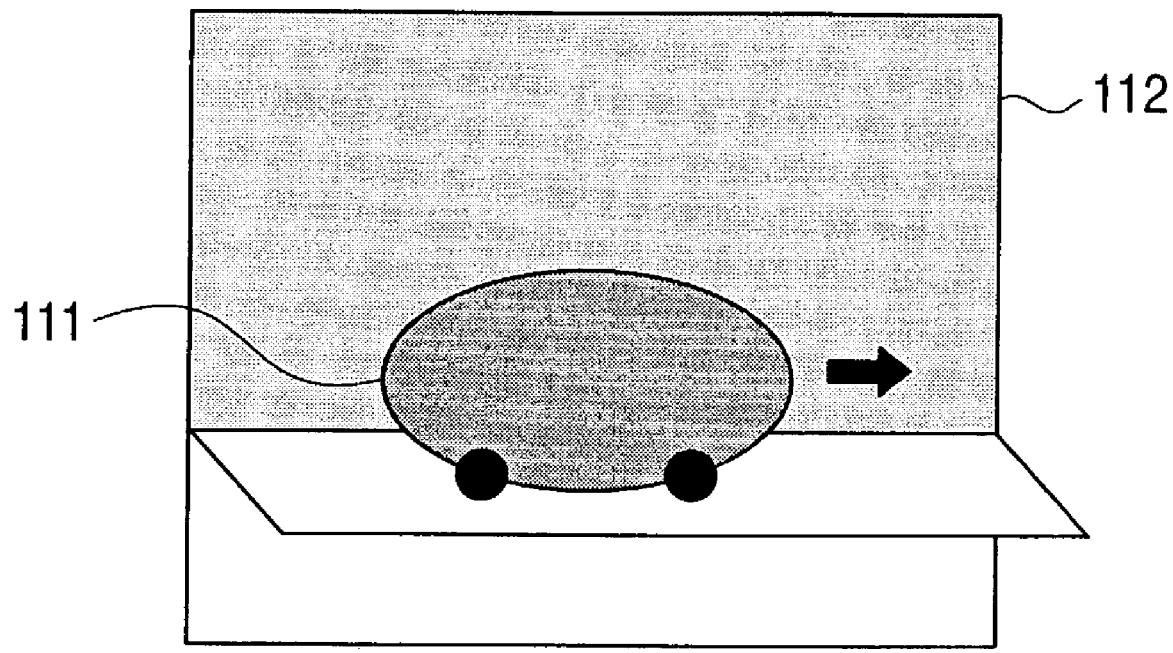
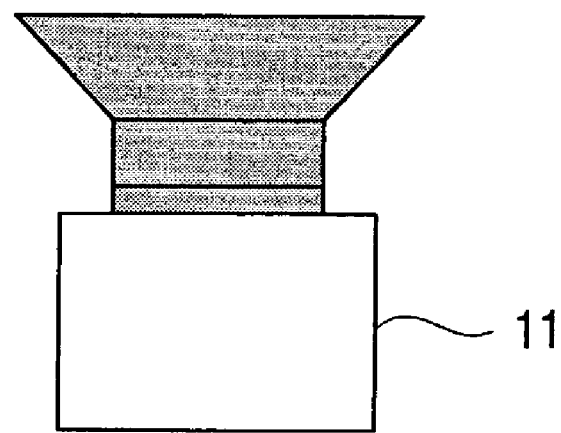

| AREA | | DESCRIPTION |
|---|---|---|
| BACKGROUND AREA | | STILL PORTION |
| FOREGROUND AREA | | MOVING PORTION |
| MIXED AREA | COVERED BACKGROUND AREA | AREA TRANSITIONED FROM BACKGROUND TO FOREGROUND |
| | UNCOVERED BACKGROUND AREA | AREA TRANSITIONED FROM FOREGROUND TO BACKGROUND |

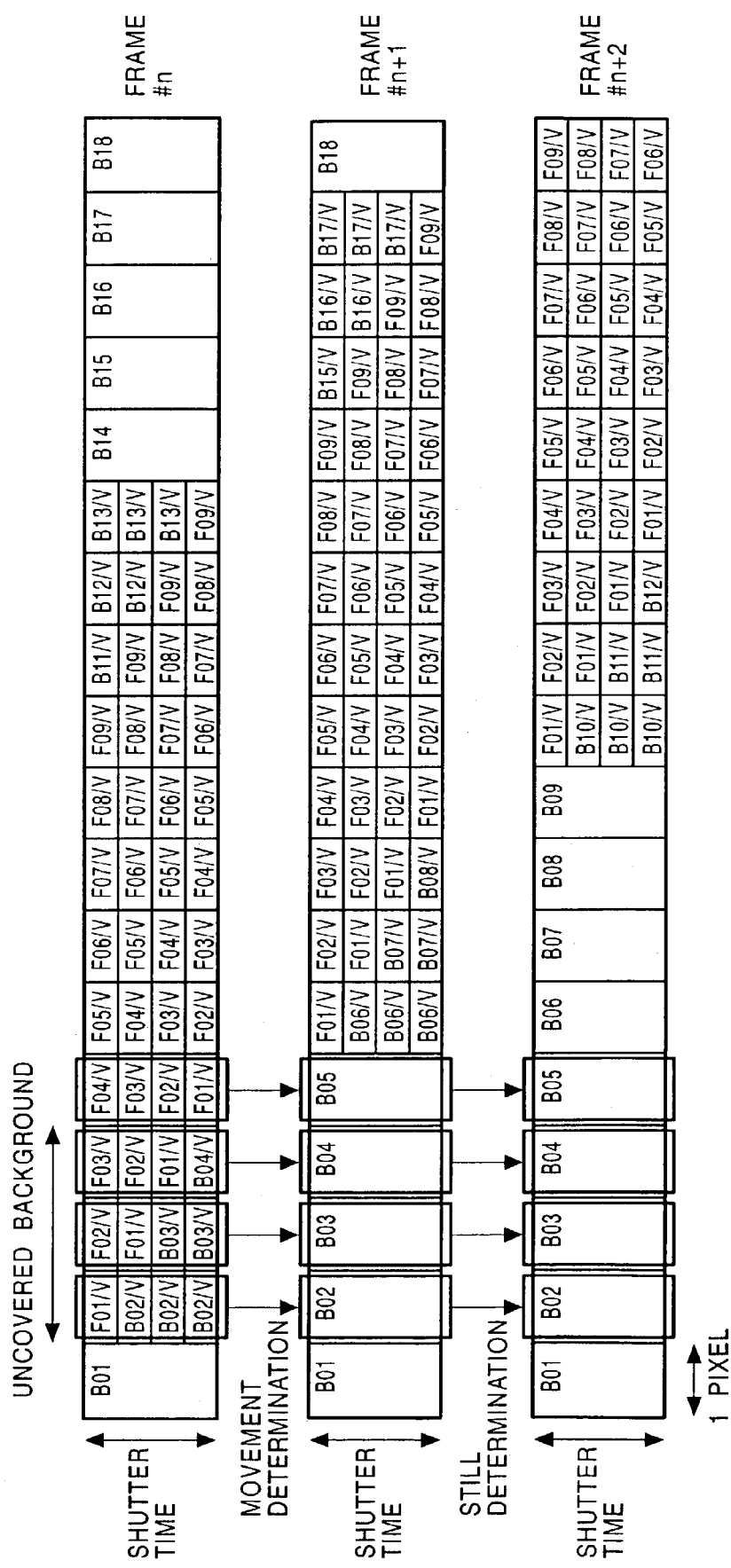

FIG. 27

| AREA DETERMINATION | STILL/MOVEMENT DETERMINATION BETWEEN FRAME #n-2 AND FRAME #n-1 | STILL/MOVEMENT DETERMINATION BETWEEN FRAME #n-1 AND FRAME #n | STILL/MOVEMENT DETERMINATION BETWEEN FRAME #n AND FRAME #n+1 | STILL/MOVEMENT DETERMINATION BETWEEN FRAME #n+1 AND FRAME #n+2 |
|---|---|---|---|---|
| COVERED BACKGROUND AREA DETERMINATION | STILL | MOVING | — | — |
| STILL PORTION DETERMINATION | — | STILL | STILL | — |
| MOVING PORTION DETERMINATION | — | MOVING | MOVING | — |
| UNCOVERED BACKGROUND AREA DETERMINATION | — | — | MOVING | STILL |

FIG. 35A

| $X_0$ | $X_1$ | $X_2$ |
|---|---|---|
| $X_3$ | $X_4$ | $X_5$ |
| $X_6$ | $X_7$ | $X_8$ |

FIG. 35B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 36A

| $X_0$ | $X_1$ | $X_2$ |
|---|---|---|
| $X_3$ | $X_4$ | $X_5$ |
| $X_6$ | $X_7$ | $X_8$ |

FIG. 36B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 39

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | — |
| FRAME #n+1 | — | 1 | — | 0 |

FIG. 61A
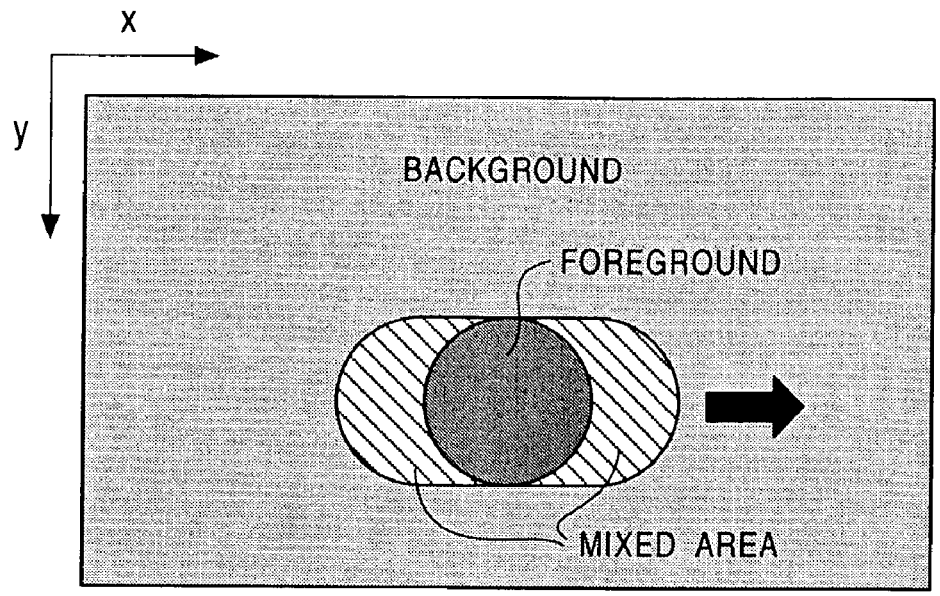
FOREGROUND AND BACKGROUND SEPARATION
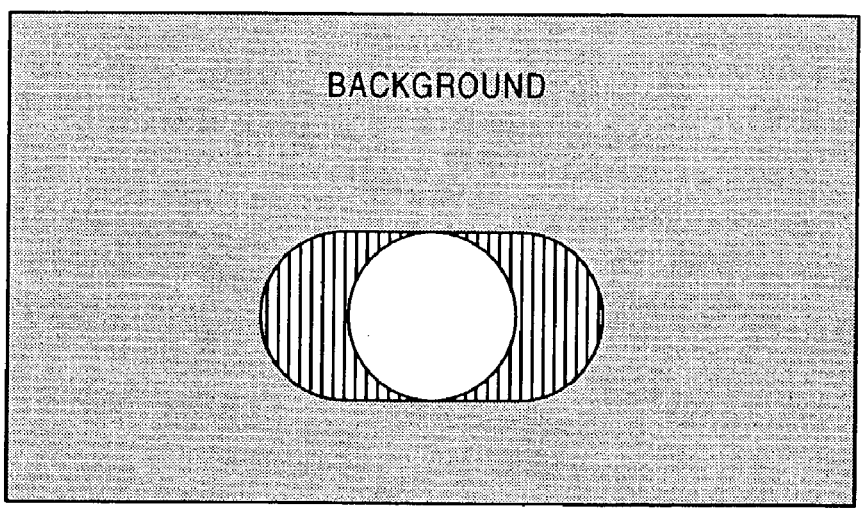
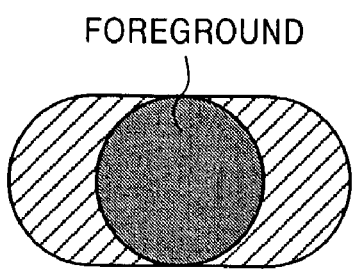

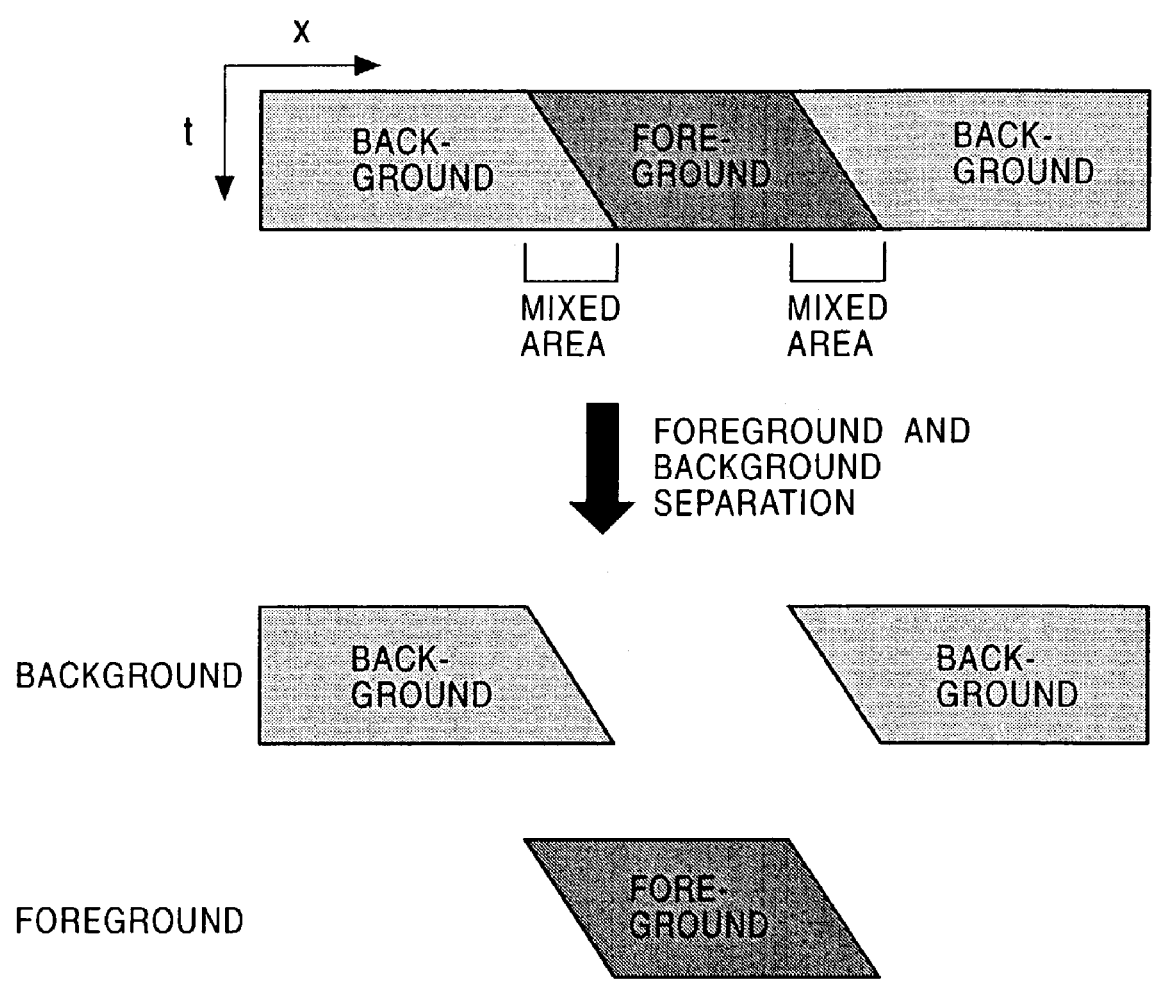

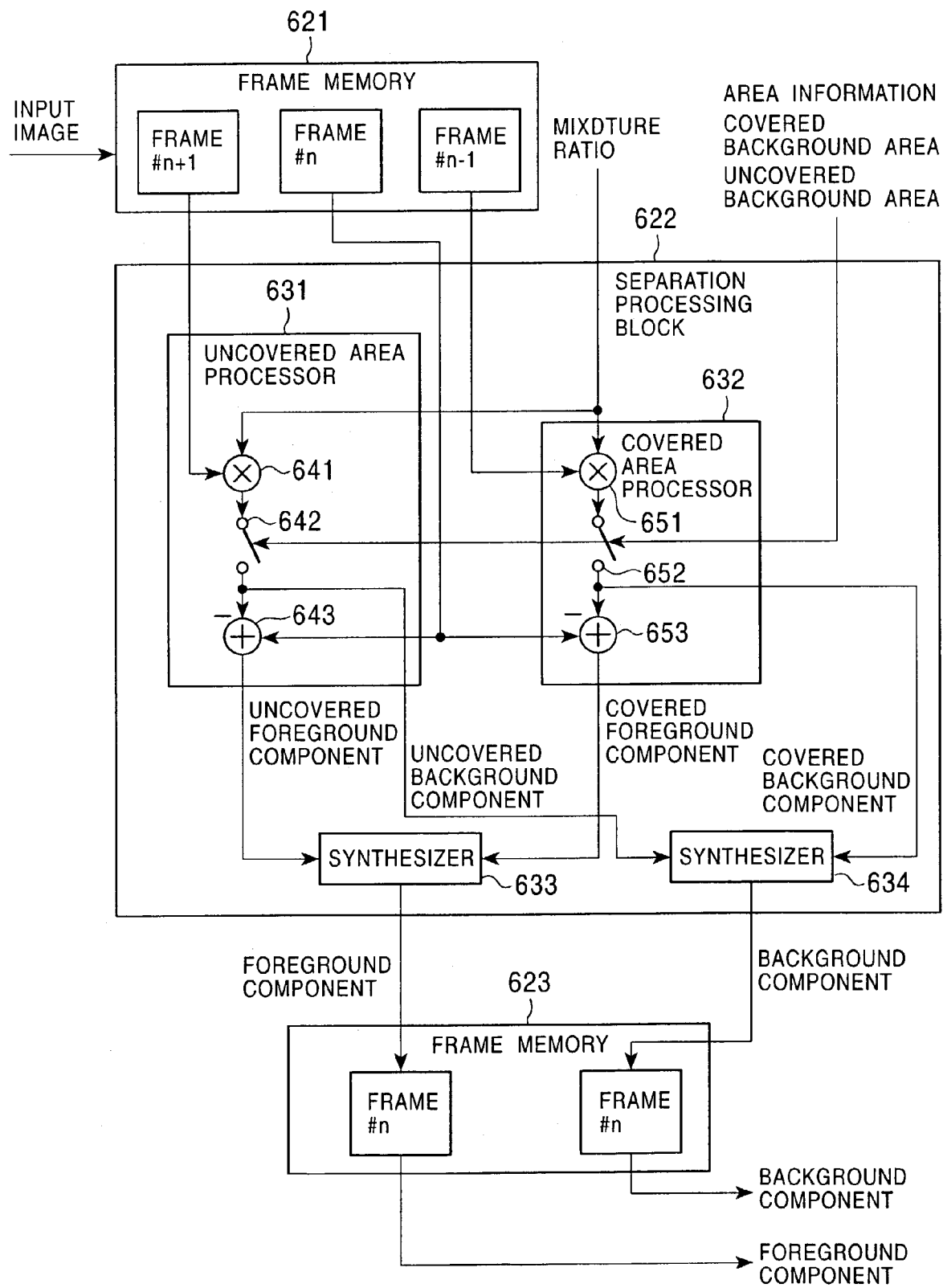

IMAGE PROCESSING DEVICE

TECHNICAL FIELD

The present invention relates to an image processing apparatus and, in particular, to an image processing apparatus that accounts for a difference between a signal detected by a sensor and the real world.

BACKGROUND ART

Techniques for detecting an event in the real world and for processing sampled data output from an image sensor are in widespread use.

For example, the image of an object moving in front of a stationary predetermined background, taken by a video camera, suffers from a motion blur when the motion speed of the object is relatively fast.

When an object is moving in front of a stationary background, motion blur occurs due to not only the mixture of the image of the moving object itself but also due to the mixture of the background image and the image of the moving object. The detection of the mixed state of the background image and the image of the moving object has been conventionally unthinkable.

DISCLOSURE OF THE INVENTION

In view of this situation, the present invention has been developed, and it is an object of the present invention to detect a mixture ratio representing the degree of mixture of a plurality of objects such as the image of background and the image of a moving object.

An image processing apparatus for processing image data of the present invention includes background pixel extractor means for extracting pixel data of a frame prior to or subsequent to a target frame, corresponding to a target pixel of the target frame in the image data, as background pixel data of an object, which serves as a background, from among a plurality of objects of the image data, target frame pixel extractor means for extracting pixel data of the target pixel in the target frame and pixel data of a pixel in the vicinity of the target pixel in the target frame, relational equation generator means for generating a plurality of equations representing, in connection with the target pixel, the relationship between the data of the target pixel and the pixel in the vicinity of the target pixel and the background pixel data corresponding to the data of the target pixel and the pixel in the vicinity of the target pixel, and mixture ratio detector means for detecting a mixture ratio indicating a mixed state of the plurality of objects in the real world in connection with the target pixel based on the relational equations.

The relational equation generator means may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

The relational equation generator means may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

The mixture ratio detector means may detect the mixture ratio by solving the plurality of relational equations through the least squares method.

The background pixel extractor means may extract, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extractor means may extract, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

The image processing apparatus may include area information generator means for generating area information identifying, in the image data, a foreground area, a background area, and a mixed area containing a covered background area and an uncovered background area, wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

An image processing method of the present invention includes a background pixel extracting step for extracting pixel data of a frame prior to or subsequent to a target frame, corresponding to a target pixel of a target frame in the image data, as background pixel data of an object, which serves as a background, from among a plurality of objects of the image data, a target frame pixel extracting step for extracting pixel data of the target pixel in the target frame and pixel data of a pixel in the vicinity of the target pixel in the target frame, a relational equation generating step for generating a plurality of equations representing, in connection with the target pixel, the relationship between the data of the target pixel and the pixel in the vicinity of the target pixel and the background pixel data corresponding to the data of the target pixel and the pixel in the vicinity of the target pixel, and a mixture ratio detecting step for detecting a mixture ratio indicating a mixed state of the plurality of objects in the real world in connection with the target pixel based on the relational equations.

The relational equation generating step may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

The relational equation generating step may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

The mixture ratio detecting step may detect the mixture ratio by solving the plurality of relational equations through the least squares method.

The background pixel extracting step may extract, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extracting step may extract, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

The image processing method may include an area information generating step for generating area information identifying, in the image data, a foreground area, a background area, and a mixed area containing a covered background area and an uncovered background area, wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

A computer readable medium of the present invention stores a computer readable software program. The software program includes a background pixel extracting step for extracting pixel data of a frame prior to or subsequent to a target frame, corresponding to a target pixel of the target frame in the image data, as background pixel data of an object, which serves as a background, from among a plurality of objects of the image data, a target frame pixel extracting step for extracting pixel data of the target pixel in the target frame and pixel data of a pixel in the vicinity of the target pixel in the target frame, a relational equation generating step for generating a plurality of equations representing, in connection with the target pixel, the relationship between the data of the target pixel and the pixel in the vicinity of the target pixel and the background pixel data corresponding to the data of the target pixel and the pixel in the vicinity of the target pixel, and a mixture ratio detecting step for detecting a mixture ratio indicating a mixed state of the plurality of objects in the real world in connection with the target pixel based on the relational equations.

The relational equation generating step may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

The relational equation generating step may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

The mixture ratio detecting step may detect the mixture ratio by solving the plurality of relational equations through the least squares method.

The background pixel extracting step may extract, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extracting may step extract, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

The software program stored in the recording medium may further include an area information generating step for generating area information identifying, in the image data, a foreground area, a background area, and a mixed area containing a covered background area and an uncovered background area, wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

An image pickup device of the present invention includes image pickup means for outputting, as image data containing a plurality of pieces of pixel data, an image of an object picked up by an image pickup element having a predetermined number of pixels, each pixel having a time integration effect, background pixel extractor means for extracting pixel data of a frame prior to or subsequent to a target frame, corresponding to a target pixel of the target frame in the image data, as background pixel data of an object, which serves as a background, from among a plurality of objects of the image data, target frame pixel extractor means for extracting pixel data of the target pixel in the target frame and pixel data of a pixel in the vicinity of the target pixel in the target frame, relational equation generator means for generating a plurality of equations representing, in connection with the target pixel, the relationship between the data of the target pixel and the pixel in the vicinity of the target pixel and the background pixel data corresponding to the data of the target pixel and the pixel in the vicinity of the target pixel, and mixture ratio detector means for detecting a mixture ratio indicating a mixed state of the plurality of objects in the real world in connection with the target pixel based on the relational equations.

The relational equation generator means may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

The relational equation generator means may generate the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

The mixture ratio detector means may detect the mixture ratio by solving the plurality of relational equations through the least squares method.

The background pixel extractor means may extract, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extractor means extracts, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

The image pickup device may further include area information generator means for generating area information identifying, in the image data, a foreground area, a background area, and a mixed area containing a covered background area and an uncovered background area, wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

BRIEF DESCRIPTION OF THE DRAWINGS

FIG. 5 illustrates the imaging operation by a sensor.

FIG. 26 is a model diagram illustrating the pixel values developed in the time axis for the duration of time, which is divided and corresponds to the shutter time.

FIG. 27 illustrates conditions under which area determination is performed.

FIG. 35A illustrates how a correlation value is calculated.

FIG. 35B illustrates how the correlation value is calculated.

FIG. 36A illustrates how the correlation value is calculated.

FIG. 36B illustrates how the correlation value is calculated.

FIG. 39 illustrates the determination process of an area determiner 342.

FIG. 61A is a diagram illustrating an input image, a foreground component image, and a background component image.

FIG. 61B is a diagram illustrating a model of an input image, a foreground image, and a background image.

FIG. 65 is a block diagram illustrating one example of the construction of a separator 601.

BEST MODE FOR CARRYING OUT THE INVENTION

Figure 1:
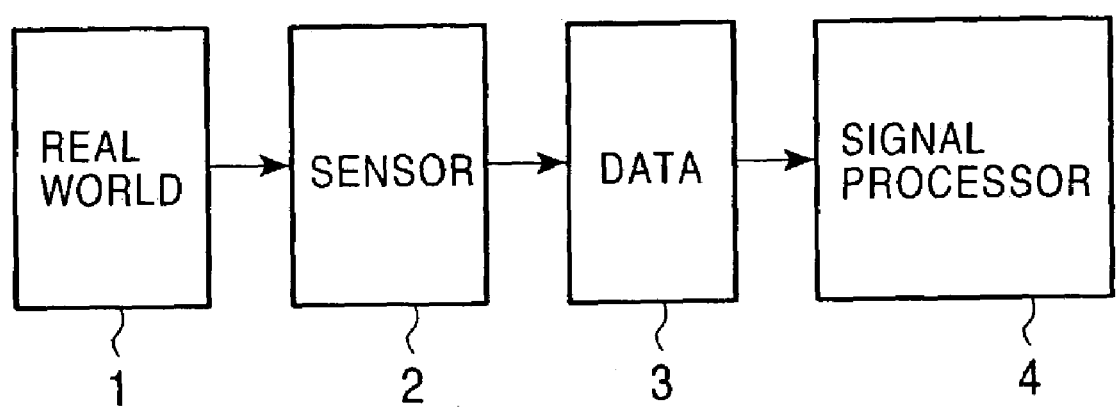
FIG. 1 illustrates the principle of the present invention.

FIG. 1 illustrates the principle of the present invention. As shown, a sensor 2 obtains a first signal which contains information concerning the real world 1 having space and time axis, and is organized in data. The detected signal, namely, the data 3 obtained by the sensor 2, is information which is obtained by projecting the information of the real world 1 into time space which is lower in dimensions than that of the real world. The information obtained as a result of projection suffers from distortion involved in the projection. In other words, the data 3 output from the sensor 2 is distorted with respect to the information of the real world 1. Although the data 3 contains the distortion, it also contains meaningful information to be used for correction of the distortion.

In accordance with the present invention, a signal processor 4 processes the data output from the sensor 2, thereby extracting the meaningful information.

Using the meaningful information, the signal processor 4 processes the data output from the sensor 2, thereby removing, reducing, or adjusting the distortion.

Figure 2:
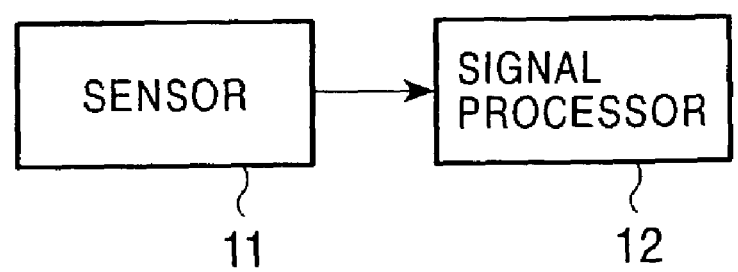
FIG. 2 is a block diagram illustrating the construction of a system in which the present invention is implemented.

FIG. 2 is a block diagram illustrating the construction of a signal processor of the present invention. A sensor 11 is formed of a video camera, for example, and takes picture of the real world, and outputs the obtained image data to a signal processor 12. The signal processor 12 is formed of a personal computer, for example, processes the data input from the sensor 11, adjusts the amount of distortion resulting from the projection of the data, identifies the area where the meaningful information embedded in the data through the projection is present, extracts the meaningful information from the area, and processes the input data based on the extracted meaningful information.

The meaningful information refers to a mixture ratio discussed later, for example.

The information indicating the area which contains the meaningful information embedded through the projection is also considered as meaningful information. Area information to be discussed later is thus the meaningful information.

The area that contains the meaningful information is a mixed area to be discussed later, for example.

Figure 3:
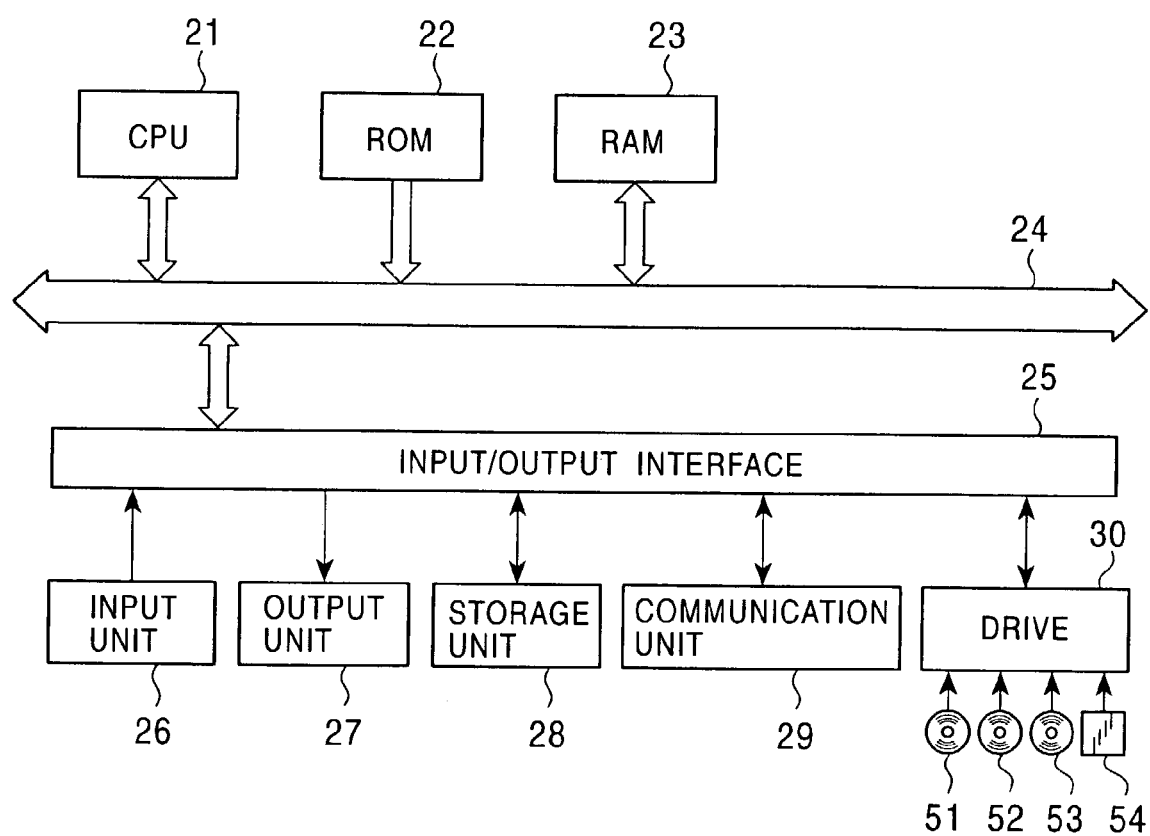
FIG. 3 is a block diagram illustrating the construction of the signal processor of FIG. 2.

The signal processor 12 is constructed as illustrated in FIG. 3. CPU (Central Processing Unit) 21 executes a variety of processes in accordance with software programs stored in a ROM (Read Only Memory) 22 or a storage unit 28. A RAM (Random Access Memory) 23 stores software programs executed by the CPU 21 and data as necessary. The CPU 21, the ROM 22, and the RAM 23 are interconnected to each other through a bus 24.

The CPU 21 is connected to an input and output interface 25 through the bus 24. Also connected to the input and output interface 25 are an input unit 26 such as a keyboard, a mouse, or a microphone, and an output unit 27 such as a display or a loudspeaker. The CPU 21 executes a variety of processes in response to a command input from the input unit 26. The CPU 21 outputs an image, voice, etc. obtained as a result of the processes to the output unit 27.

The storage unit 28, connected to the input and output interface 25, is a hard disk, and stores the program executed by the CPU 21 and a diversity of pieces of data. A communication unit 29 communicates with an external apparatus through the Internet or other networks. In this case, the communication unit 29 works as a capturing unit for capturing the output from the sensor 11.

A software program may be obtained through the communication unit 29 and may be stored in the storage unit 28.

When a drive 30, connected to the input and output interface 25, is loaded with a magnetic disk 50, an optical disk 52, a magnetooptical disk 53, or a semiconductor memory 54, the drive 30 drives the recording medium thereby acquiring a software program and data. The software program and data are transferred to the storage unit 28 as necessary.

The signal processor is specifically discussed below which identifies from the data from the sensor an area where the meaningful information is embedded, and extracts the embedded meaningful information. In the discussion that follows, a CCD line sensor or a CCD area sensor corresponds to the sensor, the area information and the mixture ratio correspond to the meaningful information, and a mixture of a foreground and a background and a motion blur correspond to the distortion in a mixed area.

Figure 4:
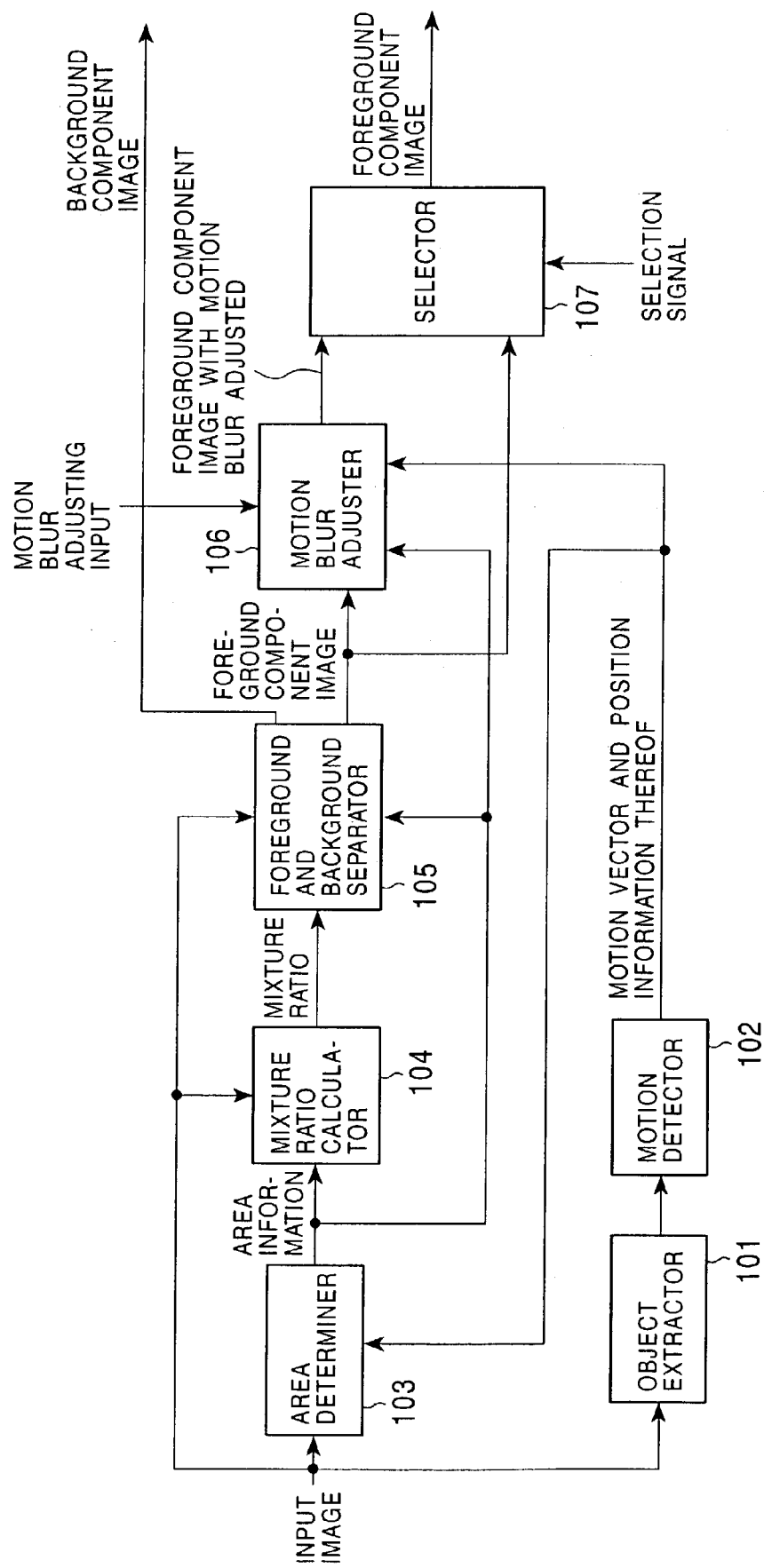
FIG. 4 is a block diagram illustrating the signal processor 12.

FIG. 4 is a block diagram illustrating the signal processor 12.

Whether each function of the signal processor 12 is carried out in hardware or in software is not important. Each block diagram in this description may be considered as a block diagram in hardware or a functional block diagram in software.

The motion blur here refers to a distortion, contained in an image corresponding to a moving object, and caused by the movement of the object in the real world to be imaged and the imaging characteristics of the sensor 11.

In the description of the invention, an image corresponding to an object in the real world to be imaged is referred to as an image object.

An input image, fed to the signal processor 12, goes to an object extractor 101, an area determiner 103, a mixture ratio calculator 104, and a foreground and background separator 105.

The object extractor 101 roughly extracts an image object corresponding to an object of a foreground contained in the input image, and feeds the extracted image object to a motion detector 102. The object extractor 101 detects the outline of the image object corresponding to the object of the foreground contained in the input image, thereby roughly extracting the image object corresponding to the object of the foreground.

The object extractor 101 roughly extracts an image object corresponding to an object of a background contained in the input image, and feeds the extracted image object to a motion detector 102. The object extractor 101 roughly extracts the image object corresponding to the object of the background, from the difference between the input image and the image object corresponding to the extracted object of the foreground.

The object extractor 101 may roughly extract the image object corresponding to the object of the foreground and the image object corresponding to the object of the background, from the difference between the image of the background stored in an internal background memory and the input image.

Using the block matching method, the gradient method, the phase correlation method, or the pal recursive method, the motion detector 102 calculates a motion vector of the image object corresponding to the object of the foreground roughly extracted, and supplies the area determiner 103 and the motion blur adjuster 106 with the calculated motion vector and the position information of the motion vector (the information that identifies the position of a pixel corresponding to the motion vector).

The motion vector output from the motion detector 102 contains information corresponding to the amount of movement v.

For example, the motion detector 102 supplies the motion blur adjuster 106 with the motion vector for each image object together with the pixel position information identifying the pixel of the image object.

The amount of movement v indicates a variation in the position of the image corresponding to the moving object in units of pixel spacing. For example, when the image of the object corresponding to the foreground moves and appears spaced apart by four pixels on a next frame with respect to the original position in one given frame, the amount of movement v of the image of the object corresponding to the foreground is referred to as 4.

The object extractor 101 and the motion detector 102 are necessary when the motion blur amount is adjusted in response to the moving object.

The area determiner 103 determines which one of the foreground area, the background area, and the mixed area each pixel of the input image is located in, and then feeds, to the mixture ratio calculator 104, the foreground and background separator 105, and the motion blur adjuster 106, information concerning which area each pixel of the input image belongs to (hereinafter referred to as area information).

Based on the input image and the area information supplied from the area determiner 103, the mixture ratio calculator 104 calculates a ratio of mixing of each pixel contained in a mixed area 63 (hereinafter referred to as a mixture ratio α), and then feeds the calculated mixture ratio to the foreground and background separator 105.

As will be discussed later using equation (3), the mixture ratio α represents a ratio of image component of each pixel value corresponding to the background (also hereinafter referred to as a background component).

Based on the area information supplied from the area determiner 103 and the mixture ratio α supplied from the mixture ratio calculator 104, the foreground and background separator 105 separates a foreground component image formed of an image component only corresponding to the object of the foreground (also hereinafter referred to as a foreground component) and a background component image formed of the background component only from the image, and feeds the foreground component image to the motion blur adjuster 106 and the selector 107. It is contemplated that the separated foreground component is treated as a final output. Compared with a conventional method in which the foreground and the background are determined and separated without paying attention to the mixed area, the present invention provides accurate foreground and background.

The motion blur adjuster 106 determines the unit of processing indicating at least one pixel contained in the foreground component image, based on the amount of movement v determined from the motion vector and the area information. The unit of processing is data that designates a group of pixels to be treated in the adjustment of the motion blur.

The motion blur adjuster 106 adjusts the amount of motion blur contained in the foreground component, based on the motion blur input level input to the signal processor 12, the foreground component image supplied from the foreground and background separator 105, and the motion vector, the position information thereof supplied from the motion detector 102, and the unit of processing. For example, the motion blur adjuster 106 removes the motion blur contained in the foreground component image, or decreases, or increases the amount of motion blur contained in the foreground component image and then outputs, to a selector 107, the foreground component image with the motion blur adjusted. There are times when the motion vector and the position information thereof are not used.

Based on a selection signal responsive to a selection input by the user, the selector 107 selects between the foreground component image supplied from the foreground and background separator 105 and the motion blur adjusted foreground component image supplied from the motion blur adjuster 106, and then outputs the selected foreground component image.

The input image supplied to the signal processor 12 is discussed below referring to FIG. 5 through FIG. 20.

FIG. 5 illustrates the imaging operation by a sensor. The sensor 11 is formed of a CCD video camera having a CCD (Charge-Coupled Device) area sensor as a solid-state image pickup device. An object 111, corresponding to the foreground in the real world, horizontally moves from the left-hand side to the right-hand side between an object 112 corresponding to the background in the real world and the sensor 11.

The sensor 11 captures the images of the object 111 corresponding to the foreground together with the object 112 corresponding to the background. The sensor 11 then outputs the captured image in units of one frame. For example, the sensor 11 outputs an image formed 30 frames per second. The exposure time of the sensor 11 is thus ¹/₃₀ second. The exposure time is a duration of time from the beginning of the conversion of input light into electric charge and the end of the conversion of the input light into electric charge. The exposure time is also referred to as shutter time.

Figure 6:
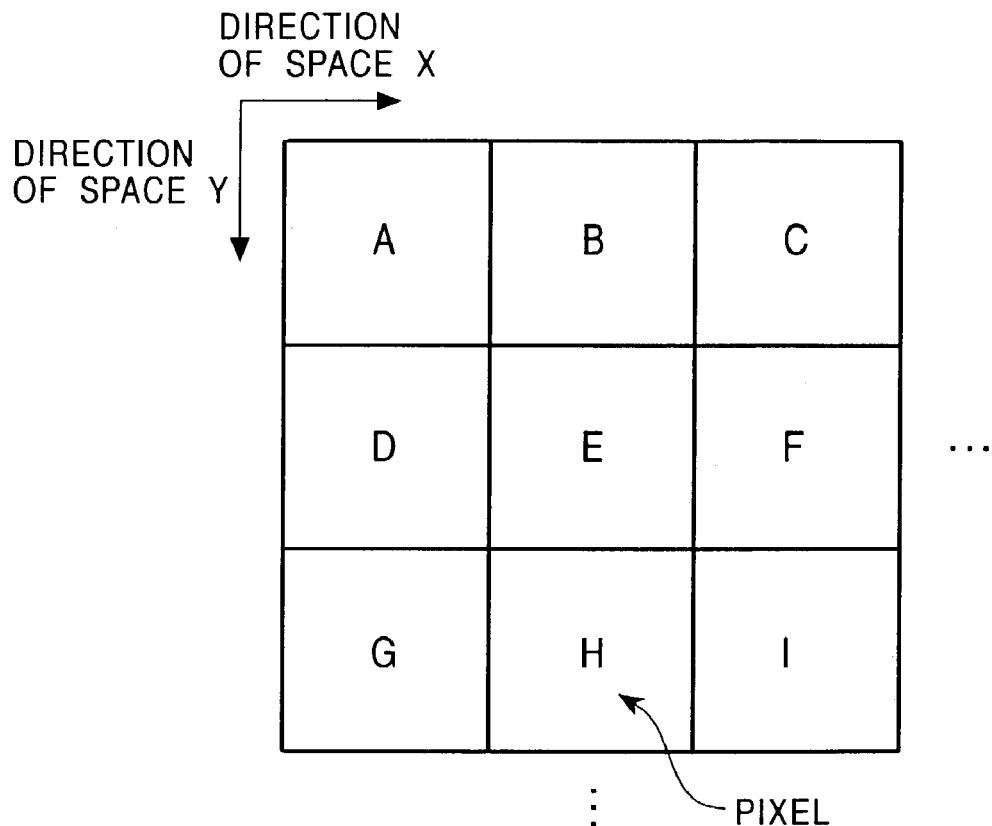
FIG. 6 is a diagram illustrating the arrangement of pixels.

FIG. 6 is a diagram illustrating the arrangement of pixels. As shown, the letters A through I respectively represent individual pixels. The pixels are arranged on a plane corresponding to the image. A single detector element corresponding to a single pixel is arranged on the sensor 11. When the sensor 11 captures the images, a single detector element outputs a pixel value corresponding to a single pixel forming the image. For example, the location of each detector element in the X direction corresponds to a location in the horizontal direction of the image and the location of each detector element in the Y direction corresponds to a location in the vertical direction of the image.

Figure 7:
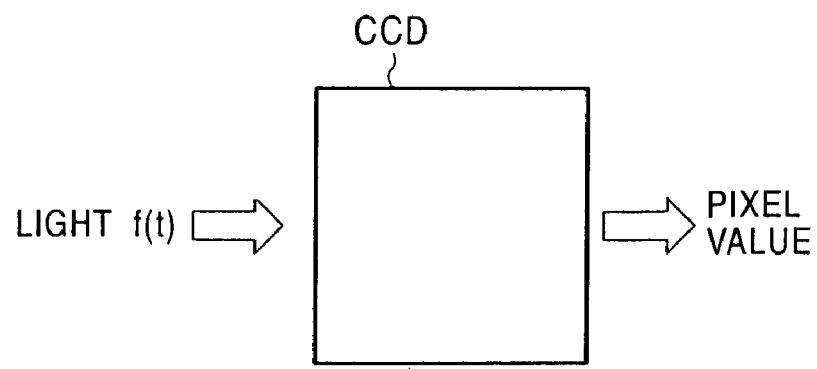
FIG. 7 illustrates the operation of a detector element.

Referring to FIG. 7, the detector element as the CCD converts the input light into electric charge for a duration of time corresponding to the shutter time, and accumulates the resulting electric charge. The amount of electric charge is substantially proportional to the intensity of input light and the period of time during which light is input. During the period of time corresponding to the shutter time, the detector element adds, to the already accumulated charge, charge into which the input light is converted. Specifically, the detector element integrates the input light for a duration of time corresponding to the shutter time, and stores the electric charge responsive to the integrated light. The detector element is thus called as having a time integration effect.

The electric charge stored in the detector element is converted into a voltage value by an unshown circuit, and the voltage value is converted into a pixel value such as digital data, and then output. The individual pixel values output from the sensor 11 have a value projected in one-dimensional space, which is obtained by integrating, with respect to the shutter time, a given portion of an object corresponding to the foreground or the background, and having a spatial expanse.

The signal processor 12 extracts meaningful information embedded through the storage operation of the sensor 11 in the output signal, such as the mixture ratio α. The signal processor 12 adjusts the amount of distortion, such as the motion blur, as a result of mixture of the image object of the foreground itself. The signal processor 12 also adjusts the amount of distortion resulting from the mixture of the image object of the foreground and the image object of the background.

Figure 8A:
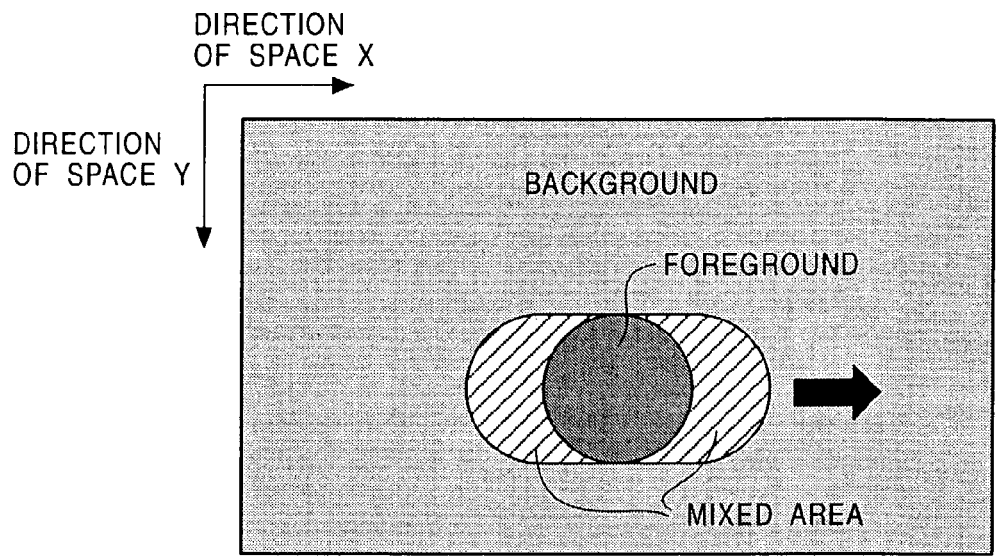
FIG. 8A illustrates an image that is obtained by photographing an object corresponding to a moving foreground and an object corresponding to a stationary background.

FIG. 8A illustrates an image that is obtained by imaging an object corresponding to a moving foreground and an object corresponding to a stationary background. As shown, the object corresponding to the foreground horizontally moves from the left-hand side to the right-hand side with respect to the screen.

Figure 8B:
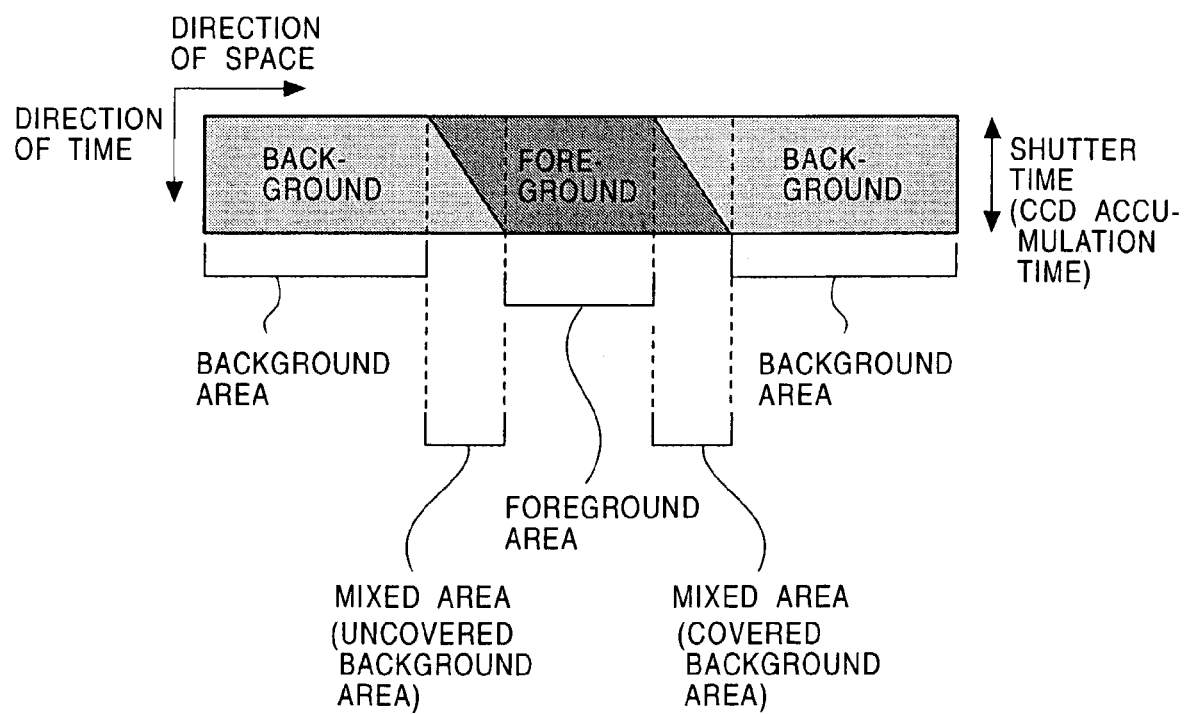
FIG. 8B illustrates a model of an image that is obtained by photographing an object corresponding to a moving foreground and an object corresponding to a stationary background.

FIG. 8B illustrates a model diagram in which the pixel values in a single line of the image illustrated in FIG. 8A are developed in time axis. The horizontal direction of FIG. 8B corresponds to the direction of space X in FIG. 8A.

The pixels in the background area have pixel values formed of the background component, namely, the component of the image corresponding to the background object. The pixels in the foreground area have pixel values formed of the foreground component, namely, the component of the image corresponding to the foreground object.

The pixels in the mixed area have pixel values of the background component and the foreground component. Since the pixels in the mixed area are formed of the background component and the foreground component, it may be called a distorted area. The mixed area is divided into a covered background area and an uncovered background area.

The covered background area is a portion of the mixed area corresponding to a forward end of the object of the foreground in the direction of movement thereof, and in the covered background area, the background is covered with the foreground with the elapse of time.

In contrast, the uncovered background area is a portion of mixed area corresponding to a backward end of the object of the foreground in the direction of movement, and in the uncovered background, the background is appearing with the elapse of time.

In this way, an image, containing the foreground, the background, the covered background area, and the uncovered background area is fed, as the input image, to each of the area determiner 103, the mixture ratio calculator 104, and the foreground and background separator 105.

Figures 9, 10:
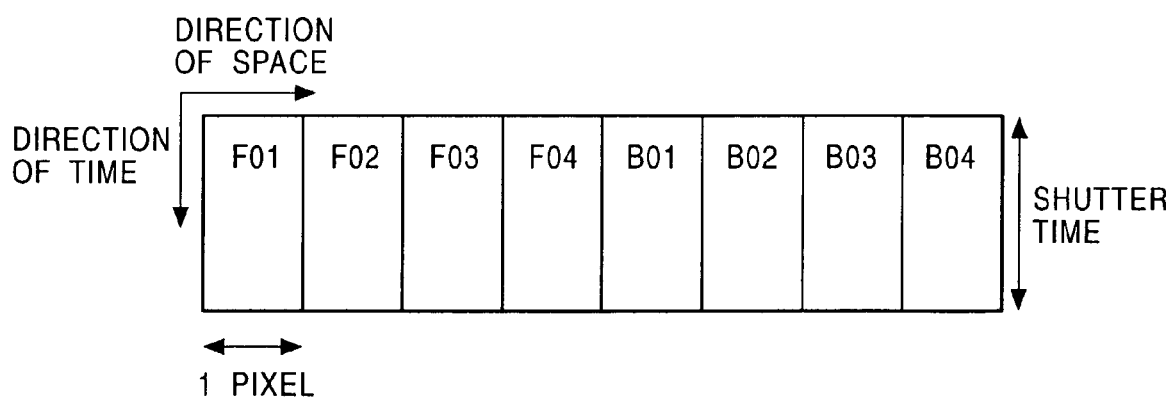
FIG. 9 illustrates a background area, a foreground area, a mixed area, a covered background area, and an uncovered background area.
FIG. 10 is a model diagram illustrating pixel values of a line of adjacent pixels developed in time axis in an image of the object corresponding to the stationary foreground and the object corresponding to the stationary background.

FIG. 9 explains the background area, the foreground area, the mixed area, the covered background area, and the uncovered background area. In view of the image illustrated in FIG. 8, the background area is a still portion, the foreground area is a moving portion, the covered background of the mixed area is a portion where the background transitions into the foreground, and the uncovered background of the mixed area is a portion where the foreground transitions into the background.

FIG. 10 is a model diagram illustrating pixel values of a line of consecutively arranged pixels developed in time axis in an image of the object corresponding to the moving foreground and the object corresponding to the stationary background. For example, the pixels arranged in a line of the image are selected as a line of adjacent pixels.

Pixel values F01 through F04 illustrated in FIG. 10 are those of the pixels corresponding to the object of a still foreground, and pixel values F01 through B04 illustrated in FIG. 10 are those of the pixels corresponding to the object of a sill background.

The vertical direction from top to bottom in FIG. 10 represents the elapse of time. The top side of the rectangle shown in FIG. 10 corresponds to time at which the conversion of light incident on the sensor 11 into electric charge starts, and the bottom side of the rectangle shown in FIG. 10 corresponds to time at which the conversion of light incident on the sensor 11 into electric charge ends. Specifically, the distance from the top side to the bottom side of the rectangle refers to the shutter time.

In the discussion that follows, the shutter time and the frame interval are equal to each other.

The horizontal direction in FIG. 10 corresponds to the direction of space X discussed with reference to FIG. 8. Specifically, in the example shown in FIG. 10, the distance from the left side of the rectangle designated "F01" to the right side of the rectangle designated "B04" as shown in FIG. 10 corresponds to eight times the pixel pitch, namely, corresponds to the extension of 8 consecutive pixels.

When the object of the foreground and the object of the background are still, light incident on the sensor 11 remains unchanged for a duration of time corresponding to the shutter time.

Figure 11:
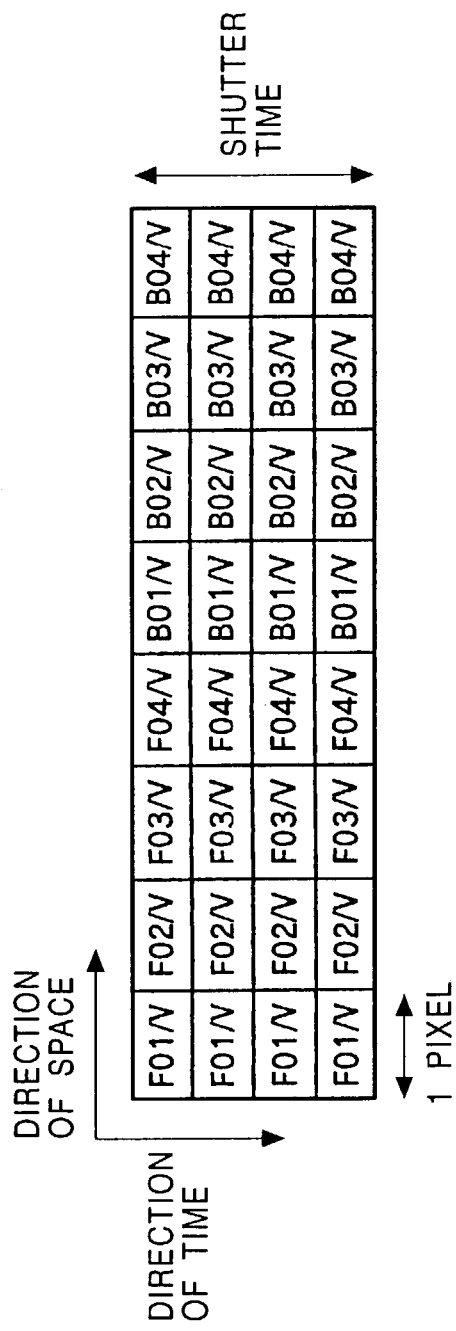
FIG. 11 is a model diagram illustrating the pixel values developed in time axis for a duration of time, which is divided and corresponds to shutter time.

The duration of time corresponding to the shutter time is divided into at least two equal length segments. For example, when a virtual divisor number is 4, the model illustrated in FIG. 10 becomes the one as illustrated in FIG. 11. The virtual divisor number is set up taking into account the amount of movement of the object corresponding to the foreground within the shutter time. For example, the virtual divisor number is set to 4 when the amount of movement of the object is 4, and the duration of time corresponding to the shutter time is divided into 4 segments.

The topmost row illustrated in FIG. 11 is a divided segment at the beginning of the opening of a shutter. A second row illustrated in FIG. 11 is a divided segment that comes second from the opening of the shutter. A third row illustrated in FIG. 11 is a divided segment that comes third from the opening of the shutter. A fourth row illustrated in FIG. 11 is a divided segment that comes fourth from the opening of the shutter.

The shutter time segmented in response to the amount of movement v is also referred to as shutter time /v.

When the object corresponding to the foreground is still, the light incident on the sensor 11 remains unchanged. The foreground component F01/v equals a value which is obtained by dividing the pixel value F01 by the virtual divisor number. Similarly, when the object corresponding to the foreground is still, the foreground component F02/v equals a value that is obtained by dividing the pixel value F02 by the virtual divisor number, the foreground component F03/v equals a value that is obtained by dividing the pixel value F03 by the virtual divisor number, and the foreground component F04/v equals a value that is obtained by dividing the pixel value F04 by the virtual divisor number.

When the object corresponding to the background is still, the light incident on the sensor 11 remains unchanged, and the background component B01/v equals a value that is obtained by dividing the pixel value V01 by the virtual divisor number. Similarly, when the object corresponding to the background is still, the background component B02/v equals a value that is obtained by dividing the pixel value B02 by the virtual divisor number, the background component B03/v equals a value that is obtained by dividing the pixel value B03 by the virtual divisor number, and the background component B04/v equals a value that is obtained by dividing the pixel value B04 by the virtual divisor number.

In other words, when the object corresponding to the foreground is still, light, incident on the sensor 11 and corresponding to the object of the foreground, remains unchanged for the duration of time corresponding to the shutter time. Therefore, the foreground component F01/v for the shutter time /v that comes first from the opening of the shutter, the foreground component F01/v for the shutter time /v that comes second from the opening of the shutter, the foreground component F01/v for the shutter time /v that comes third from the opening of the shutter, and the foreground component F01/v for the shutter time /v that comes fourth from the opening of the shutter become the same value. The same is true of F02/v through F04/v.

When the object corresponding to the background is still, light, incident on the sensor 11 and corresponding to the object of the background, remains unchanged for the duration of time corresponding to the shutter time. Therefore, the background component B01/v for the shutter time /v that comes first from the opening of the shutter, the background component B01/v for the shutter time /v that comes second from the opening of the shutter, the background component B01/v for the shutter time /v that comes third from the opening of the shutter, and the background component B01/v for the shutter time /v that comes fourth from the opening of the shutter become the same value. The same is true of B02/v through B04/v.

Discussed next is the case in which an object corresponding to the foreground is moving while an object corresponding to the background is stationary.

Figure 12:
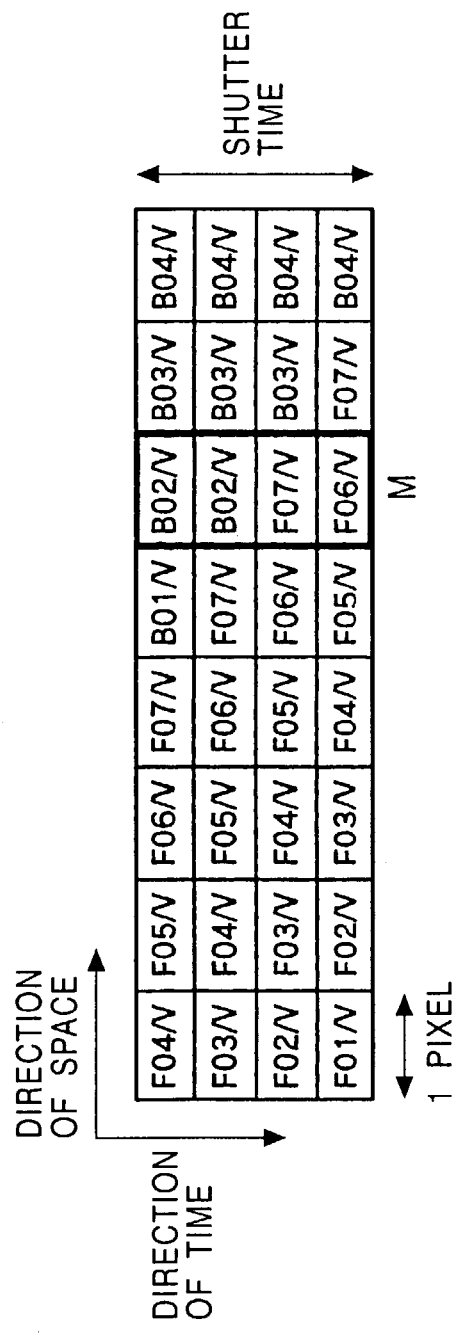
FIG. 12 is a model diagram illustrating the pixel values developed in the time axis for the duration of time, which is divided and corresponds to the shutter time.

FIG. 12 is a model diagram illustrating the pixel values of a line of pixels developed in the time axis, wherein a covered background is present with the object corresponding to the foreground moving rightwardly. Referring to FIG. 12, the amount of movement v of the foreground is 4. Since one frame is a short period of time, the assumption that the object corresponding to the foreground is a solid body and moves at a constant speed holds. As shown, the image of the object of the foreground is shifted rightwardly by 4 pixels on the next frame with respect to a given frame.

Referring to FIG. 12, the leftmost pixel to the fourth pixel in the frame from the left-hand side thereof belong to the foreground area. The fifth pixel to the seventh pixel belong to the mixed area, which is a covered background area. Referring to FIG. 12, the rightmost pixel belongs to the background area.

Since the object of the foreground moves in a manner such that it covers the object of the background with the elapse of time, components contained in the pixel values of the pixels belonging to the covered background area change from the background component to the foreground component at a point of time within the duration of the shutter time.

The pixel values M enclosed in a solid box as shown in FIG. 12 are expressed by the following equation (1).

$$M = B02/v + B02/v + F07/v + F06/v \tag{1}$$

For example, the fifth pixel from the left-hand side contains the background component of a single shutter time /v and the foreground component of three shutter times/v, and the fifth pixel has a mixture ratio $\alpha$ of 1/4. Since the sixth pixel from the left-hand side contains the background component of two shutter times/v and the foreground component of two shutter times/v, the mixture ratio $\alpha$ thereof is 1/2. The seventh pixel from the left-hand side contains the background component of three shutter times/v and the foreground component of one shutter time /v, and the mixture ratio $\alpha$ thereof is 3/4.

When it is assumed that the object of the foreground is a solid body and moves at a constant speed so that the image of the foreground appears shifted by 4 pixels on the next frame, the foreground component F07/v of the fourth pixel from the left-hand side as shown in FIG. 12 for the first shutter time /v from the opening of the shutter equals the foreground component of the fifth pixel from the left-hand side as shown in FIG. 12 for the second shutter time /v from the opening of the shutter. Likewise, the foreground component F07/v equals each of the foreground component of the sixth pixel from the left-hand side as shown in FIG. 12 for the third shutter time /v from the opening of the shutter and the foreground component of the seventh pixel from the left-hand side as shown in FIG. 12 for the fourth shutter time /v from the opening of the shutter.

When it is assumed that the object of the foreground is a solid body and moves at a constant speed so that the image of the foreground appears shifted by 4 pixels on the next frame, the foreground component F06/v of the third pixel from the left-hand side as shown in FIG. 12 for the first shutter time /v from the opening of the shutter equals the foreground component of the fourth pixel from the left-hand side as shown in FIG. 12 for the second shutter time /v from the opening of the shutter. Likewise, the foreground component F06/v equals each of the foreground component of the fifth pixel from the left-hand side as shown in FIG. 12 for the third shutter time /v from the opening of the shutter and the foreground component of the sixth pixel from the left-hand side as shown in FIG. 12 for the fourth shutter time /v from the opening of the shutter.

When it is assumed that the object of the foreground is a solid body and moves at a constant speed so that the image of the foreground appears shifted by 4 pixels on the next frame, the foreground component F05/v of the second pixel from the left-hand side as shown in FIG. 12 for the first shutter time /v from the opening of the shutter equals the foreground component of the third pixel from the left-hand side as shown in FIG. 12 for the second shutter time /v from the opening of the shutter. Likewise, the foreground component F05/v equals each of the foreground component of the fourth pixel from the left-hand side as shown in FIG. 12 for the third shutter time /v from the opening of the shutter and the foreground component of the fifth pixel from the left-hand side as shown in FIG. 12 for the fourth shutter time /v from the opening of the shutter.

When it is assumed that the object of the foreground is a solid body and moves at a constant speed so that the image of the foreground appears shifted by 4 pixels on the next frame, the foreground component F04/v of the leftmost pixel as shown in FIG. 12 for the first shutter time /v from the opening of the shutter equals the foreground component of the second pixel from the left-hand side as shown in FIG. 12 for the second shutter time /v from the opening of the shutter. Likewise, the foreground component F04/v equals each of the foreground component of the third pixel from the left-hand side as shown in FIG. 12 for the third shutter time /v from the opening of the shutter and the foreground component of the fourth pixel from the left-hand side as shown in FIG. 12 for the fourth shutter time /v from the opening of the shutter.

The foreground area corresponding to the moving object contains a motion blur in this way, and may be thus called a distorted area.

Figure 13:
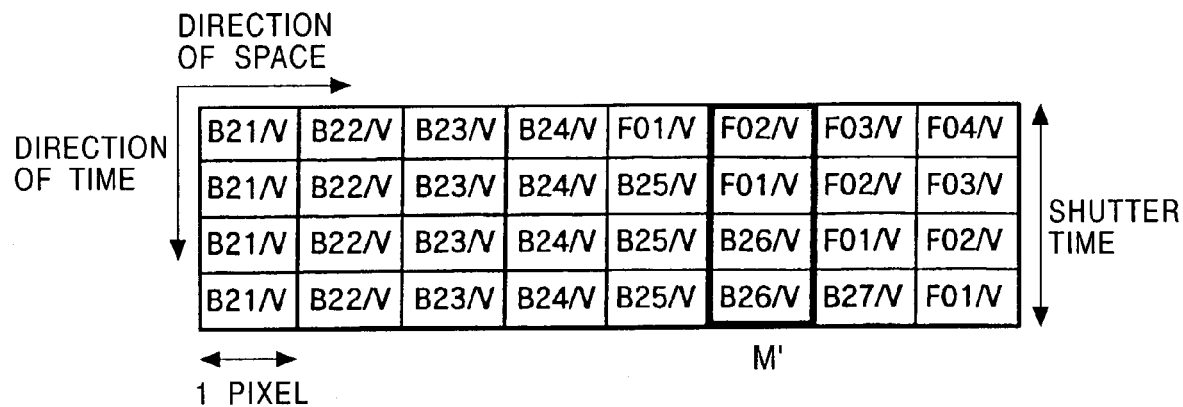
FIG. 13 is a model diagram illustrating the pixel values developed in the time axis for the duration of time, which is divided and corresponds to the shutter time.

FIG. 13 is a model diagram illustrating the pixel values of a line of pixels developed in the time axis, wherein an uncovered background is present with the object corresponding to the foreground moving rightwardly. Referring to FIG. 13, the amount of movement v of the foreground is 4. Since one frame is a short period of time, the assumption that the object corresponding to the foreground is a solid body and moves at a constant speed holds. As shown, the image of the object of the foreground is shifted rightwardly by 4 pixels on the next frame with respect to a given frame.

Referring to FIG. 13, the leftmost pixel to the fourth pixel from the left-hand side belong to the foreground area. The fifth pixel to the seventh pixel belong to the mixed area, which is an uncovered background area. Referring to FIG. 13, the rightmost pixel belongs to the foreground area.

Since the object of the foreground, which has covered the object of the background, moves with the elapse of time in a manner such that the object of the foreground is removed from the front of the background object, the component contained in the pixel value of a pixel belonging to the uncovered background area changes from the foreground component to the background component at a point of time within the duration of time corresponding to the shutter time.

The pixel value M' enclosed in a solid-line box in FIG. 13 is expressed by equation (2).

$$M' = F02/v + B01/v + B26/v + B26/v \quad (2)$$

For example, the fifth pixel from the left-hand side contains the background component of three shutter times/v and the foreground component of one shutter time /v, and the fifth pixel has a mixture ratio α of 3/4. Since the sixth pixel from the left-hand side contains the background component of two shutter times/v and the foreground component of two shutter times/v, the mixture ratio α thereof is 1/2. The seventh pixel from the left-hand side contains the background component of one shutter time /v and the foreground component of three shutter times/v, and the mixture ratio α thereof is 1/4.

When equations (1) and (2) are generalized, the pixel value M is expressed by equation (3).

$$M = \alpha \cdot B + \sum_i Fi/v \quad (3)$$

where α is a mixture ratio, B is a pixel value of the background, and Fi/v is a foreground component.

Since it is assumed that the object of the foreground is a solid body and moves at a constant speed, and the amount of movement v is 4, the foreground component F01/v of the fifth pixel from the left-hand side as shown in FIG. 13 for the first shutter time /v from the opening of the shutter equals the foreground component of the sixth pixel from the left-hand side as shown in FIG. 13 for the second shutter time /v from the opening of the shutter. Likewise, the foreground component F01/v of the seventh pixel from the left-hand side as shown in FIG. 13 for the third shutter time /v from the opening of the shutter equals the foreground component of the eighth pixel from the left-hand side as shown in FIG. 13 for the fourth shutter time /v from the opening of the shutter.

Since it is assumed that the object of the foreground is a solid body and moves at a constant speed, and the amount of movement v is 4, the foreground component F02/v of the sixth pixel from the left-hand side as shown in FIG. 13 for the first shutter time /v from the opening of the shutter equals the foreground component of the seventh pixel from the left-hand side as shown in FIG. 13 for the second shutter time /v from the opening of the shutter. Likewise, the foreground component F02/v equals the foreground component of the eighth pixel from the left-hand side as shown in FIG. 13 for the third shutter time /v from the opening of the shutter.

Since it is assumed that the object of the foreground is a solid body and moves at a constant speed, and the amount of movement v is 4, the foreground component F03/v of the seventh pixel from the left-hand side as shown in FIG. 13 for the first shutter time /v from the opening of the shutter equals the foreground component of the eighth pixel from the left-hand side as shown in FIG. 13 for the second shutter time /v from the opening of the shutter.

Referring to FIG. 11 through FIG. 13, the virtual divisor number is 4, but the divisor number may respond to the amount of movement v. The amount of movement v, in turn, is typically responsive to the speed of movement of the object of the foreground. For example, when the object of the foreground is moving in a manner such that it rightwardly appears by 4 pixels on the next frame with respect to a certain frame, the amount of movement v of the object is 4. The virtual divisor number is thus set to be 4 in response to the amount of movement v. Similarly, when the object of the foreground is moving in a manner such that it leftwardly appears by 6 pixels on the next frame with respect to a certain frame, the amount of movement v of the object is 6. The virtual divisor number is thus set to be 6 in response to the amount of movement v.

Figure 14:
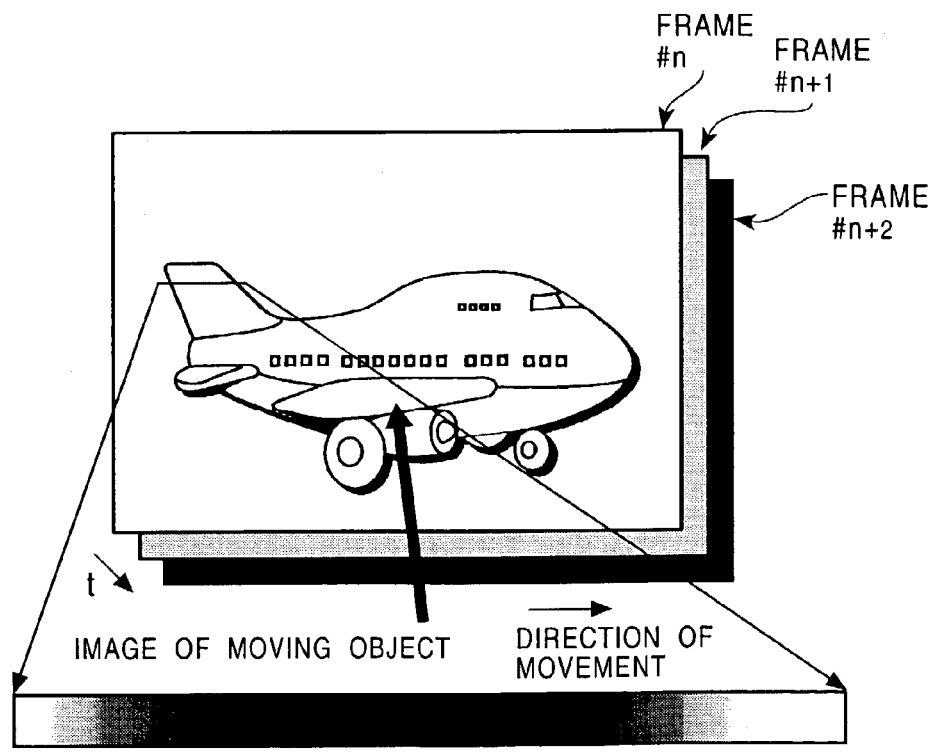
FIG. 14 illustrates extracted pixels of the foreground area, the background area, and the mixed area.
Figure 15:
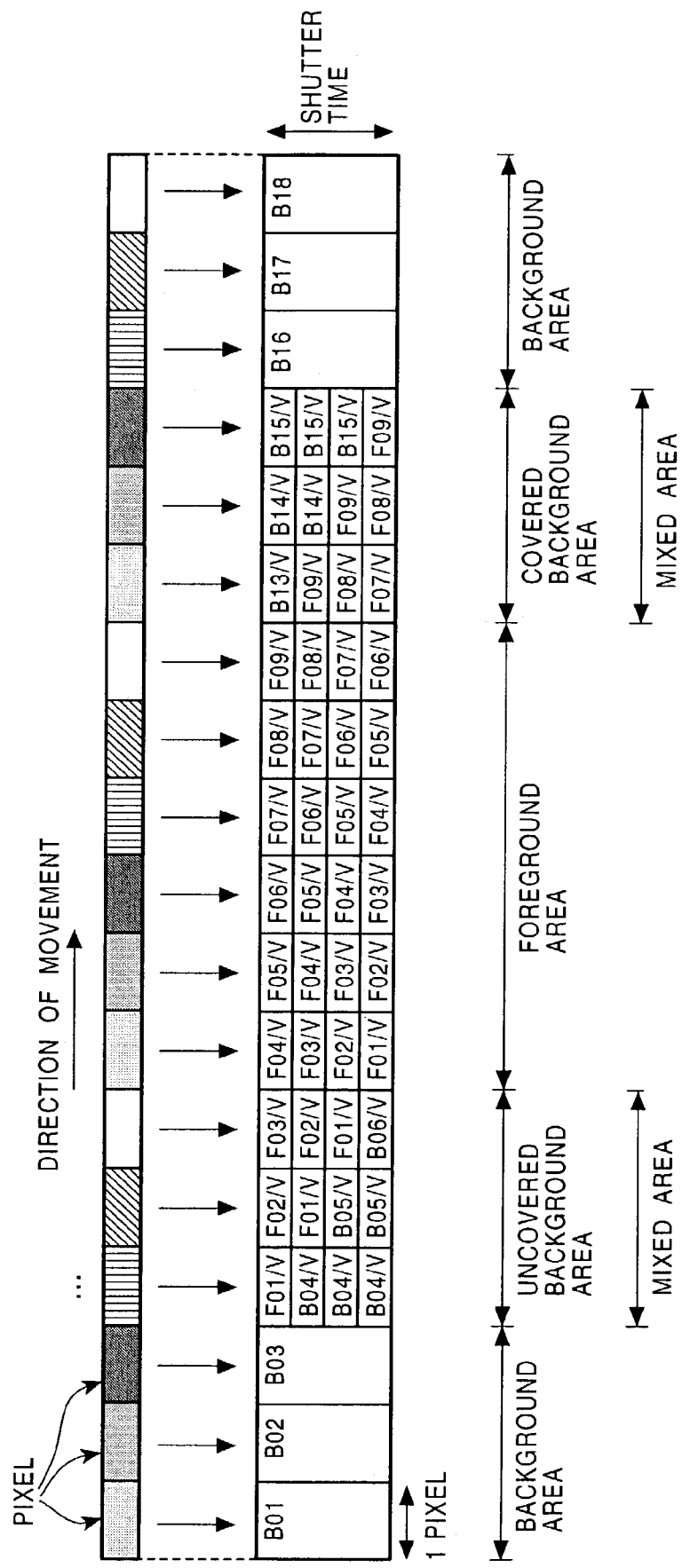
FIG. 15 illustrates the relationship between the pixels and the model in which the pixel values are developed in the time axis.

FIG. 14 and FIG. 15 illustrate the relationship between the foreground area, the background area, and the mixed area composed of the covered background portion and the uncovered background portion, described above, and the foreground component and the background component responsive to the segmented shutter time.

FIG. 14 illustrates the pixels of the foreground area, the background area, and the mixed area extracted from the image of the foreground corresponding to the object moving in front of the stationary background. As shown, the object of the foreground horizontally moves with respect to the screen.

A frame #n+1 is a frame subsequent to a frame #n, and a frame #n+2 is a frame subsequent to the frame #n+1.

FIG. 15 illustrates a model in which the pixel values of pixels are developed in the time axis, wherein the pixels are extracted from the foreground area, the background area, and the mixed area from any of the frame #n through the frame #n+2, and the amount of movement is determined to be 4. Since the object of the foreground moves, the pixel values in the foreground area include four different foreground components corresponding to the shutter times/v. For example, the leftmost one of the pixels in the foreground area shown in FIG. 15 includes F01/v, F02/v, F03/v, and F04/v. In other words, the pixels in the foreground area contains a motion blur.

The object of the background remains still, and light incident on the sensor 11 and corresponding to the background remains unchanged for throughout the duration of time corresponding to the shutter time. In this case, the pixel value of the background area includes no motion blur.

The pixel values of the pixels belonging to the mixed area formed of the covered background portion or the uncovered background portion include the foreground component and the background component.

Discussed next is a model in which pixels are consecutively arranged in a line in each of a plurality of frames and pixel values of the pixels at the same positions across the frames are developed in time axis when the image of an object is moving. For example, when the image of the object-is horizontally moving with respect to the screen, a line of pixels on the screen is selected as the line of consecutively arranged pixels.

Figure 16:
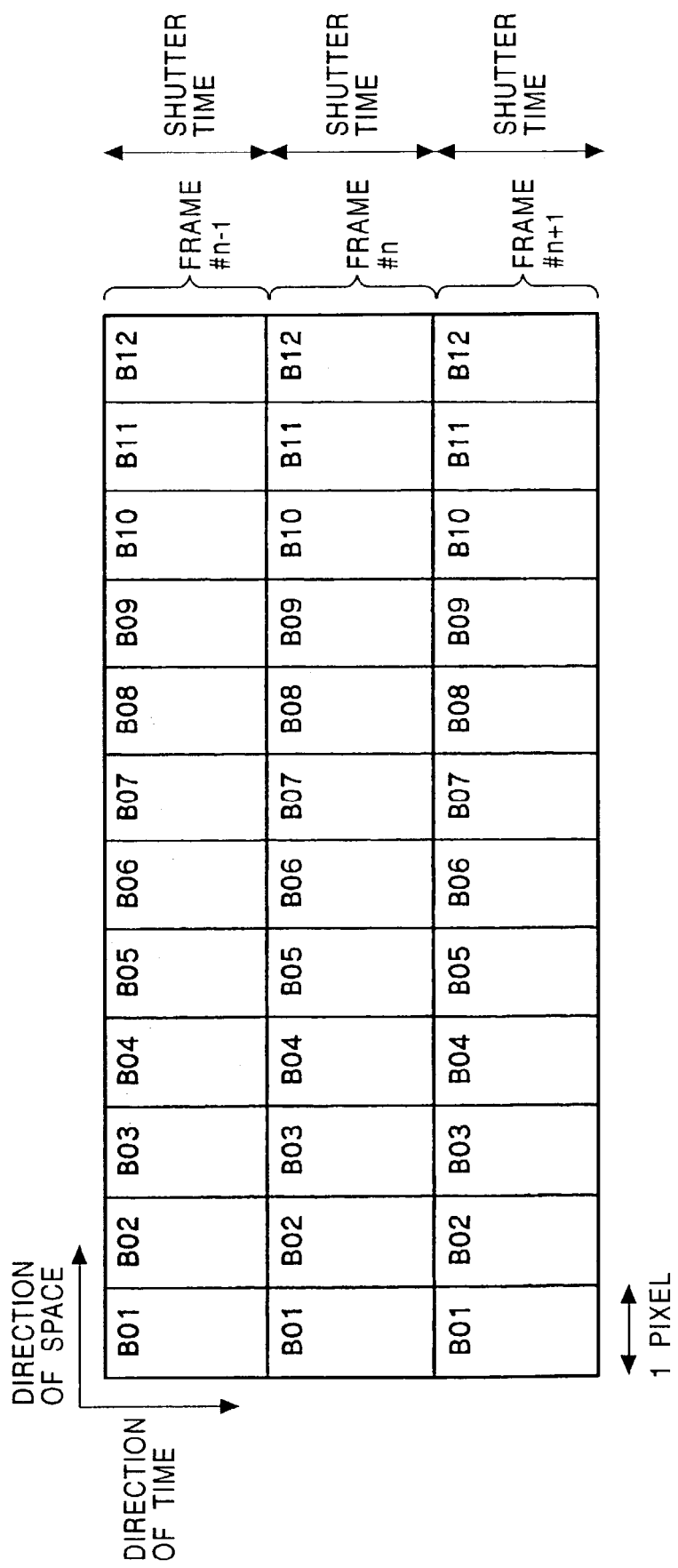
FIG. 16 is a model diagram illustrating the pixel values developed in time axis for a duration of time, which is divided and corresponds to shutter time.

FIG. 16 is a model diagram illustrating the pixel values of a line of adjacent pixels at the same position across the three frames developed in time axis, wherein the pixels form an image of the object of the stationary background. A frame #n is a frame subsequent to a frame #n−1, and a frame #n+1 is a frame subsequent to the frame #n.

Referring to FIG. 16, pixel values B01 through B12 are the pixel values of the pixels corresponding to the stationary background object. Since the background object remains still, the pixel values of the corresponding pixels remain unchanged from the frame #n−1 through the frame #n+1. The pixel in the frame #n and the pixel in the frame #n+1 at the same position as that of the pixel having a pixel value of B05 in the frame #n−1 respectively have the pixel value B05.

Figure 17:
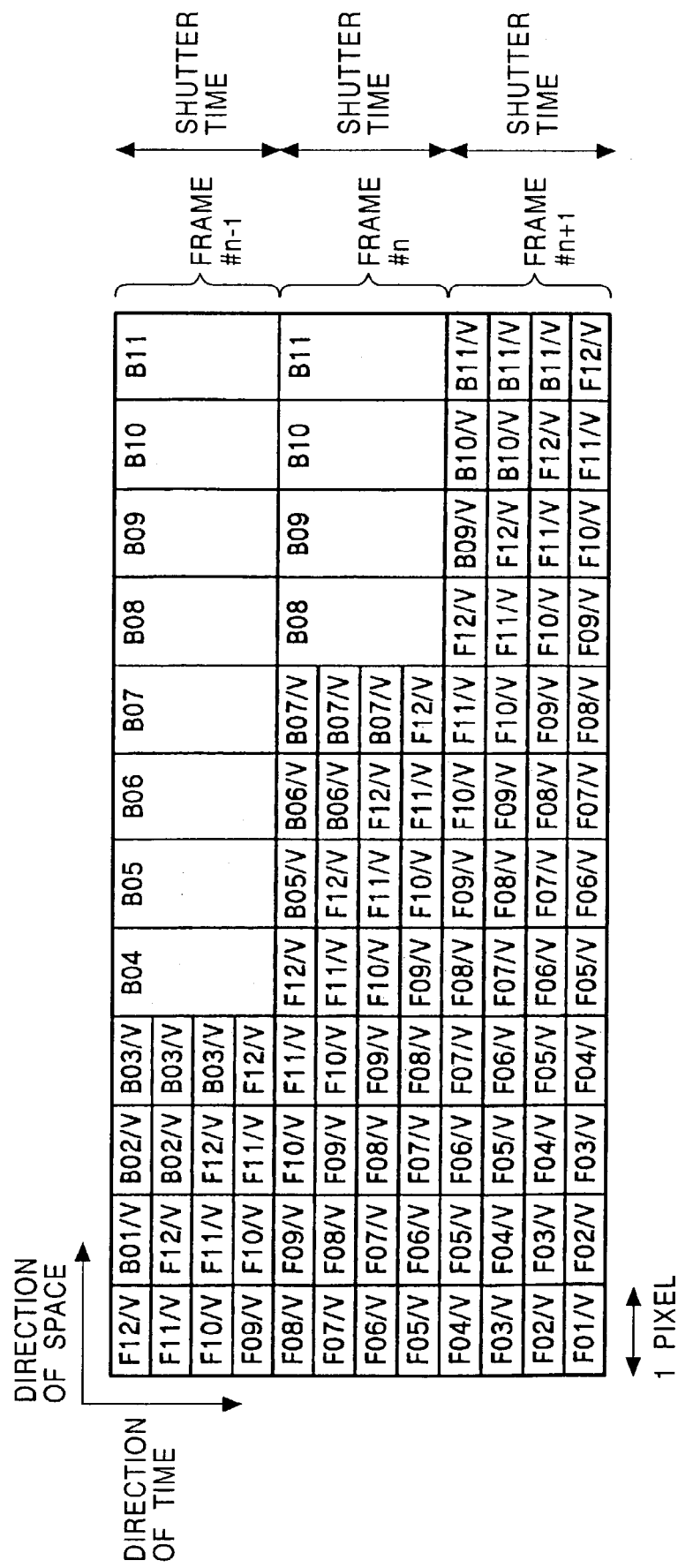
FIG. 17 is a model diagram illustrating the pixel values developed in the time axis for the duration of time, which is divided and corresponds to the shutter time.

FIG. 17 is a model diagram illustrating the pixel values of a line of pixels at the same position across three frames developed in time axis, in which the object of a still background and the object of a foreground moving rightwardly as shown are captured. The model illustrated in FIG. 17 contains a covered background portion.

Since it is assumed that the foreground object is a solid body, and moves at a constant speed, and the image of the foreground appears rightwardly by 4 pixels on the next frame as shown in FIG. 17, the amount of movement v is 4, and the virtual divisor number is thus 4.

For example, the foreground component of the leftmost pixel in the frame #n−1 as shown in FIG. 17 for the first shutter time /v after the opening of the shutter is F12/v, and the foreground component of the second pixel from the left-hand side as shown in FIG. 17 for the second shutter time /v after the opening of the shutter is also F12/v. The foreground component of the third pixel from the left-hand side as shown in FIG. 17 for the third shutter time /v after the opening of the shutter and the foreground component of the fourth pixel from the left-hand side as shown in FIG. 17 for the fourth shutter time /v after the opening of the shutter become F12/v.

The foreground component of the leftmost pixel in the frame #n−1 as shown in FIG. 17 for the second shutter time /v after the opening of the shutter is F11/v, and the foreground component of the second pixel from the left-hand side as shown in FIG. 17 for the third shutter time /v after the opening of the shutter is also F11/v. The foreground component of the third pixel from the left-hand side as shown in FIG. 17 for the fourth shutter time /v after the opening of the shutter becomes F11/v.

The foreground component of the leftmost pixel in the frame #n−1 as shown in FIG. 17 for the third shutter time /v after the opening of the shutter is F10/v, and the foreground component of the second pixel from the left-hand side as shown in FIG. 17 for the fourth shutter time /v after the opening of the shutter is also F10/v. The foreground component of the leftmost pixel in the frame #n−1 as shown in FIG. 17 for the fourth shutter time /v after the opening of the shutter becomes F09/v.

Since the background object is still, the background component of the second pixel in the frame #n−1 from the left-hand side as shown in FIG. 17 for the first shutter time /v is B01/v. The background object of the third pixel from the left-hand side of the frame #n−1 as shown in FIG. 17 for the second shutter time after the opening of the shutter is B02/v. The background object of the fourth pixel from the left-hand side of the frame #n−1 as shown in FIG. 17 for the first through third shutter times after the opening of the shutter is B03/v.

In the frame #n−1 as illustrated in FIG. 17, the leftmost pixel falls within the foreground area, and the second through fourth pixels from the left-hand side fall within the mixed area which is a covered background portion.

In the frame #n−1 as illustrated in FIG. 17, the fifth through twelfth pixels, falling within the background area, respectively have pixel values of B04 through B11.

In the frame #n as illustrated in FIG. 17, the leftmost through fifth pixels fall within the foreground area. In the foreground area of the frame #n, the foreground component for the shutter time /v is one of F05/v through F12/v.

Since it is assumed that the foreground object is a solid body and moves at a constant speed and the image of the foreground moves and riqhtwardly appears on the next frame by 4 pixels apart from the original position in any given frame, the foreground component of the fifth pixel from the left-hand side of the frame #n as shown in FIG. 17 for the first shutter time /v after the opening of the shutter is F12/v, and the foreground component of the sixth pixel from the left-hand side as shown in FIG. 17 for the second shutter time /v after the opening of the shutter is also F12/v. The foreground component of the seventh pixel from the left-hand side as shown in FIG. 17 for the third shutter time /v after the opening of the shutter and the foreground component of the eighth pixel from the left-hand side as shown in FIG. 17 for the fourth shutter time /v after the opening of the shutter are F12/v.

The foreground component of the fifth pixel from the left-hand side of the frame #n as shown in FIG. 17 for the second shutter time /v after the opening of the shutter is F11/v, and the foreground component of the sixth pixel from the left-hand side as shown in FIG. 17 for the third shutter time /v after the opening of the shutter is also F11/v. The foreground component of the seventh pixel from the left-hand side as shown in FIG. 17 for the fourth shutter time /v after the opening of the shutter is F11/v.

The foreground component of the fifth pixel from the left-hand side of the frame #n as shown in FIG. 17 for the third shutter time /v after the opening of the shutter is F10/v, and the foreground component of the sixth pixel from the left-hand side as shown in FIG. 17 for the fourth shutter time /v after the opening of the shutter is also F10/v. The foreground component of the fifth pixel from the left-hand side as shown in FIG. 17 for the fourth shutter time /v after the opening of the shutter is F09/v.

Since the object of the background is stationary, the background component of the sixth pixel from the left-hand side of the frame #n as shown in FIG. 17 for the first shutter time /v after the opening of the shutter is B05/v. The background component of the seventh pixel from the left-hand side of the frame #n as shown in FIG. 17 for the first and second shutter times/v after the opening of the shutter is B06/v. The background component of the eighth pixel from the left-hand side of the frame #n as shown in FIG. 17 for the first through third shutter times/v after the opening of the shutter is B07/v.

In the frame #n shown in FIG. 17, the sixth through eighth pixels from the left-hand side fall within the mixed area which is a covered background area.

In the frame #n shown in FIG. 17, the ninth through twelfth pixels, falling within the background area, have respectively B08 through B11.

In the frame #n+1 shown in FIG. 17, the leftmost through ninth pixels from the left-hand side fall within the foreground area. In the foreground area of the frame #n+1, the foreground component for the shutter time /v is one of F01/v through F12/v.

Since it is assumed that the foreground object is a solid body and moves at a constant speed and the image of the foreground moves and then rightwardly appears on the next frame by 4 pixels from the original position in any given frame, the foreground component of the ninth pixel from the left-hand side of the frame #n+1 as shown in FIG. 17 for the first shutter time /v after the opening of the shutter is F12/v, and the foreground component of the tenth pixel from the left-hand side as shown in FIG. 17 for the second shutter time /v after the opening of the shutter is also F12/v. The foreground component of the eleventh pixel from the left-hand side as shown in FIG. 17 for the third shutter time /v after the opening of the shutter and the foreground component of the twelfth pixel from the left-hand side as shown in FIG. 17 for the fourth shutter time /v after the opening of the shutter are F12/v.

The foreground component of the ninth pixel from the left-hand side of the frame #n+1 as shown in FIG. 17 for the second shutter time /v after the opening of the shutter is F11/v, and the foreground component of the tenth pixel from the left-hand side as shown in FIG. 17 for the third shutter time /v after the opening of the shutter is also F11/v. The foreground component of the eleventh pixel from the left-hand side as shown in FIG. 17 for the fourth shutter time /v after the opening of the shutter is F11/v.

The foreground component of the ninth pixel from the left-hand side of the frame #n+1 as shown in FIG. 17 for the third shutter time /v after the opening of the shutter is F10/v, and the foreground component of the tenth pixel from the left-hand side as shown in FIG. 17 for the fourth shutter time /v after the opening of the shutter is also F10/v. The foreground component of the ninth pixel from the left-hand side of the frame #n+1 as shown in FIG. 17 for the fourth shutter time /v after the opening of the shutter is F09/v.

Since the object of the background is stationary, the background component of the tenth pixel from the left-hand side of the frame #n+1 as shown in FIG. 17 for the first shutter time /v after the opening of the shutter is B09/v. The background component of the eleventh pixel from the left-hand side of the frame #n+1 as shown in FIG. 17 for the first and second shutter times/v after the opening of the shutter is B10/v. The background component of the twelfth pixel from the left-hand side of the frame #n+1 as shown in FIG. 17 for the first through third shutter times/v after the opening of the shutter is B11/v.

In the frame #n+1 shown in FIG. 17, the tenth through twelfth pixels from the left-hand side fall within the mixed area which is a covered background area.

Figure 18:
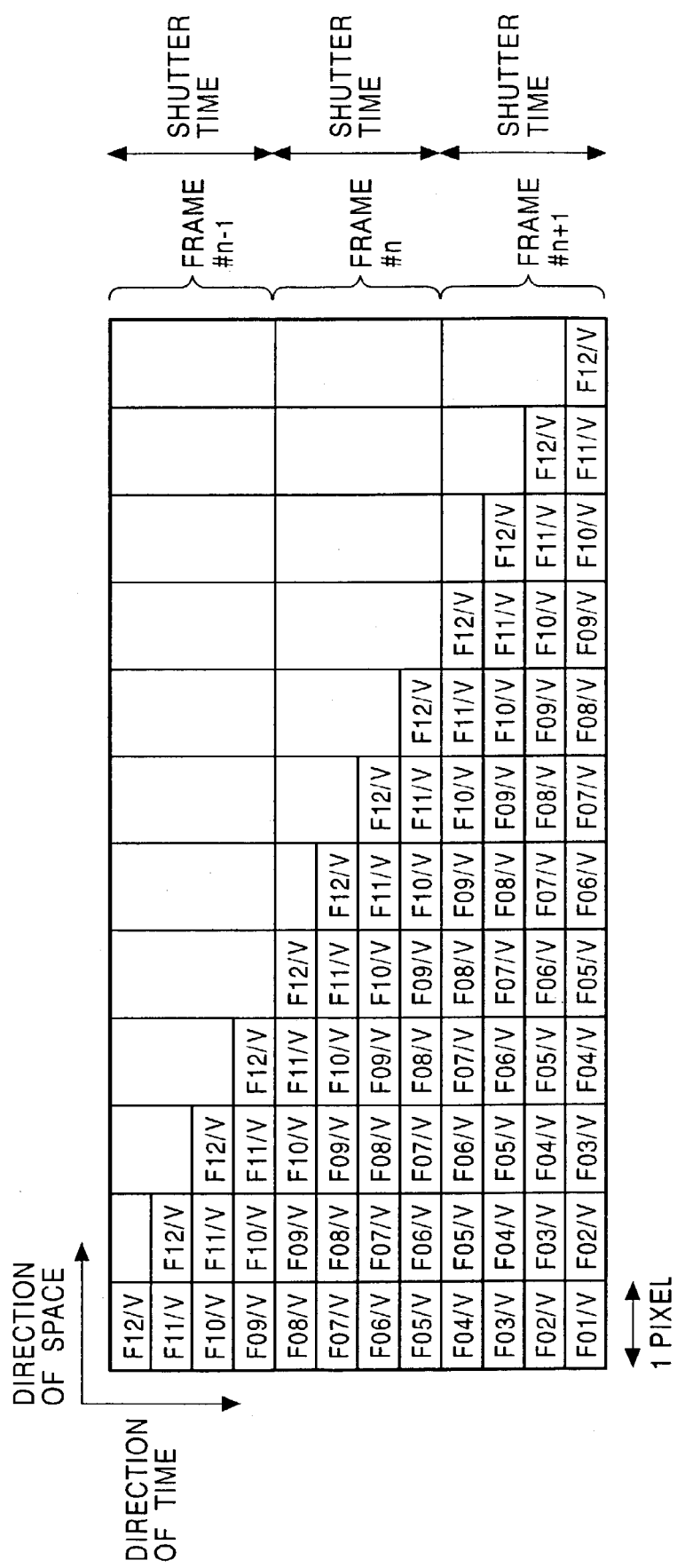
FIG. 18 is a model diagram illustrating the pixel values developed in the time axis for the duration of time, which is divided and corresponds to the shutter time.

FIG. 18 is a model diagram of an image in which the foreground component is extracted from the pixel values illustrated in FIG. 17.

Figure 19:
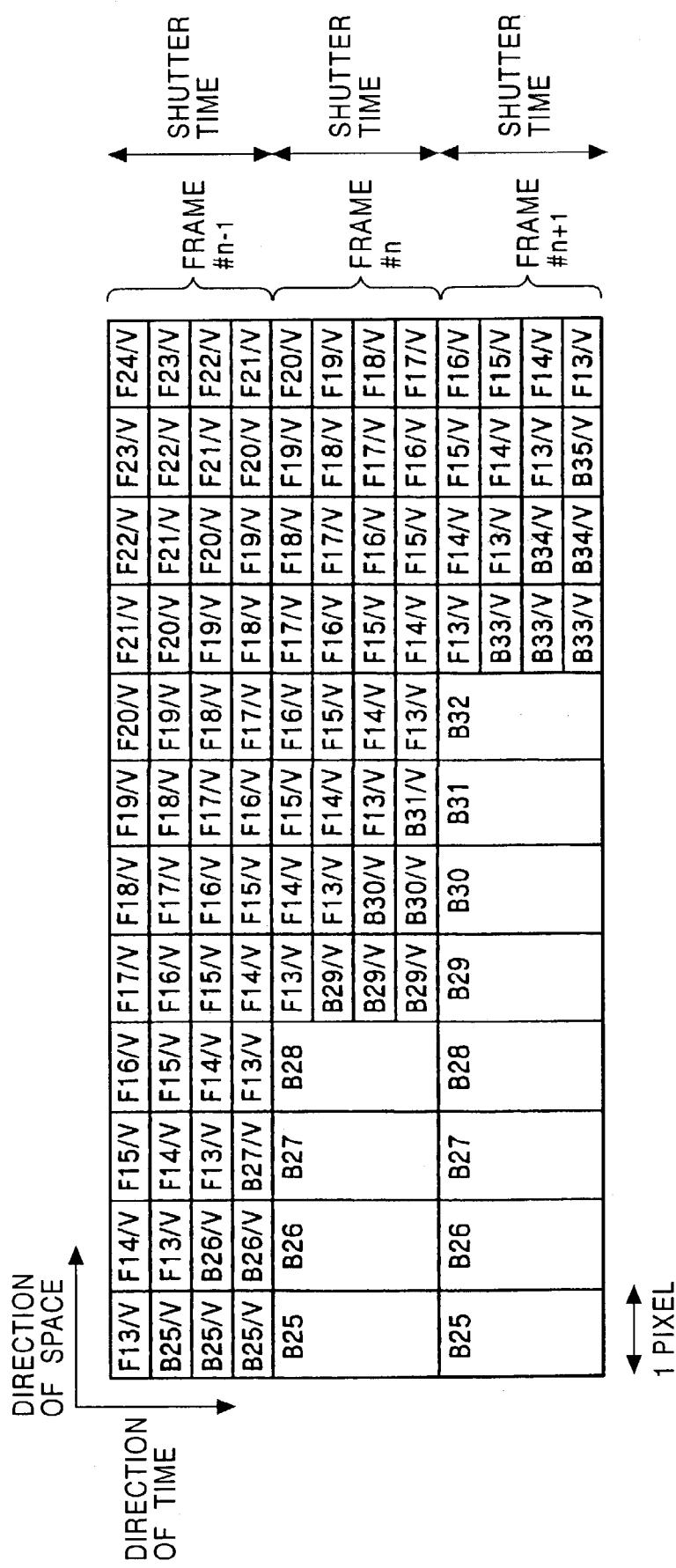
FIG. 19 is a model diagram illustrating the pixel values developed in the time axis for the duration of time, which is divided and corresponds to the shutter time.

FIG. 19 is a model diagram illustrating the pixel values of a line of pixels at the same position across three frames developed in time axis, wherein the object of a still background and the object of a foreground moving rightwardly as shown are captured. The model illustrated in FIG. 19 contains an uncovered background area.

It is assumed in FIG. 19 that the foreground object is a solid body, and moves at a constant speed. Since the image of the foreground moves and rightwardly appears by 4 pixels on the next frame, the amount of movement v is 4.

For example, the foreground component of the leftmost pixel in the frame #n−1 as shown in FIG. 19 for the first shutter time /v after the opening of the shutter is F13/v, and the foreground component of the second pixel from the left-hand side as shown in FIG. 19 for the second shutter time /v after the opening of the shutter is also F13/v. The foreground component of the third pixel from the left-hand side as shown in FIG. 19 for the third shutter time /v after the opening of the shutter and the foreground component of the fourth pixel from the left-hand side as shown in FIG. 19 for the fourth shutter time /v after the opening of the shutter become F13/v.

The foreground component of the second pixel from the left-hand side of the frame #n−1 as shown in FIG. 19 for the first shutter time /v after the opening of the shutter is F14/v, and the foreground component of the third pixel from the left-hand side as shown in FIG. 19 for the second shutter time /v after the opening of the shutter is also F14/v. The foreground component of the third pixel from the left-hand side as shown in FIG. 19 for the first shutter time /v after the opening of the shutter becomes F15/v.

Since the background object is still, the background component of the leftmost pixel in the frame #n−1 as shown in FIG. 19 for the second through fourth shutter times/v is B25/v. The background object of the second pixel from the left-hand side of the frame #n−1 as shown in FIG. 19 for the third and fourth shutter times/v after the opening of the shutter is B26/v. The background object of the third pixel from the left-hand side of the frame #n−1 as shown in FIG. 19 for the fourth shutter time /v after the opening of the shutter is B27/v.

In the frame #n−1 as illustrated in FIG. 19, the leftmost through third pixels fall within the mixed area, which is the uncovered background area.

In the frame #n−1 as illustrated in FIG. 19, the fourth through twelfth pixels fall within the foreground area. The foreground component in the frame is one of F13/v through F24/v.

In the frame #n as illustrated in FIG. 19, the leftmost through fourth pixels fall within the background area, and the pixel values thereof are respectively B25 through B28.

Since it is assumed that the foreground object is a solid body and moves at a constant speed and the image of the foreground moves and rightwardly appears on the next frame by 4 pixels from the original position in any given frame, the foreground component of the fifth pixel from the left-hand side of the frame #n as shown in FIG. 19 for the first shutter time /v after the opening of the shutter is F13/v, and the foreground component of the sixth pixel from the left-hand side as shown in FIG. 19 for the second shutter time /v after the opening of the shutter is also F13/v. The foreground component of the seventh pixel from the left-hand side as shown in FIG. 19 for the third shutter time /v after the opening of the shutter and the foreground component of the eighth pixel from the left-hand side as shown in FIG. 19 for the fourth shutter time /v after the opening of the shutter are F13/v.

The foreground component of the sixth pixel from the left-hand side of the frame #n as shown in FIG. 19 for the first shutter time /v after the opening of the shutter is F14/v, and the foreground component of the seventh pixel from the left-hand side as shown in FIG. 19 for the second shutter time /v after the opening of the shutter is also F14/v. The foreground component of the eighth pixel from the left-hand side as shown in FIG. 19 for the first shutter time /v after the opening of the shutter is F15/v.

Since the object of the background is stationary, the background component of the fifth pixel from the left-hand side of the frame #n as shown in FIG. 19 for the second through fourth shutter times/v after the opening of the shutter is B29/v. The background component of the sixth pixel from the left-hand side of the frame #n as shown in FIG. 19 for the third and fourth shutter times/v after the opening of the shutter is B30/v. The background component of the seventh pixel from the left-hand side of the frame #n as shown in FIG. 19 for the fourth shutter time /v after the opening of the shutter is B31/v.

In the frame #n shown in FIG. 19, the fifth through seventh pixels from the left-hand side fall within the mixed area which is a covered background area.

In the frame #n shown in FIG. 19, the eighth through twelfth pixels fall within the foreground area. The pixel value in the foreground area in the frame #n for the shutter time /v is one of F13/v through F20/v.

The leftmost through eighth pixels in the frame #n+1 as shown in FIG. 9 belong to the background area, and the pixel values thereof are respectively B25 through B32.

Since it is assumed that the foreground object is a solid body and moves at a constant speed and the image of the foreground moves and then rightwardly appears on the next frame by 4 pixels from the original position in any given frame, the foreground component of the ninth pixel from the left-hand side of the frame #n+1 as shown in FIG. 19 for the first shutter time /v after the opening of the shutter is F13/v, and the foreground component of the tenth pixel from the left-hand side as shown in FIG. 19 for the second shutter time /v after the opening of the shutter is also F13/v. The foreground component of the eleventh pixel from the left-hand side as shown in FIG. 19 for the third shutter time /v after the opening of the shutter and the foreground component of the twelfth pixel from the left-hand side as shown in FIG. 19 for the fourth shutter time /v after the opening of the shutter are F13/v.

The foreground component of the tenth pixel from the left-hand side of the frame #n+1 as shown in FIG. 19 for the first shutter time /v after the opening of the shutter is F14/v, and the foreground component of the eleventh pixel from the left-hand side as shown in FIG. 19 for the second shutter time /v after the opening of the shutter is also F14/v. The foreground component of the twelfth pixel from the left-hand side as shown in FIG. 19 for the first shutter time /v after the opening of the shutter is F15/v.

Since the object of the background is stationary, the background component of the ninth pixel from the left-hand side of the frame #n+1 as shown in FIG. 19 for the second through fourth shutter times/v after the opening of the shutter is B33/v. The background component of the tenth pixel from the left-hand side of the frame #n+1 as shown in FIG. 19 for the third and fourth shutter times/v after the opening of the shutter is B34/v. The background component of the eleventh pixel from the left-hand side of the frame #n+1 as shown in FIG. 19 for the fourth shutter time /v after the opening of the shutter is B35/v.

In the frame #n+1 shown in FIG. 19, the ninth through eleventh pixels from the left-hand side fall within the mixed area which is an uncovered background area.

In the frame #n+1 shown in FIG. 19, the twelfth pixel falls within the foreground area. The foreground component in the foreground area in the frame #n+1 for the shutter time /v is one of F13/v through F16/v.

Figure 20:
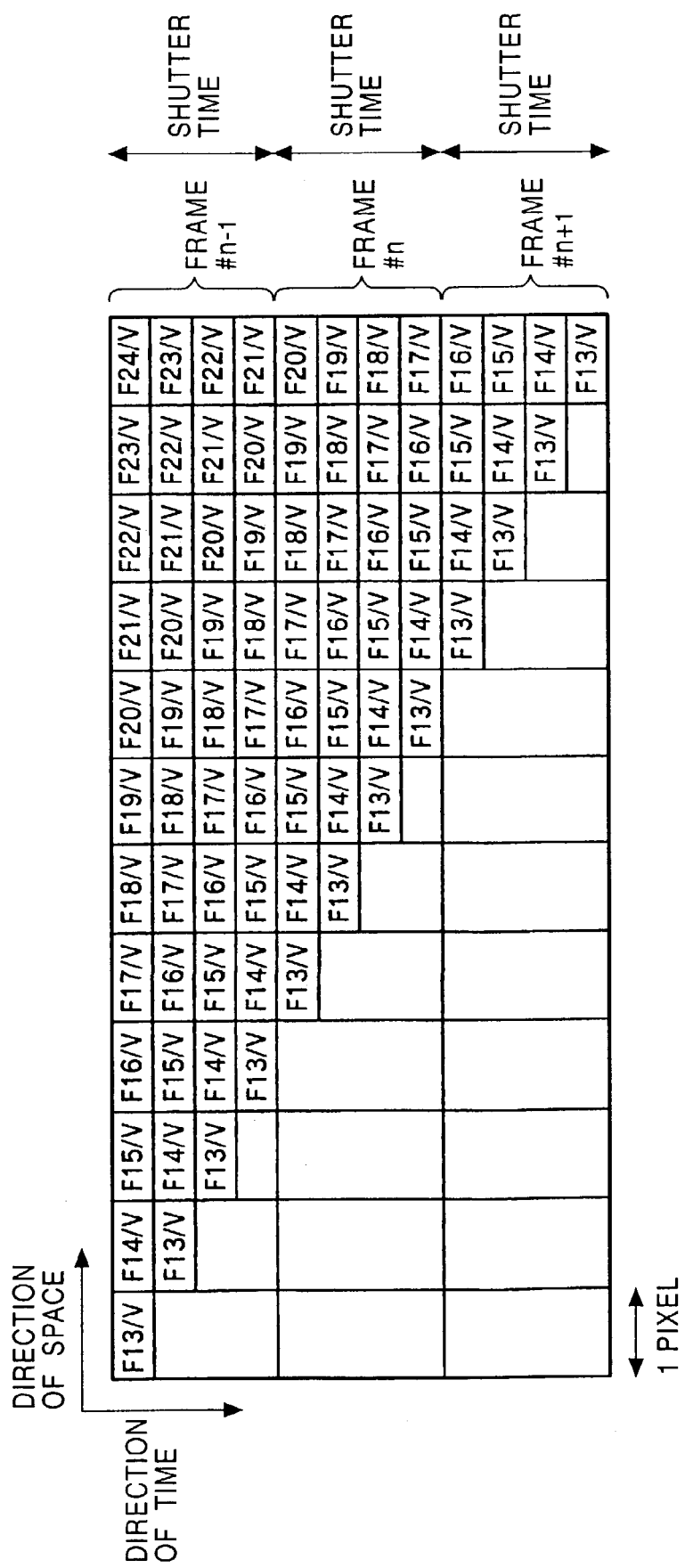
FIG. 20 is a model diagram illustrating the pixel values developed in the time axis for the duration of time, which is divided and corresponds to the shutter time.

FIG. 20 is a model diagram of an image in which the foreground component is extracted from the pixel values illustrated in FIG. 19.

Returning to FIG. 4, the area determiner 103 uses the pixel values of a plurality of frames, and associates each pixel with a flag indicating which one of the foreground area, the background area, the covered background area, and the uncovered background area the pixel belongs to, and feeds the flag as the area information to the mixture ratio calculator 104 and the motion blur adjuster 106.

Based on the pixel values in the plurality of frames and the area information, the mixture ratio calculator 104 calculates the mixture ratio $\alpha$ for each pixel contained in the mixed area, and feeds the calculated mixture ratio $\alpha$ to the foreground and background separator 105.

Based on the pixel values in the plurality of frames, the area information, and the mixture ratio $\alpha$, the foreground and background separator 105 extracts the foreground component image formed of the foreground component only, and supplies the motion blur adjuster 106 with the foreground component image.

The motion blur adjuster 106 adjusts the amount of motion blur contained in the foreground component image, based on the foreground component image supplied from the foreground and background separator 105, the motion vector supplied from the motion detector 102, and the area information supplied from the area determiner 103, and outputs the foreground component image with the amount of motion blur thereof adjusted.

Figure 21:
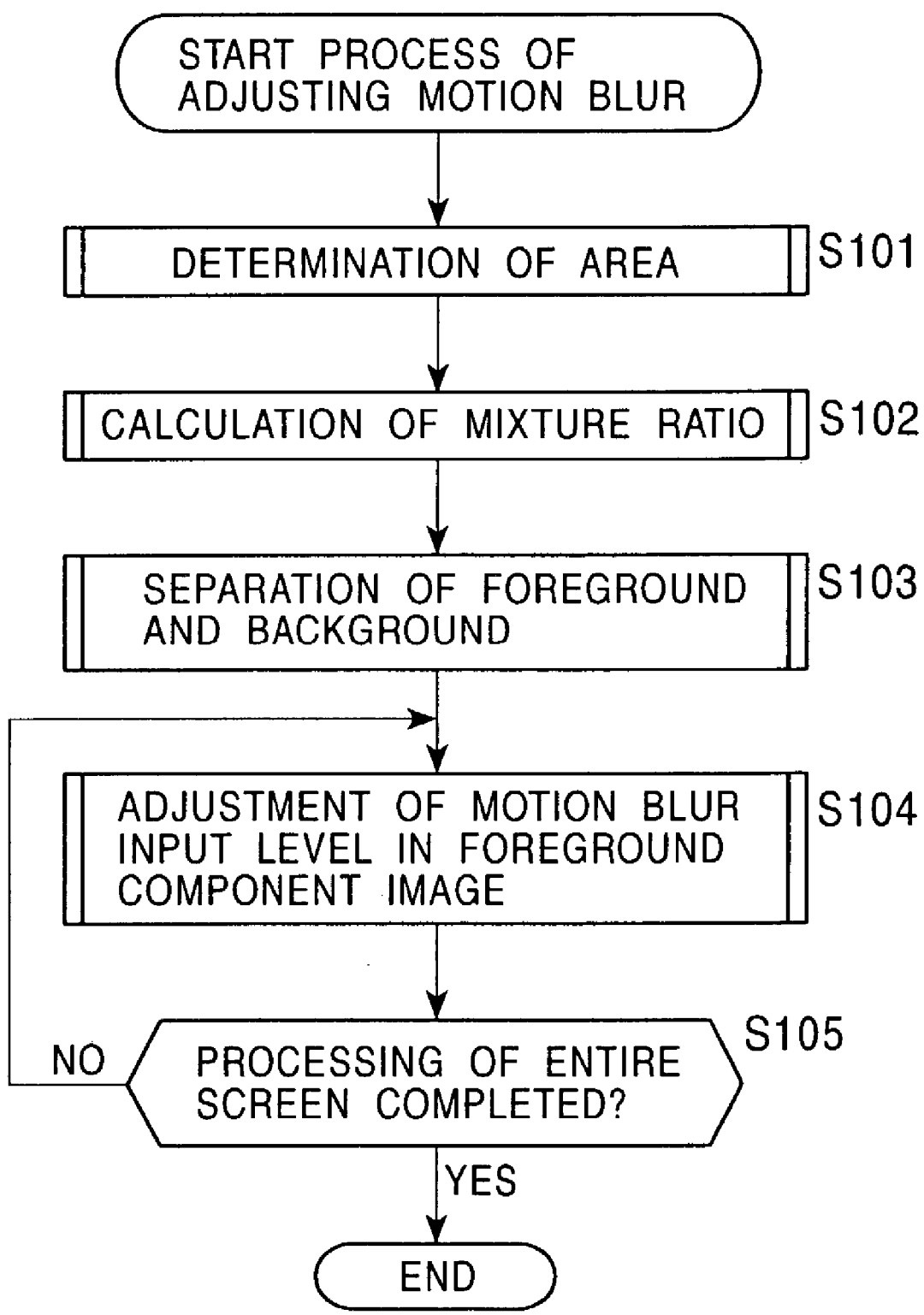
FIG. 21 is a flow diagram illustrating the process of adjusting the amount of motion blur.

The process of the signal processor 12 for adjusting the amount of motion blur is discussed below with reference to a flow diagram illustrated in FIG. 21. In step S11, the area determiner 103 performs the area determination process in response to the input image to generate the area information which indicates which one of the foreground area, the background area, the covered background area, and the uncovered background area, each pixel of the input image belongs to. The detail of the area determination process will be discussed later. The area determiner 103 supplies the mixture ratio calculator 104 with the generated area information.

In step S11, the area determiner 103 may generate the area information for each pixel of the input image based on the input image concerning which one of the foreground area, the background area, and the mixed area (with no distinction made between the covered background area and the uncovered background area) each pixel belongs to. In this case, based on the direction of the motion vector, the foreground and background separator 105 and the motion blur adjuster 106 determines whether the mixed area is the covered background area or the uncovered background area. For example, when the foreground area, the mixed area, and the background are arranged in that order in alignment with the direction of the motion vector, the mixed area is determined to be the covered background area. When the background area, the mixed area, and the foreground area are arranged in that order in alignment with the direction of the motion vector, the mixed area is determined to be the uncovered background area.

In step S12, the mixture ratio calculator 104 calculates the mixture ratio $\alpha$ for each pixel contained in the mixed area based on the input image and the area information. The process for the calculating the mixture ratio will be detailed later. The mixture ratio calculator 104 supplies the foreground and background separator 105 with the calculated mixture ratio $\alpha$.

In step S13, the foreground and background separator 105 extracts the foreground component from the input image based on the area information and the mixture ratio $\alpha$, and supplies the motion blur adjuster 106 with the calculated mixture ratio $\alpha$.

In step S14, the motion blur adjuster 106 generates the unit of processing of pixels consecutively arranged in the direction of movement based on the motion vector and the area information, wherein the unit of processing of the pixels indicates the location thereof in the image while belonging to one of the uncovered background area, the foreground area, and the covered background area. The motion blur adjuster 106 adjusts the amount of motion blur contained in the foreground component corresponding to the unit of processing. The adjustment process of the amount of motion blur will be detailed later.

In step S15, the signal processor 12 determines whether the motion blur adjustment process has been completed for the entire screen. When it is determined in step S15 that the motion blur adjustment process is not yet completed, the process loops to step S14, in which the adjustment process of the amount of motion blur is repeated for the foreground component corresponding to the unit of processing.

The routine ends when it is determined in step S15 that the motion blur adjustment process is complete.

In this way, the signal processor 12 separates the foreground from the background, and adjusts the amount of motion blur contained in the foreground. Specifically, the signal processor 12 adjusts the amount of motion blur contained in sampled data which is the pixel value of the pixel of the foreground.

The construction of each of the area determiner 103, the mixture ratio calculator 104, the foreground and background separator 105, and the motion blur adjuster 106 is discussed below.

Figure 22:
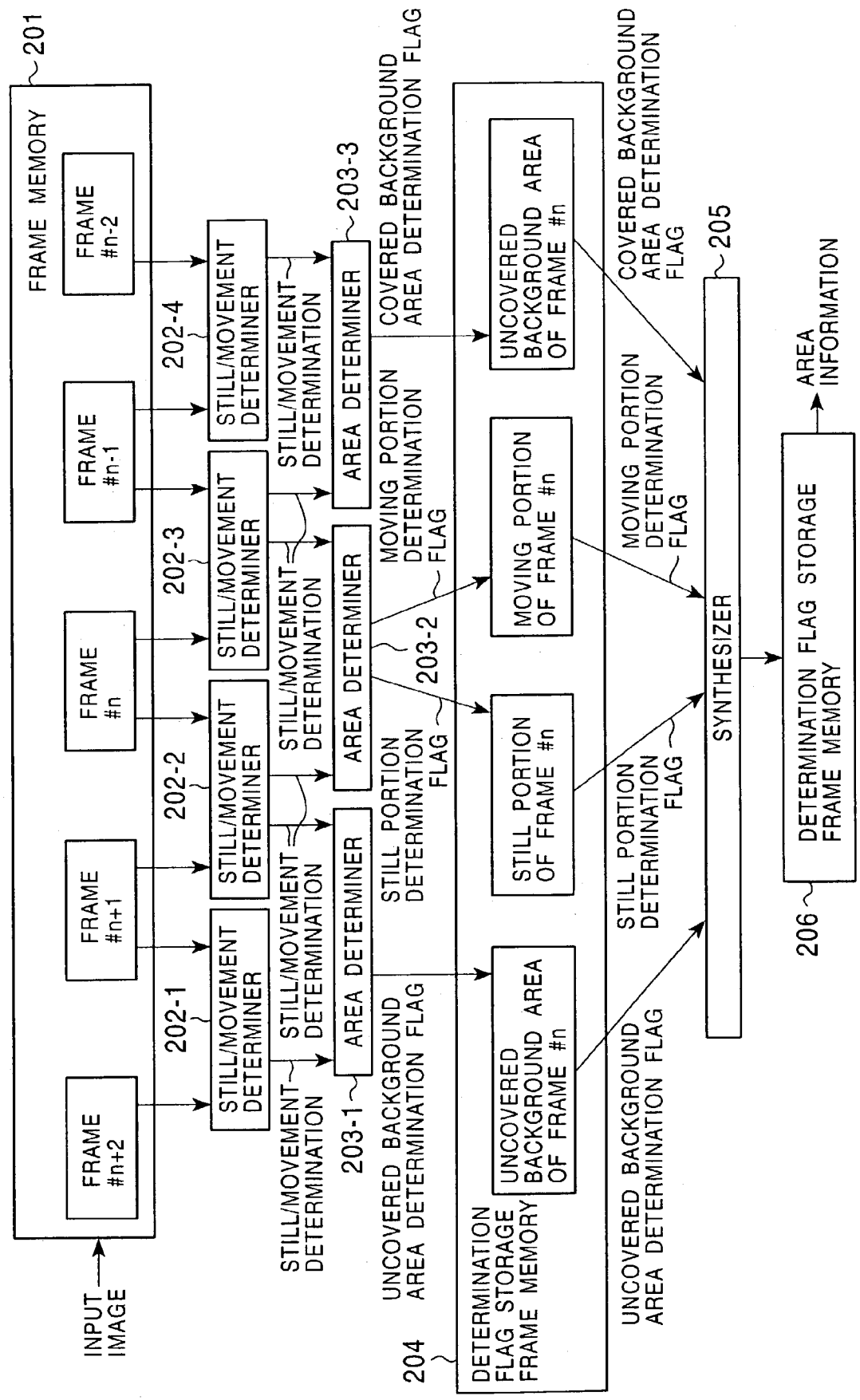
FIG. 22 is a block diagram illustrating the construction of an area determiner 103.

FIG. 22 is a block diagram illustrating the construction of the area determiner 103. The area determiner 103 illustrated in FIG. 22 uses no motion vector. A frame memory 201 stores the input image in units of frame. When a frame #n is processed, the frame memory 201 stores a frame #n−2 which is input two frames earlier than the frame #n, a frame #n−1 which is input one frame earlier than the frame #n, the frame #n, a frame #n+1 which is input one frame later than the frame #n, and a frame #n+2 which is input two frames later than the frame #n.

A still/movement determiner 202-1 reads, from the frame memory 201, the pixel value of a pixel in the frame #n+2 at the same position as that of a pixel in the image to be determined for area in the frame #n, and the pixel value of a pixel in the frame #n+1 at the same position as that of the pixel in the image to be determined for area in the frame #n, and calculates an absolute value of a difference between the read pixel values. The still/movement determiner 202-1 determines whether the absolute value of the difference between the pixel value of the frame #n+2 and the pixel value of the frame #n+1 is greater than a predetermined threshold Th. When the still/movement determiner 202-1 determines that the absolute value of the difference is greater than threshold Th, the still/movement determiner 202-1 supplies an area determiner 203-1 with a determination indicating a movement. When the still/movement determiner 202-1 determines that the absolute value of the difference is equal to or smaller than the threshold Th, the still/movement determiner 202-1 supplies the area determiner 203-1 with a determination indicating stillness.

A still/movement determiner 202-2 reads, from the frame memory 201, the pixel value of a pixel in the frame #n+1 at the same position as that of the pixel in the image to be determined for area in the frame #n, and the pixel value of the pixel in the image to be determined for area in the frame #n, and calculates the absolute value of a difference between the pixel values. The still/movement determiner 202-2 determines whether the absolute value of the difference between the pixel value of the frame #n+1 and the pixel value of the frame #n is greater than a predetermined threshold Th. When the still/movement determiner 202-2 determines that the absolute value of the difference is greater than the threshold Th, the still/movement determiner 202-2 supplies the area determiner 203-1 and an area determiner 203-2 with a determination indicating a movement. When the still/movement determiner 202-2 determines that the absolute value of the difference is equal to or smaller than the threshold Th, the still/movement determiner 202-2 supplies the area determiner 203-1 and an area determiner 203-2 with a determination indicating stillness.

A still/movement determiner 202-3 reads, from the frame memory 201, the pixel value of the pixel in the image to be determined for area in the frame #n, and the pixel value of a pixel in the frame #n−1 at the same position as that of the pixel in the image to be determined for area in the frame #n, and calculates the absolute value of a difference between the read pixel values. The still/movement determiner 202-3 determines whether the absolute value of the difference between the pixel value of the frame #n and the pixel value of the frame #n−1 is greater than the predetermined threshold Th. When the still/movement determiner 202-3 determines that the absolute value of the difference is greater than the threshold Th, the still/movement determiner 202-3 supplies the area determiner 203-2 and an area determiner 203-3 with a determination indicating a movement. When the still/movement determiner 202-3 determines that the absolute value of the difference is equal to or smaller than the threshold Th, the still/movement determiner 202-3 supplies the area determiner 203-2 and the area determiner 203-3 with a determination indicating stillness.

A still/movement determiner 202-4 reads, from the frame memory 201, the pixel value of the pixel in the frame #n−1 at the same position as that of the pixel in the image to be determined for area in the frame #n, and the pixel value of a pixel in the frame #n−2 at the same position as that of the pixel in the image to be determined for area in the frame #n, and calculates the absolute value of a difference between the read pixel values. The still/movement determiner 202-4 determines whether the absolute value of the difference between the pixel value of the frame #n−1 and the pixel value of the frame #n−2 is greater than the predetermined threshold Th. When the still/movement determiner 202-4 determines that the absolute value of the difference is greater than the threshold Th, the still/movement determiner 202-4 supplies the area determiner 203-3 with a determination indicating a movement. When the still/movement determiner 202-4 determines that the absolute value of the difference is equal to or smaller than the threshold Th, the still/movement determiner 202-4 supplies the area determiner 203-3 with a determination indicating stillness.

When the still/movement determination provided by the still/movement determiner 202-1 indicates stillness and when the still/movement determination provided by the still/movement determiner 202-2 indicates movement, the area determiner 203-1 determines that the pixel to be determined for area in the frame #n fall within the uncovered background, and sets an uncovered background area determination flag for the pixel to be determined for area to "1" to indicate that the pixel belongs to the uncovered background area.

When the still/movement determination provided by the still/movement determiner 202-1 indicates movement or when the still/movement determination provided by the still/movement determiner 202-2 indicates stillness, the area determiner 203-1 determines that the pixel to be determined for area in the frame #n does not fall within the uncovered background area, and sets an uncovered background area determination flag for the pixel to be determined for area to "0" to indicate that the pixel does not belong to the uncovered background area.

The area determiner 203-1 feeds the uncovered background area determination flag set to be "1" or "0" to the determination flag storage frame memory 204.

When the still/movement determination provided by the still/movement determiner 202-2 indicates stillness and when the still/movement determination provided by the still/movement determiner 202-3 indicates stillness, the area determiner 203-2 determines that the pixel to be determined for area in the frame #n falls within a still portion, and sets a still portion determination flag for the pixel to be determined for area to "1" to indicate that the pixel belongs to the still portion.

When the still/movement determination provided by the still/movement determiner 202-2 indicates movement or when the still/movement determination provided by the still/movement determiner 202-3 indicates movement, the area determiner 203-2 determines that the pixel to be determined for area in the frame #n does not fall within a still portion, and sets the still portion determination flag for the pixel to be determined for area to "0" to indicate that the pixel does not belong to the still portion.

The area determiner 203-2 feeds the still portion determination flag set to be "1" or "0" to the determination flag storage frame memory 204.

When the still/movement determination provided by the still/movement determiner 202-2 indicates movement and when the still/movement determination provided by the still/movement determiner 202-3 indicates movement, the area determiner 203-2 determines that the pixel to be determined for area in the frame #n fall within a moving portion, and sets a moving portion determination flag for the pixel to be determined to "1" to indicate that the pixel belongs to the moving portion.

When the still/movement determination provided by the still/movement determiner 202-2 indicates stillness or when the still/movement determination provided by the still/movement determiner 202-3 indicates stillness, the area determiner 203-2 determines that the pixel to be determined for area in the frame #n does not fall within the moving portion, and sets the moving portion determination flag for the pixel to be determined to "0" to indicate that the pixel does not belong to the moving portion.

The area determiner 203-2 feeds the moving portion determination flag set to be "1" or "0" to the determination flag storage frame memory 204.

When the still/movement determination provided by the still/movement determiner 202-3 indicates movement and when the still/movement determination provided by the still/movement determiner 202-4 indicates stillness, the area determiner 203-3 determines that the pixel to be determined for area in the frame #n falls within a covered background area, and sets a covered background area determination flag for the pixel to be determined for area to "1" to indicate that the pixel belongs to the covered background area.

When the still/movement determination provided by the still/movement determiner 202-3 indicates stillness or when the still/movement determination provided by the still/movement determiner 202-4 indicates movement, the area determiner 203-3 determines that the pixel to be determined for area in the frame #n does not fall within the covered background area, and sets the covered background area determination flag for the pixel to be determined for area to "0" to indicate that the pixel does not belong to the covered background area.

The area determiner 203-3 feeds the covered background area determination flag set to be "1" or "0" to the determination flag storage frame memory 204.

The determination flag storage frame memory 204 stores the uncovered background area determination flag supplied from the area determiner 203-1, the still portion determination flag supplied from the area determiner 203-2, the moving portion determination flag supplied from the area determiner 203-2, and the covered background area determination flag supplied from the area determiner 203-3.

The determination flag storage frame memory 204 feeds, to a synthesizer 205, the uncovered background area determination flag, the still portion determination flag, the moving portion determination flag, and the covered background area determination flag, stored by itself. The synthesizer 205 generates the area information which indicates which one of the uncovered background area, the still portion, the moving portion, and the uncovered background area each pixel falls within based on the uncovered background area determination flag, the still portion determination flag, the moving portion determination flag, and the covered background area determination flag supplied from the determination flag storage frame memory 204. The generated area information is then fed to a determination flag storage frame memory 206.

The determination flag storage frame memory 206 stores the area information supplied from the synthesizer 205, while outputting the stored area information.

The process of the area determiner 103 is discussed below with reference to FIG. 23 through FIG. 27.

Figure 23:
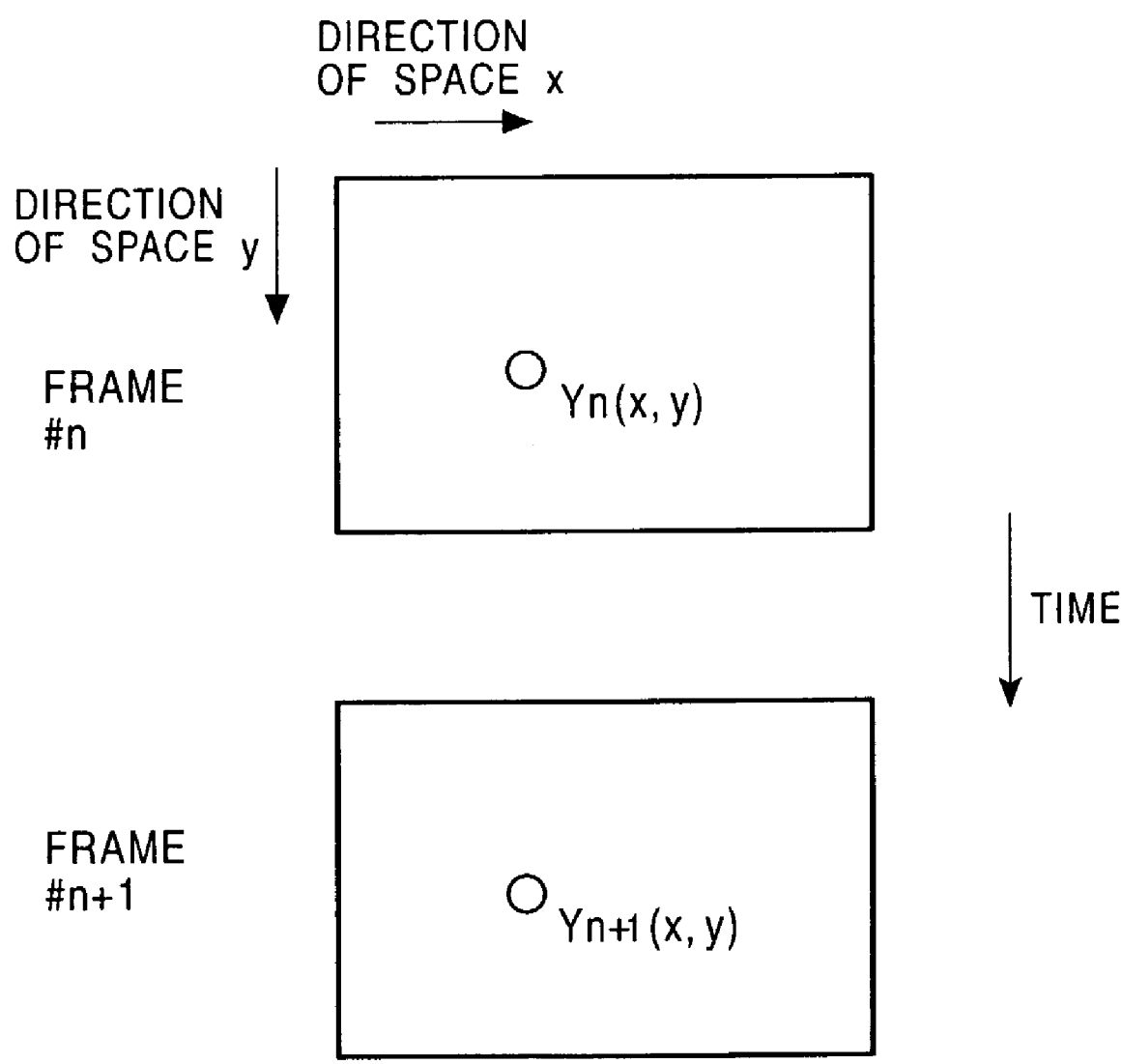
FIG. 23 illustrates an image of a moving object as the foreground.

When the object of the foreground is moving, the location of the object within the image changes every frame. Referring to FIG. 23, the image of the object, positioned at Yn(x,y) in the frame #n, is positioned at Yn+1(x,y) in a frame #n+1 which is a next frame.

Figure 24:
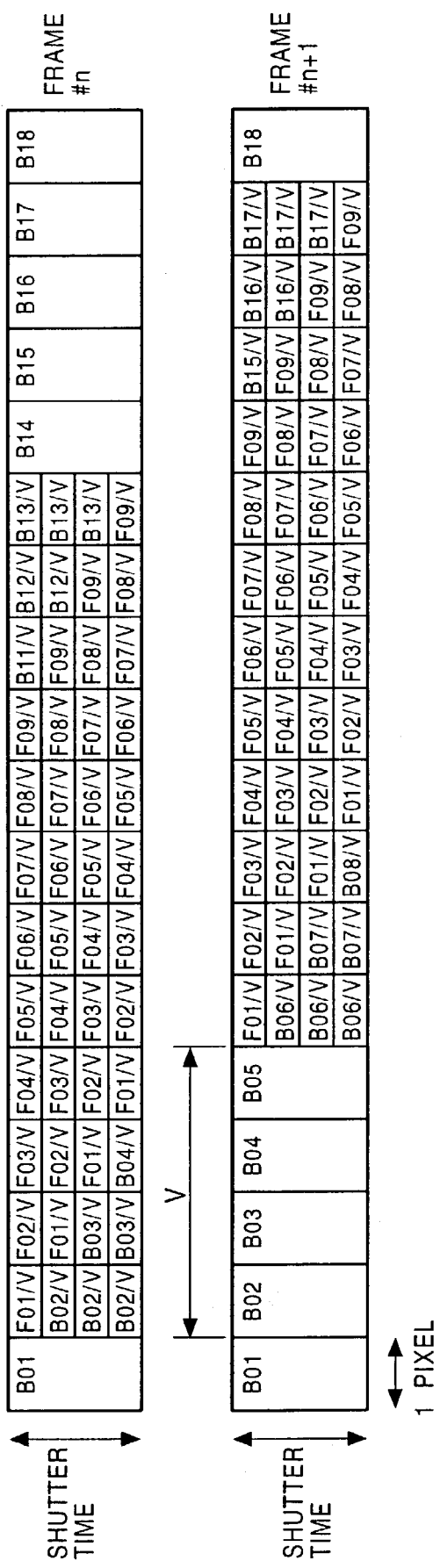
FIG. 24 is a model diagram illustrating the pixel values developed for a duration of time, which is divided and corresponds to shutter time in time axis.

FIG. 24 is a model diagram illustrating the pixel values of the pixels consecutively arranged in a line in the direction of movement of the image corresponding to the foreground object, wherein the pixel values are developed in time axis. For example, when the direction of movement of the image corresponding to the foreground object is horizontal in the screen, the pixel values of the pixels adjacently arranged in a line are developed in time axis in the model diagram shown in FIG. 24.

Referring to FIG. 24, the line in the frame #n is identical to that in the frame #n+1.

The foreground component of the object contained in the second pixel through the thirteenth pixel in the frame #n from the left-hand side thereof is contained in the sixth pixel through the seventeenth pixel in the frame #n+1 from the left-hand side thereof.

The eleventh through thirteenth pixels in the frame #n from the left-hand side thereof fall within the covered background area, and the second through fourth pixels in the frame #n from the left-hand side thereof fall within the uncovered background area. The fifteenth through seventeenth pixels in the frame #n+1 from the left-hand side thereof fall within the covered background area, and the sixth through eighth pixels in the frame #n+1 from the left-hand side thereof fall within the uncovered background area.

Since the foreground component contained in the frame #n is shifted in the frame #n+1 by 4 pixels as illustrated in FIG. 24, the amount of movement v is 4. The virtual divisor number is 4 in accordance with the amount of movement v.

Discussed next is a variation in the pixel value of a pixel belonging to a mixed area prior to and subsequent to a target frame.

Figure 25:
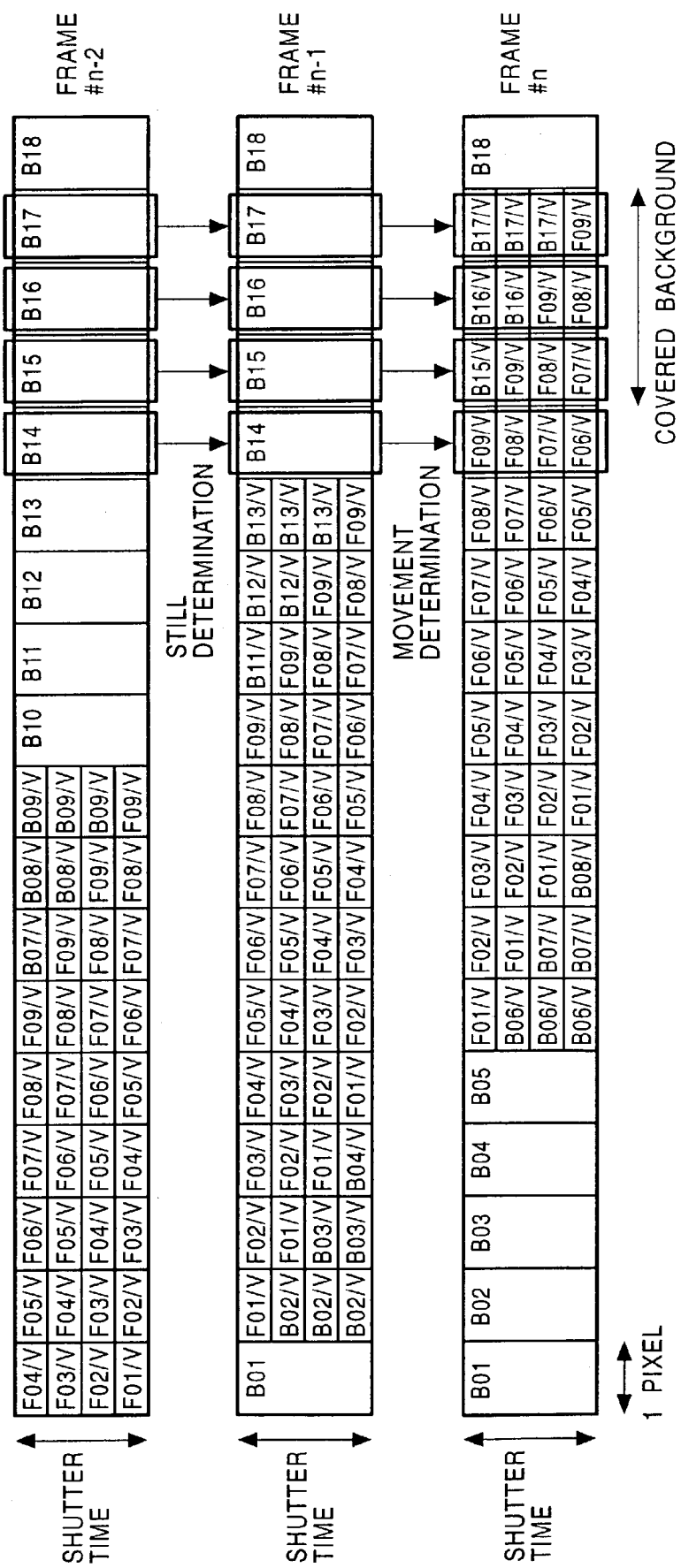
FIG. 25 is a model diagram illustrating the pixel values developed in the time axis for the duration of time, which is divided and corresponds to the shutter time.

Referring to FIG. 25, the background is stationary, and the amount of movement of the foreground is 4 in the frame #n. The fifteenth through seventeenth pixels in the frame #n from the left-hand side thereof fall within the covered background. Since the amount of movement is 4, the fifteenth through seventeenth pixels in the frame #n−1, which is one frame earlier, from the left-hand side thereof, contain the background component only, and fall within the foreground area. In the frame #n+2, which is still one frame earlier, fifteenth through seventeenth pixels from the left-hand side thereof contain the background component only, and fall within the background area.

Since the object of the background is stationary, the pixel value of the fifteenth pixel in the frame #n−1 from the left-hand side thereof remains unchanged from the pixel value of the fifteenth pixel in the frame #n−2 from the left-hand side thereof. Similarly, the pixel value of the sixteenth pixel in the frame #n−1 from the left-hand side thereof remains unchanged from the pixel value of the sixteenth pixel in the frame #n−2 from the left-hand side thereof, and the pixel value of the seventeenth pixel in the frame #n−1 from the left-hand side thereof remains unchanged from the pixel value of the seventeenth pixel in the frame #n−2 from the left-hand side thereof.

Specifically, the pixels in each of the frames #n−1 and #n−2, corresponding to the pixels belonging to the covered background area in the frame #n, contain the background component only with the pixel values thereof remaining unchanged. The absolute values of differences between the pixel values are substantially zero. Therefore, a still/movement determiner 202-4 performs the still/movement determination concerning the pixels in each of the frames #n−1 and #n−2, corresponding to the pixels belonging to the mixed area in the frame #n, thereby determining the pixels as being still.

Since the pixels falling within the covered background area in the frame #n contains foreground components, the pixel values of these pixels are different from those of the pixels having the background components only in the frame #n−1. The still/movement determiner 202-3 determines the pixels falling within the mixed area in the frame #n and the corresponding pixels in the frame #n−1 as being moving.

Upon receiving the still/movement determination indicating movement from the still/movement determiner 202-3 and the still/movement determination indicating stillness from the still/movement determiner 202-4, the area determiner 203-3 determines the corresponding pixels as falling within the covered background.

Referring to FIG. 26, the background is still, and the amount of movement of the foreground v is 4. The second through fourth pixels in the frame #n from the left-hand side thereof fall within the uncovered background area. Since the amount of movement v is 4, the second through fourth pixels in the frame #n+1, which is one frame later, from the left-hand side thereof contain the background component only, and fall within the background area. The second through fourth pixels in the frame #n+2, which is another one frame later, from the left-hand side thereof contain the background component only, and fall within the background area.

Since the object of the background area is still, the pixel value of the second pixel in the frame #n+2 from the left-hand side thereof remains unchanged from that of the second pixel in the frame #n+1 from the left-hand side thereof. Likewise, the pixel value of the third pixel in the frame #n+2 from the left-hand side thereof remains unchanged from that of the third pixel in the frame #n+1 from the left-hand side thereof, and the pixel value of the fourth pixel in the frame #n+2 from the left-hand side thereof remains unchanged from that of the fourth pixel in the frame #n+1 from the left-hand side thereof.

Specifically, the pixels in each of the frames #n+1 and #n+2, corresponding to the pixels belonging to the uncovered background area in the frame #n, contain the background component only with the pixel values thereof remaining unchanged. The absolute values of the differences between the pixel values are substantially zero. Therefore, the still/movement determiner 202-1 performs the still/movement determination concerning the pixels in each of the frames #n+1 and #n+2, corresponding to the pixels belonging to the mixed area in the frame #n, thereby determining the pixels as being still.

Since the pixels falling within the uncovered background area in the frame #n contains foreground components, the pixel values of these pixels are different from those of the pixels having the background component only in the frame #n+1. The still/movement determiner 202-2 determines the pixels falling within the mixed area in the frame #n and the corresponding pixels in the frame #n+1 as being moving.

Upon receiving the still/movement determination indicating movement from the still/movement determiner 202-2 and the still/movement determination indicating stillness from the still/movement determiner 202-1, the area determiner 203-1 determines the corresponding pixels as falling within the uncovered background.

FIG. 27 illustrates area determination conditions of the area determiner 103 in the frame #n. When the pixel in the frame #n−2, at the same position as that of a pixel in the image to be determined in the frame #n, is determined to be still with respect to the pixel in the frame,#n−1, at the same position as that of the pixel in the image to be determined in the frame #n, and when the pixel in the frame #n−1, at the same position as that of the pixel in the image to be determined in the frame #n, is determined to be moving with respect to the pixel in the frame #n, the area determiner 103 determines that the pixel in the frame #n to be determined falls within the covered background area.

When the pixel in the frame #n is determined to be still with respect to the pixel in the frame #n−1, at the same position as that of the pixel in the image to be determined in the frame #n, and when the pixel in the frame #n+1, at the same position as that of the pixel in the image to be determined in the frame #n is determined to be still with respect to the pixel in the frame #n, the area determiner 103 determines that the pixel in the frame #n to be determined falls within the still portion.

When the pixel in the frame #n is determined to be moving with respect to the pixel in the frame #n−1, at the same position as that of the pixel in the image to be determined in the frame #n, and when the pixel in the frame #n+1, at the same position as that of the pixel in the image to be determined in the frame #n is determined to be moving with respect to the pixel in the frame #n, the area determiner 103 determines that the pixel in the frame #n to be determined falls within the moving portion.

When the pixel in the frame #n+1, at the same position as that of the pixel in the image to be determined in the frame #n is determined to be moving with respect to the pixel in the frame #n, and when the pixel in the frame #n+2, at the same position as that of the pixel in the image to be determined in the frame #n is determined to be still with respect to the pixel in the frame #n+1, at the same position as that of the pixel in the image to be determined in the frame #n, the area determiner 103 determines that the pixel in the frame #n to be determined falls within the uncovered background area.

Figure 28A:
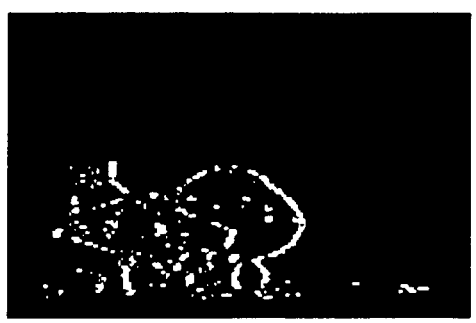
FIG. 28A illustrates the results of the area determination provided by the area, determiner 103.
Figure 28B:
FIG. 28B illustrates the results of the area determination provided by the area determiner 103.

FIG. 28A through FIG. 28D illustrate the results of the area determination provided by the area determiner 103. Referring to FIG. 28A, the pixels determined to fall within the covered background area are presented in white. Referring to FIG. 28B, the pixels determined to fall within the uncovered background area are presented in white.

Figure 28C:
FIG. 28C illustrates the results of the area determination provided by the area determiner 103.
Figure 28D:
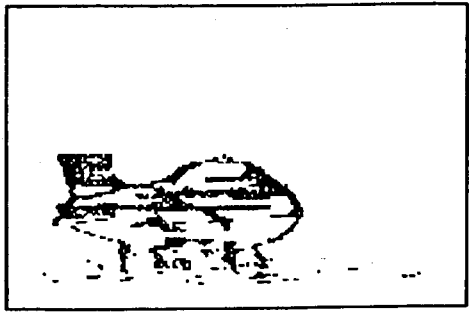
FIG. 28D illustrates the results of the area determination provided by the area determiner 103.

Referring to FIG. 28C, the pixels determined to fall within the moving portion are presented in white. Referring to FIG. 28D, the pixels determined to fall within the still portion are presented in white.

Figure 29:
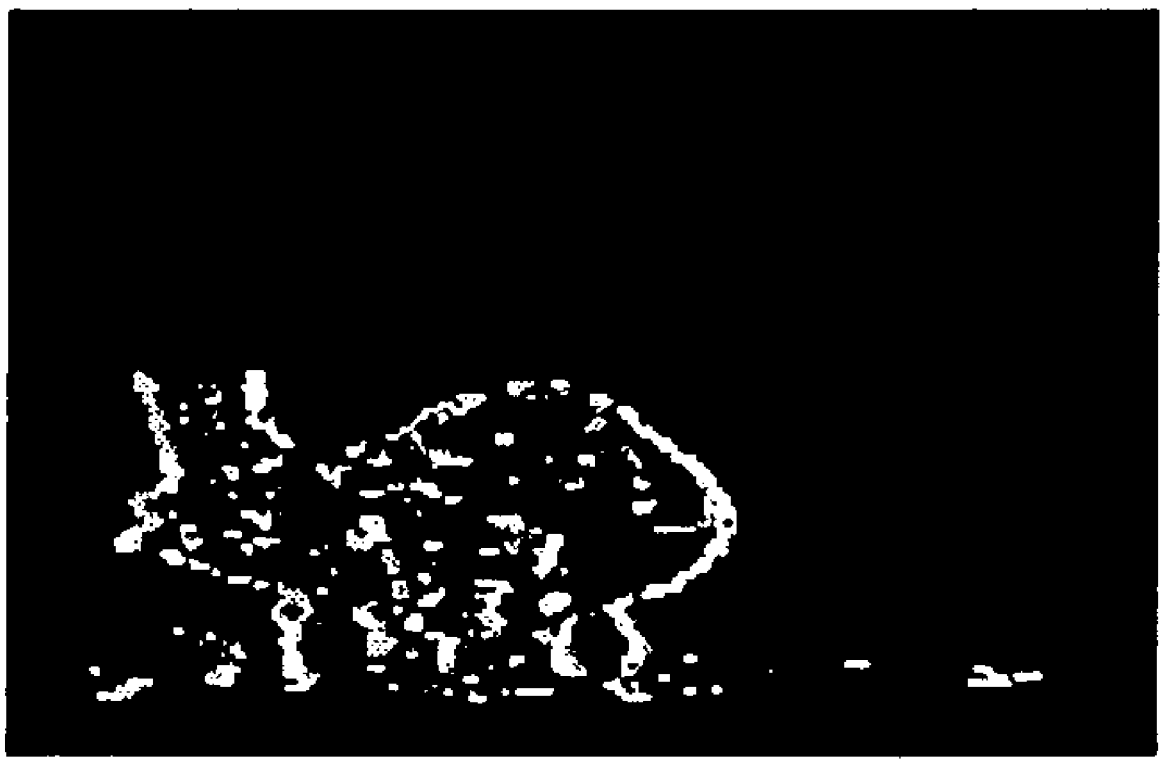
FIG. 29 illustrates the results of the area determination provided by the area determiner 103.

FIG. 29 illustrates the mixed area, in image, of the area information output from the determination flag storage frame memory 206. Referring to FIG. 29, the pixels determined to fall within the covered background area or the uncovered background area, namely, determined to fall within the mixed area, are presented in white. The area information representing the mixed area output from the determination flag storage frame memory 206 indicates the mixed area and a texture present area surrounded by a non-texture portion within the foreground area.

Figure 30:
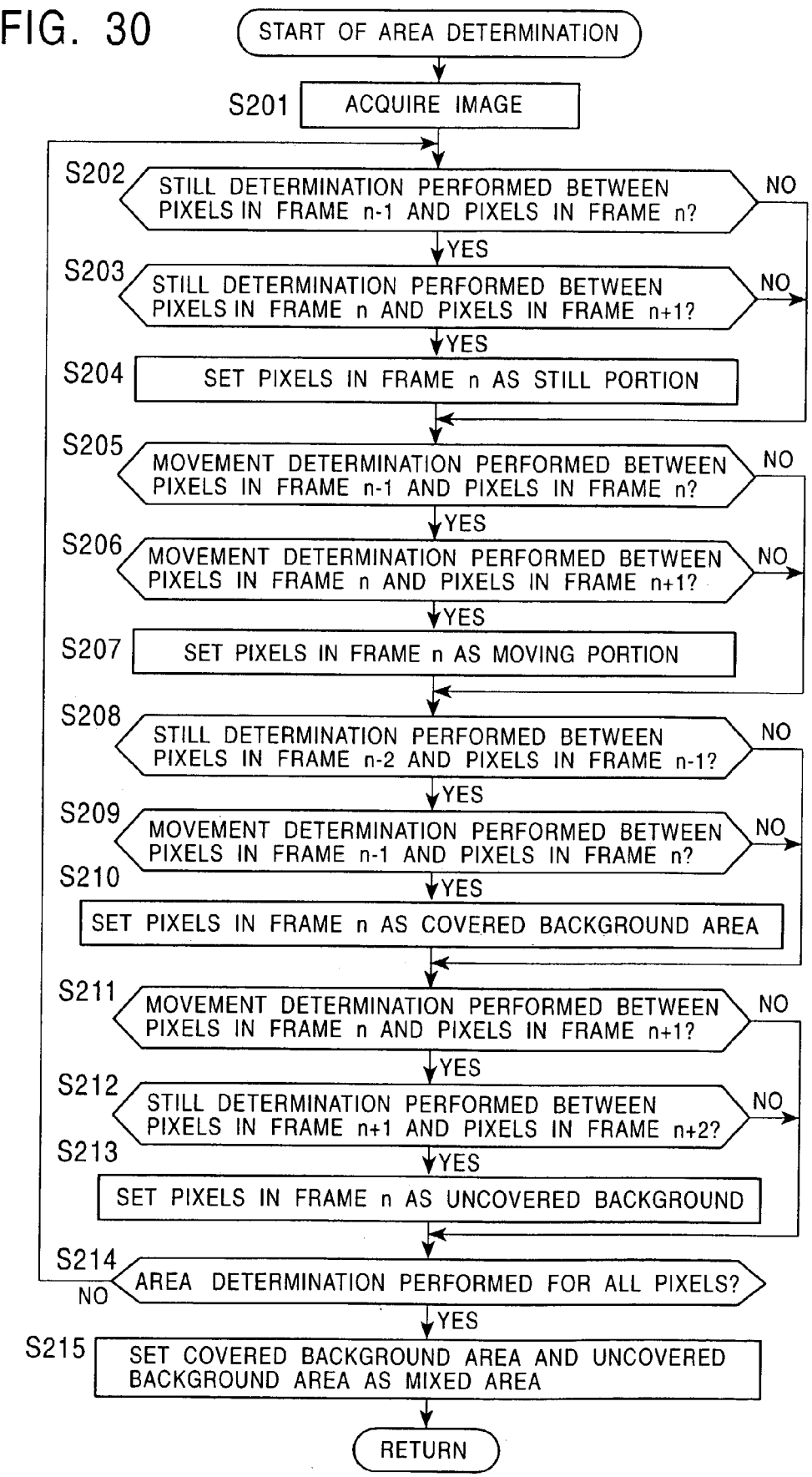
FIG. 30 is a flow diagram illustrating the process of the area determination.

Referring to a flow diagram illustrated in FIG. 30, the area determination process of the area determiner 103 is discussed below. In step S201, the frame memory 201 acquires the image containing the frame #n−2 through the frame #n+2 including the frame #n to be determined.

In step S202, the still/movement determiner 202-3 determines whether a pixel in the frame #n remains still with respect to the pixel as the same position in the frame #n. When it is determined that these pixel are still, the routine proceeds to step S203. The still/movement determiner 202-2 determines whether the pixel in the frame #n+1 remains still with respect to the pixel at the same position in the frame #n.

When it is determined in step S203 that the pixel in the frame #n+1 remains still with respect to the pixel at the same position in the frame #n, the routine proceeds to step S204. The area determiner 203-2 sets the still portion determination flag of the pixel to be determined for area to "1" to indicate that the pixel falls within the still portion. The area determiner 203-2 supplies the determination flag storage frame memory 204 with the still portion determination flag, and then routine proceeds to step S205.

When it is determined in step S202 that the pixel in the frame #n has moved with respect to the pixel at the same position in the frame #n−1, or when it is determined in step S203 that the pixel in the frame #n+1 has moved with respect to the pixel at the same position in the frame #n, the pixel in the frame #n does not fall within the still portion, and step S204 is skipped and the routine proceeds to step S205.

In step S205, the still/movement determiner 202-3 determines whether the pixel in the frame #n has moved with respect to the pixel at the same position in the frame #n−1. When it is determined that the pixels are moving, the routine proceeds to step S206. The still/movement determiner 202-2 determines whether the pixel in the frame #n+1 has moved from the pixel at the same position in the frame #n.

When it is determined in step S206 that the pixel in the frame #n+1 has moved from the pixel at the same position in the frame #n, the routine proceeds to step S207. The area determiner 203-2 sets the moving portion determination flag of the pixel to be determined to "1" to indicate that the pixel falls within the moving portion. The area determiner 203-2 supplies the determination flag storage frame memory 204 with the moving portion determination flag, and the routine proceeds to step S208.

When it is determined in step S205 that the pixel in the frame #n remains still with respect to the pixel at the same position in the frame #n−1, or when it is determined in step S206 that the pixel in the frame #n+1 remains still with respect to the pixel at the same position in the frame #n, the pixel in the frame #n does not fall within the moving portion. Step S207 is skipped, and the routine proceeds to step S208.

In step S208, the still/movement determiner 202-4 determines whether a pixel in the frame #n−1 remains still with respect to the pixel at the same position in the frame #n−2. When it is determined that these pixels are still, the routine proceeds to step S209. The still/movement determiner 202-3 determines whether the pixel in the frame #n has moved from the pixel at the same position in the frame #n−1.

When it is determined in step S209 that the pixel in the frame #n has moved from the pixel at the same position in the frame #n−1, the routine proceeds to step S210. The area determiner 203-3 sets the covered background area determination flag of the pixel to be determined to "1" to indicate that the pixels fall within the covered background. The area determiner 203-3 supplies the determination flag storage frame memory 204 with the covered background area determination flag and the routine then proceeds to step S211.

When it is determined in step S208 that the pixel in the frame #n−1 has moved from the pixel at the same position in the frame #n−2, or when it is determined in step S209 that the pixel in the frame #n remains still with respect to the pixel at the same position in the frame #n−1, the pixel in the frame #n does not fall within the covered background area. Step S210 is skipped and the routine proceeds to step S211.

In step S211, the still/movement determiner 202-2 determines whether the pixel in the frame #n+1 has moved from the pixel as the same position in the frame #n. When it is determined that the pixel has moved, the routine proceeds to step S212. The still/movement determiner 202-1 determines whether the pixel in the frame #n+2 remains still with respect to the pixel at the same position in the frame #n+1.

When it is determined in step S212 that the pixel in the frame #n+2 remains still with respect to the pixel at the same position in step S#n+1, the routine proceeds to step S213. The area determiner 203-1 sets the uncovered background area determination flag of the pixel to be determined for area to "1" that indicates that the pixel falls within the uncovered background area. The area determiner 203-1 supplies the determination flag storage frame memory 204 with the uncovered background area determination flag, and the routine proceeds to step S214.

When it is determined in step S211 that the pixel in the frame #n+1 remains still with respect to the pixel at the same position in the frame #n, or when it is determined in step S212 that the pixel in the frame #n+2 has moved from the pixel at the same position in the frame #n+1, the pixel in the frame #n does not fall within the uncovered background area. Step S213 is skipped, and the routine proceeds to step S214.

In step S214, the area determiner 103 determines whether all pixels in the frame #n have been determined for area. When it is determined that all pixels in the frame #n have not yet been determined for area, the routine loops to step S202 and the routine of the area determination process starts over to complete area determination for all pixels.

When it is determined in step S214 that all pixels in the frame #n have been determined for area, the routine proceeds to step S215. The synthesizer 205 generates the area information indicating the mixed area, based on the uncovered background area and the covered background area stored in the determination flag storage frame memory 204. Furthermore, the synthesizer 205 generates the area information that indicates which one of the uncovered background area, the still portion, the moving portion, and the covered background area each pixel belongs to. The generated area information is then set in the determination flag storage frame memory 206, and the routine ends.

On a pixel by pixel basis, the area determiner 103 may generate the area information which indicates which one of the moving portion, the still portion, the uncovered background area, and the covered background area each pixel in the frame belongs to.

By applying logical OR-gating to the uncovered background area and the covered background area, the area determiner 103 generates the area information corresponding to the mixed area. The area determiner 103 may then generate the area information formed of a flag indicating which one of the moving portion, the still portion, and the mixed area, each pixel of the frame belongs to.

When the object of the foreground has a texture, the area determiner 103 identifies a moving portion more accurately.

The area determiner 103 may output the area information, indicating the moving portion, as the area information representing the foreground area and may output the area information, indicating the still portion, as the area information representing the background information.

The background object is still in the above discussion. Even if the image corresponding to the background area has a moving component, the above-referenced area determination process is applicable. For example, when the image corresponding to the background area uniformly moves, the area determiner 103 performs the same process as when the object of the background is still, by shifting the entire image in accordance with the movement. When the image of the background area contains moving portions different from location to location, the area determiner 103 selects pixels in response to respective movements, and performs the above-referenced process.

Figure 31:
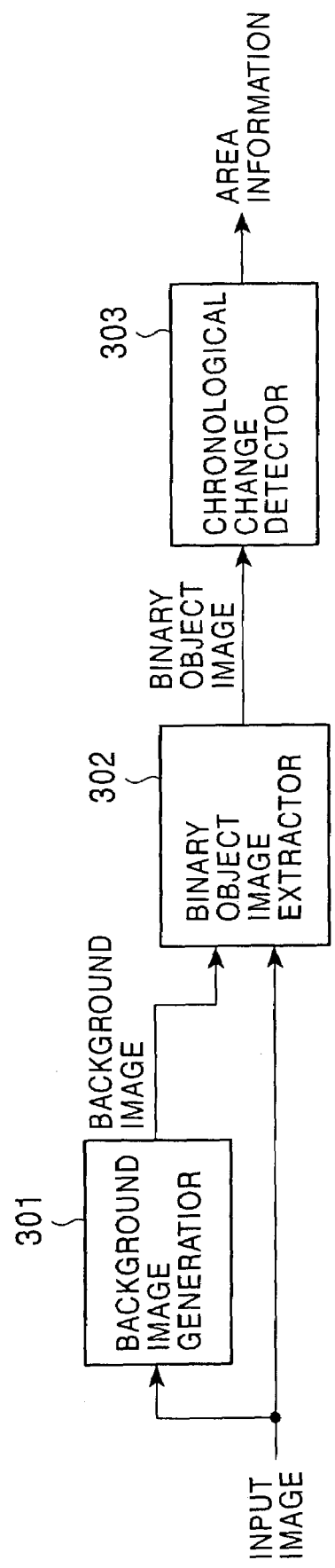
FIG. 31 is a block diagram illustrating another construction of the area determiner 103.

FIG. 31 is a block diagram illustrating another construction of the area determiner 103. The area determiner 103 illustrated in FIG. 31 uses no motion vector. A background image generator 301 generates a background image corresponding to an input image, and supplies a binary object image extractor 302 with the generated background image. The background image generator 301 extracts an image object corresponding to a background object contained in the input image, thereby generating a background image.

Figure 32:
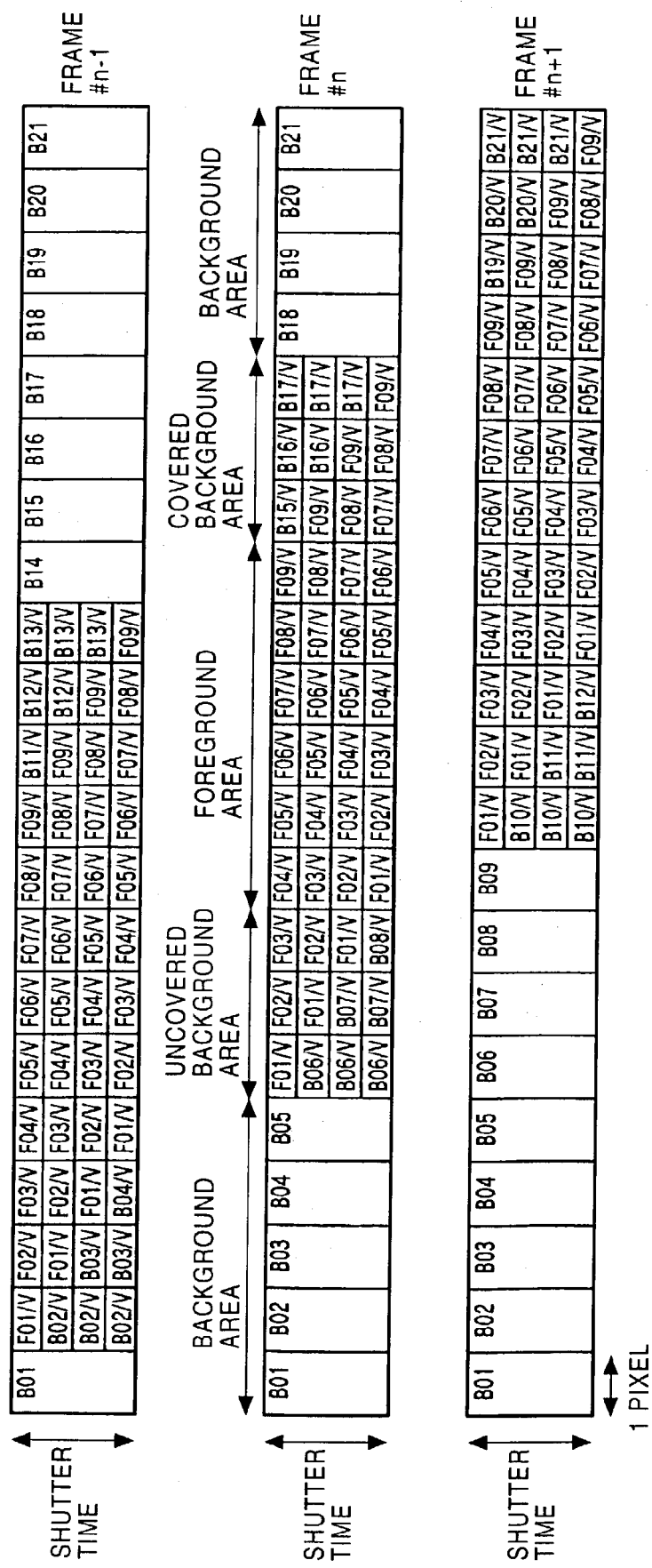
FIG. 32 is a model diagram illustrating the pixel values developed in time axis for a duration of time, which is divided and corresponds to shutter time.

FIG. 32 is a model diagram illustrating the pixel values of pixels consecutively arranged in a line in the direction of movement of an image corresponding to a foreground object, wherein the pixel values are developed in time axis. For example, the movement of the image corresponding to the foreground object is horizontal in the screen, and the pixel values of the pixels are consecutively arranged in a line in the model diagram illustrated in FIG. 32.

Referring to FIG. 32, the line in the frame #n is identical to the line in the frame #n+1.

The foreground component of the object in the sixth through seventeenth pixels in the frame #n from the left-hand side thereof is contained in the second through thirteenth pixels in the frame #n−1 from the left-hand side thereof, and is also contained in tenth through twenty-first pixels in the frame #n+1 from the left-hand side thereof.

The eleventh through thirteenth pixels in the frame #n−1 from the left-hand side thereof fall within the covered background area, and second through fourth pixels in the frame #n−1 from the left-hand side thereof fall within the uncovered background. The fifteenth through seventeenth pixels in the frame #n from the left-hand side thereof fall within the covered background area, and the sixth through eighth pixels in the frame #n from the left-hand side thereof fall within the uncovered background area. The nineteenth through twenty-first pixels in the frame #n+1 from the left-hand side thereof fall within the covered background area, and the tenth through twelfth pixels in the frame #n+1 from the left-hand side thereof fall within the uncovered background area.

The first and fourteenth through twenty-first pixels in the frame #n−1 from the left-hand side thereof fall within the background area. The first through fifth pixels, and the eighteenth through twenty-first pixels in the frame #n from the left-hand side thereof fall within the background area. First through ninth pixels in the frame #n+1 from the left-hand side thereof fall within the background area.

Figure 33:
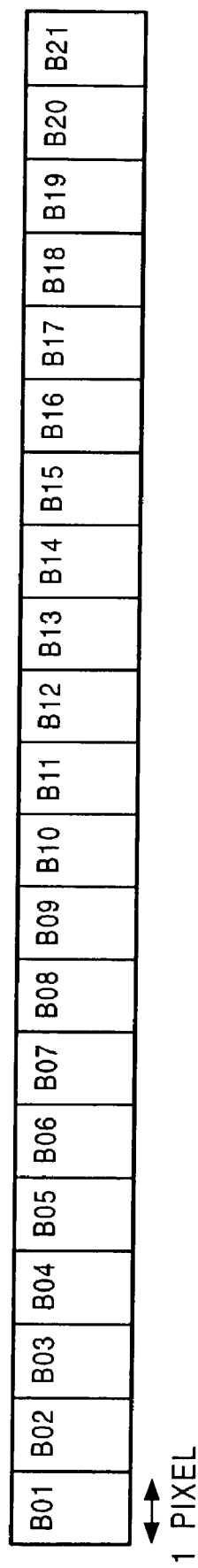
FIG. 33 illustrates the example of a background image.

FIG. 33 illustrates the example of a background image corresponding to the example illustrated in FIG. 32, and generated by the background image generator 301. The background image is formed of pixels of the object of the background, and includes no image component of a foreground object.

The binary object image extractor 302 generates a binary object image based on the correlation between the background image and the input image, and supplies a chronological change detector 303 with the generated binary object image.

Figure 34:
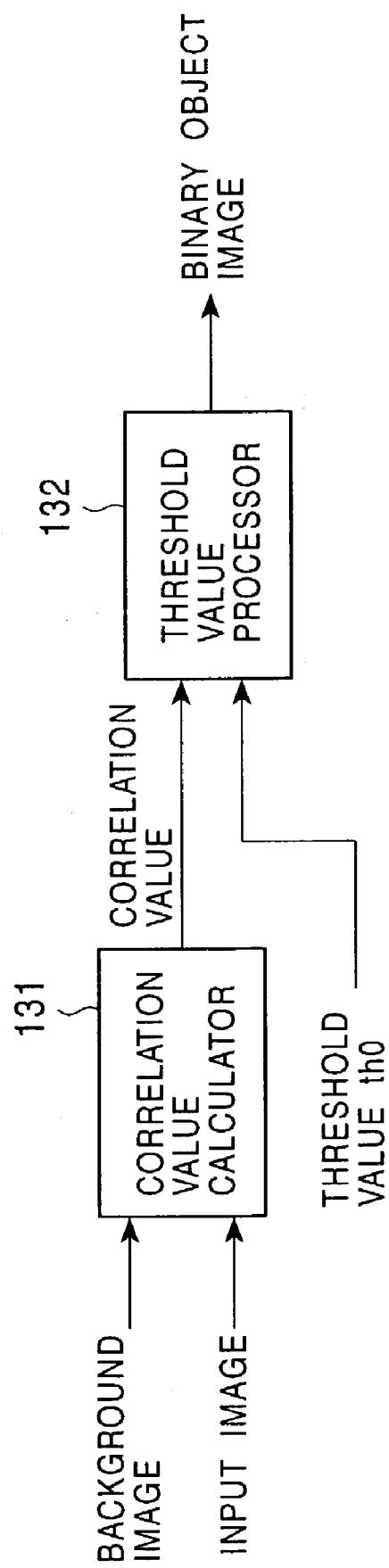
FIG. 34 is a block diagram illustrating the construction of a binary object image extractor 302.

FIG. 34 is a block diagram illustrating the construction of the binary object image extractor 302. A correlation value calculator 321 calculates correlation between the background image input from the background image generator 301 and the input image, generating a correlation value. The calculated correlation value is then fed to a threshold processor 322.

The correlation value calculator 321 applies equation (4) to 3×3 blocks of the background image centered on $X_4$ as shown in FIG. 35A and 3×3 blocks of the input image centered on $Y_4$ as shown in FIG. 35B, thereby calculating the correlation value for $Y_4$.

$$\text{Correlation value} = \frac{\sum_{i=0}^{8}(Xi-\overline{X})\sum_{i=0}^{8}(Yi-\overline{Y})}{\sqrt{\sum_{i=0}^{8}(Xi-\overline{X})^2 \cdot \sum_{i=0}^{8}(Yi-\overline{Y})^2}} \quad (4)$$

$$\overline{X} = \frac{\sum_{i=0}^{8} Xi}{9} \quad (5)$$

$$\overline{Y} = \frac{\sum_{i=0}^{8} Yi}{9} \quad (6)$$

The correlation value calculator 321 supplies the threshold processor 322 with the correlation value calculated for each pixel in this way.

The correlation value calculator 321 may apply equation (7) to 3×3 blocks of the background image centered on $X_4$ as shown in FIG. 36A and 3×3 blocks of the input image centered on $Y_4$ as shown in FIG. 36B, thereby calculating the correlation value for $Y_4$.

$$\text{Sum of absolute values of differences} = \sum_{i=0}^{8} |(Xi - Yi)| \quad (7)$$

The correlation value calculator 321 feeds the sum of absolute values of difference to the threshold processor 322 as a correlation value.

The threshold value processor 322 compares the pixel value of correlated images with a threshold value th0. The threshold value processor 322 sets the pixel value of the binary object image to 1 when the correlation value is equal to or smaller than the threshold value th0, and sets the pixel value of the binary object image to 0 when the correlation value is greater than the threshold value th0. The binary object image with the pixel value set to be 0 or 1 is thus output. The threshold value processor 322 may store beforehand the threshold value th0, or may use a threshold value th0 input from outside.

Figure 37:
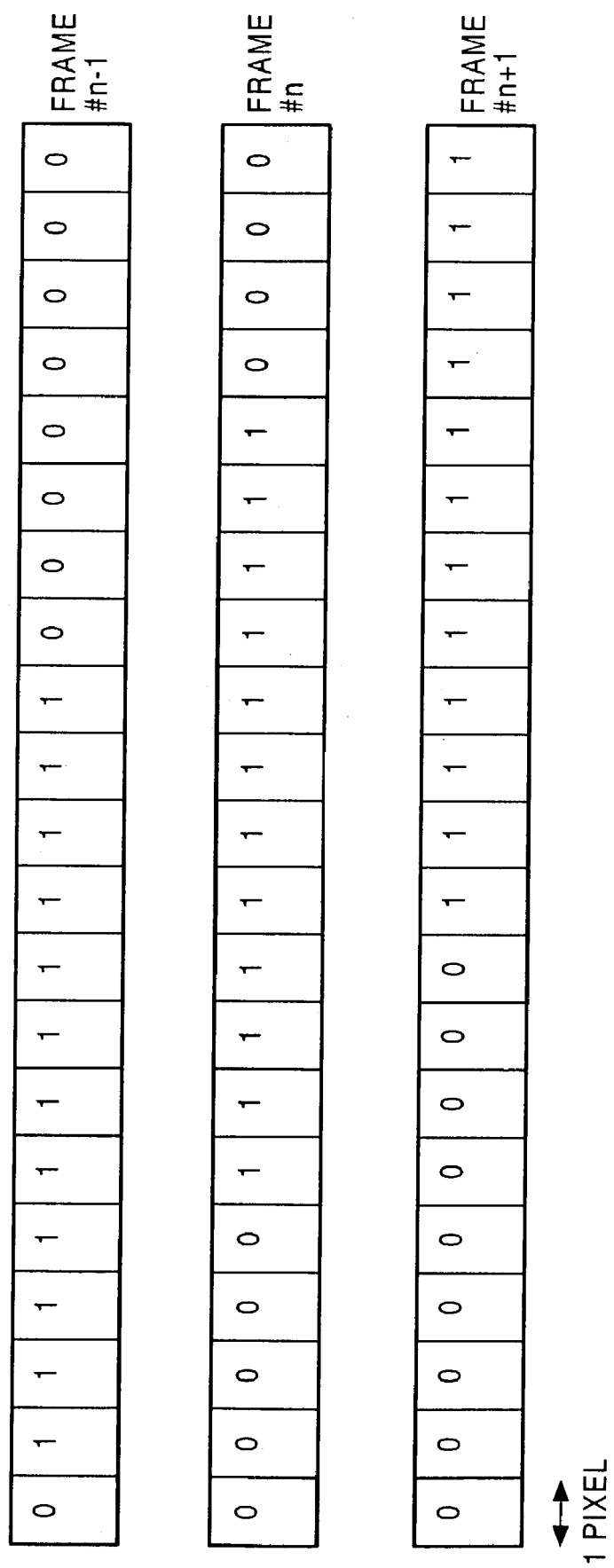
FIG. 37 illustrates a binary object image.

FIG. 37 illustrates a binary object image corresponding to the model of the input image illustrated in FIG. 32. In the binary object image, a pixel having a high correlation with the background image is set to 0.

Figure 38:
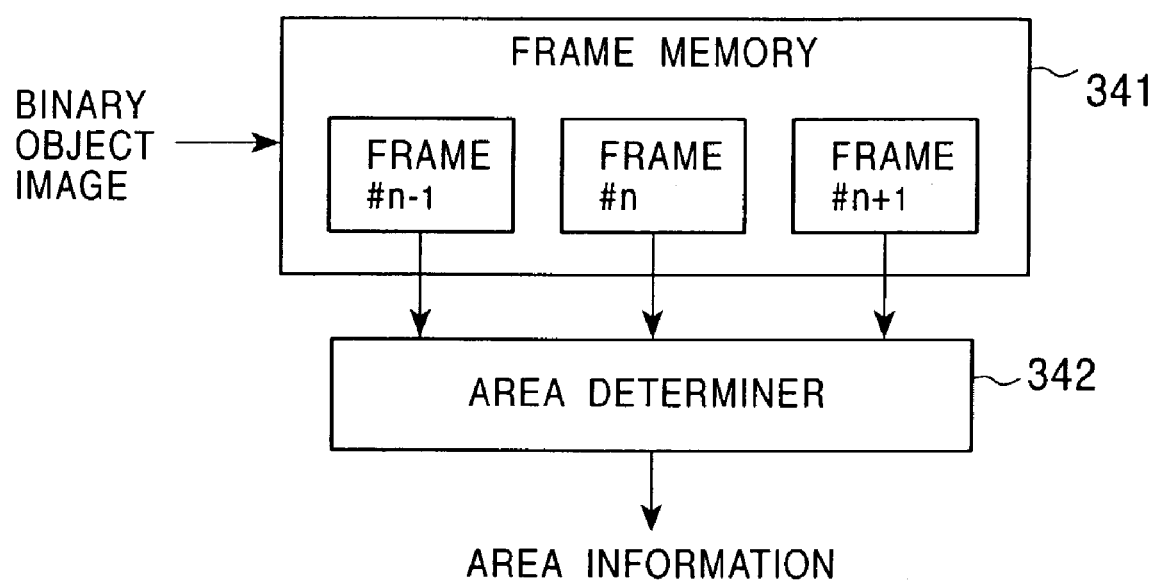
FIG. 38 is a block diagram illustrating the construction of a chronological change detector 303.

FIG. 38 is a block diagram illustrating the construction of a chronological change detector 303. When the area determination is performed on the pixels in the frame #n, a frame memory 341 stores the binary object image of the frame #n−1, the frame #n, and the frame #n+1 supplied from the binary object image extractor 302.

An area determiner 342 performs the area determination process to each pixel in the frame #n based on the binary object images of the frame #n−1, the frame #n, and the frame #n+1 stored in the frame memory 341, thereby generating and outputting the area information.

FIG. 39 illustrates the determination process of the area determiner 342. When a target pixel in the binary object image in the frame #n is zero, the area determiner 342 determines that the target pixel in the frame #n falls within the background area.

The area determiner 342 determines that a target pixel in the frame #n falls within the foreground area when the target pixel of the binary object image in the frame #n−1 is 1, when the target pixel of the binary object image in the frame #n is 1, and when the target pixel of the binary object image in the frame #n+1 is 1.

When the target pixel of the binary object image in the frame #n is 1, and when the target pixel of the binary object image in the frame #n−1 is 0, the area determiner 342 determines that the target pixel in the frame #n falls within the covered background.

When the target pixel of the binary object image in the frame #n is 1, and when the target pixel of the binary object image in the frame #n+1 is 0, the area determiner 342 determines that the target pixel in the frame #n falls within the uncovered background.

Figure 40:
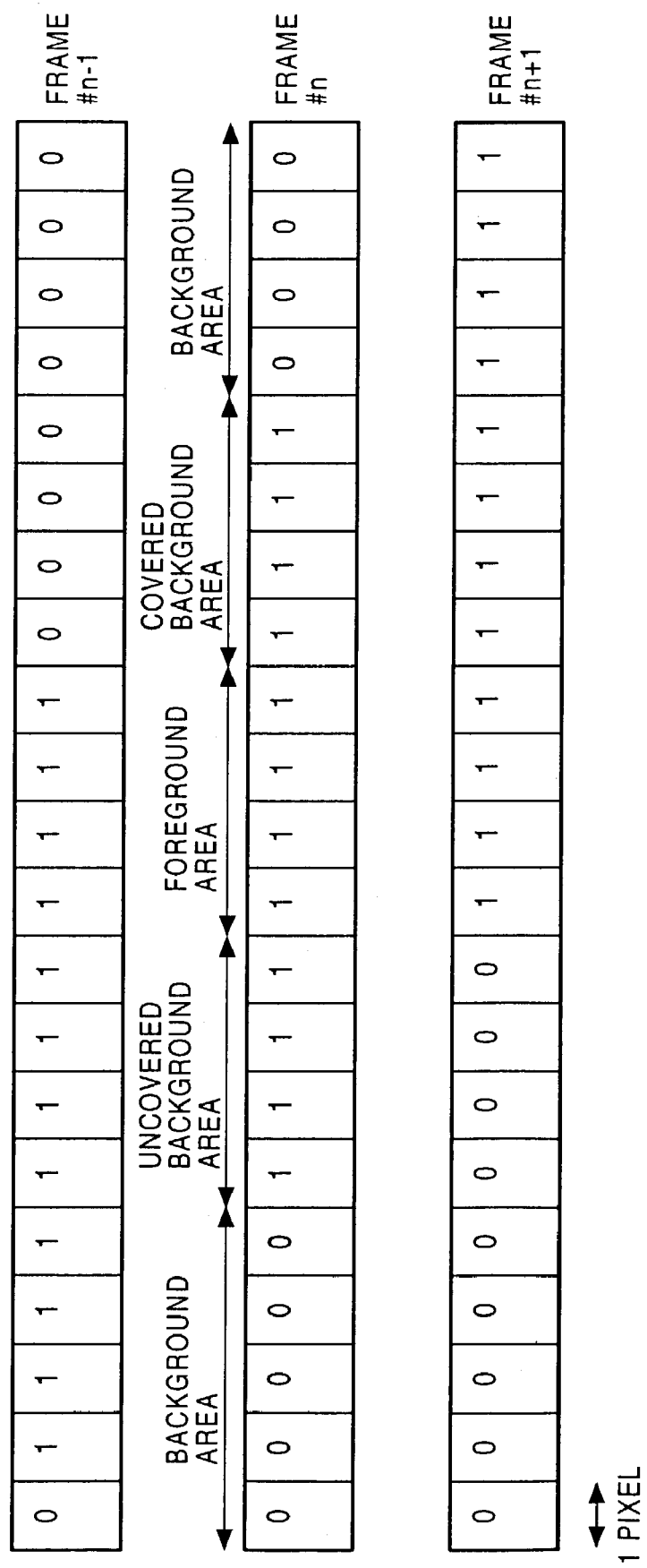
FIG. 40 illustrates the determination process of the chronological change detector 303.

FIG. 40 illustrates the determination process of the chronological change detector 303 performed on the binary object image corresponding to the input image illustrated in FIG. 32. The chronological change detector 303 determines that the first through fifth pixels in the frame #n from the left-hand side thereof fall within the background area, because the corresponding pixels in the binary object image in the frame #n are 0.

The chronological change detector 303 determines that the sixth through ninth pixels in the frame #n from the left-hand side thereof fall within the uncovered background, because the pixels of the binary object image in the frame #n are 1 and the corresponding pixels in the frame #n−1 are 0.

The chronological change detector 303 determines that the tenth through thirteenth pixels in the frame #n from the left-hand side thereof fall within the foreground area, because the pixels of the binary object image in the frame #n are 1, the corresponding pixels in the frame #n−1 are 1, and the corresponding pixels in the frame #n+1 are 1.

The chronological change detector 303 determines that the fourteenth through seventeenth pixels in the frame #n from the left-hand side thereof fall within the covered background, because the pixels of the binary object image in the frame #n are 1, and the corresponding pixels in the frame #n−1 are 0.

The chronological change detector 303 determines that the eighteenth through twenty-first pixels in the frame #n from the left-hand side thereof fall within the background area, because the pixels of the binary object image in the frame #n are 0.

Figure 41:
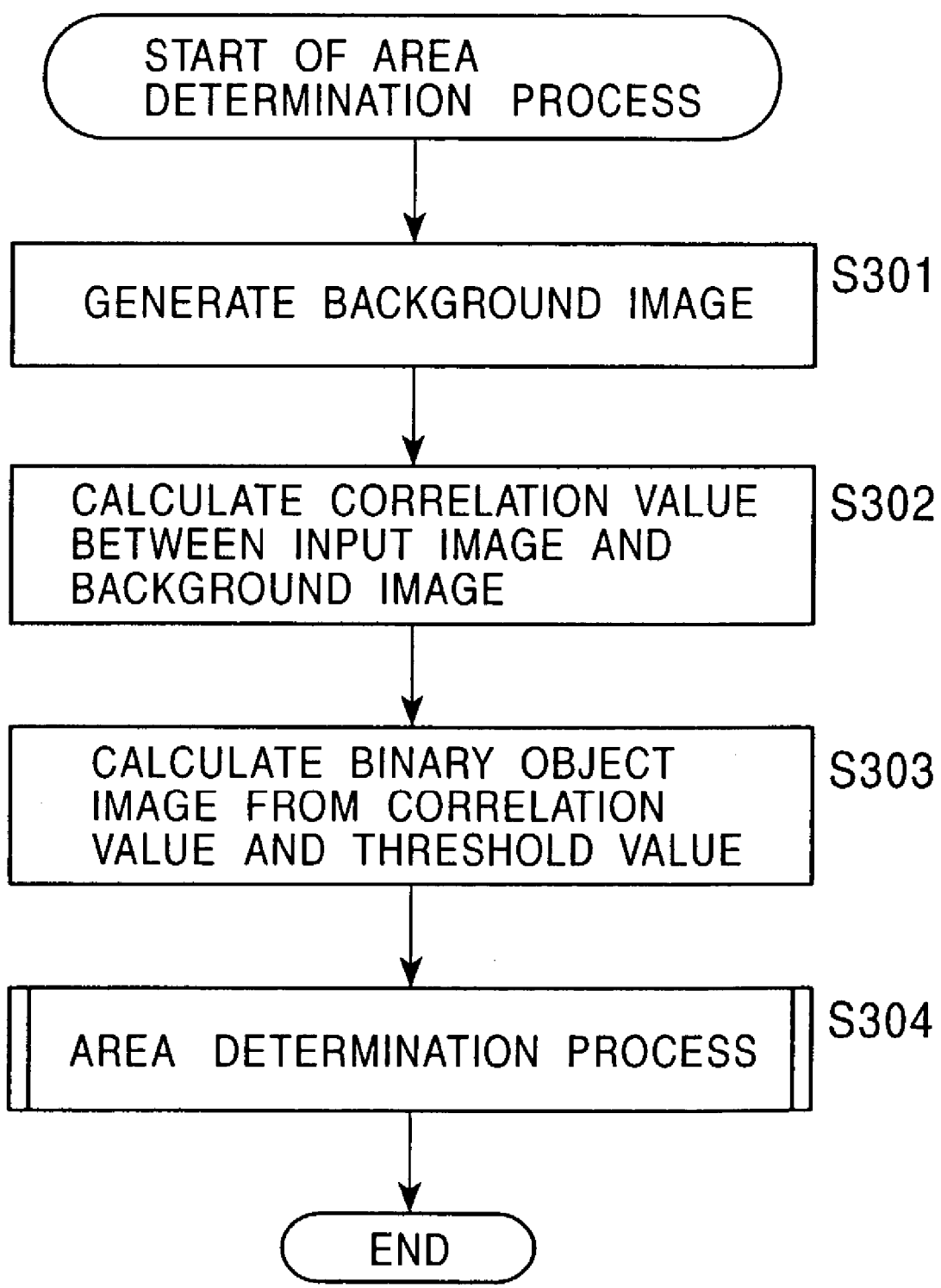
FIG. 41 is a flow diagram illustrating the area determination process of the area determiner 103.

Referring to a flow diagram illustrated in FIG. 41, the area determination of the area determiner 103 is discussed below. In step S301, the background image generator 301 in the area determiner 103 extracts an image object corresponding to a foreground object contained in the input image, generates a background image, and sends the generated background to the binary object image extractor 302.

In step S302, the binary object image extractor 302 calculates the correlation value between the input image and the background image supplied from the background image generator 301 through the process discussed with reference to FIG. 35A and FIG. 35B. In step S303, the binary object image extractor 302 compares the correlation value with the threshold value th0 to result in a binary object image from the correlation value and the threshold value th0.

In step S304, the chronological change detector 303 performs the area determination process, thereby ending the routine.

Figure 42:
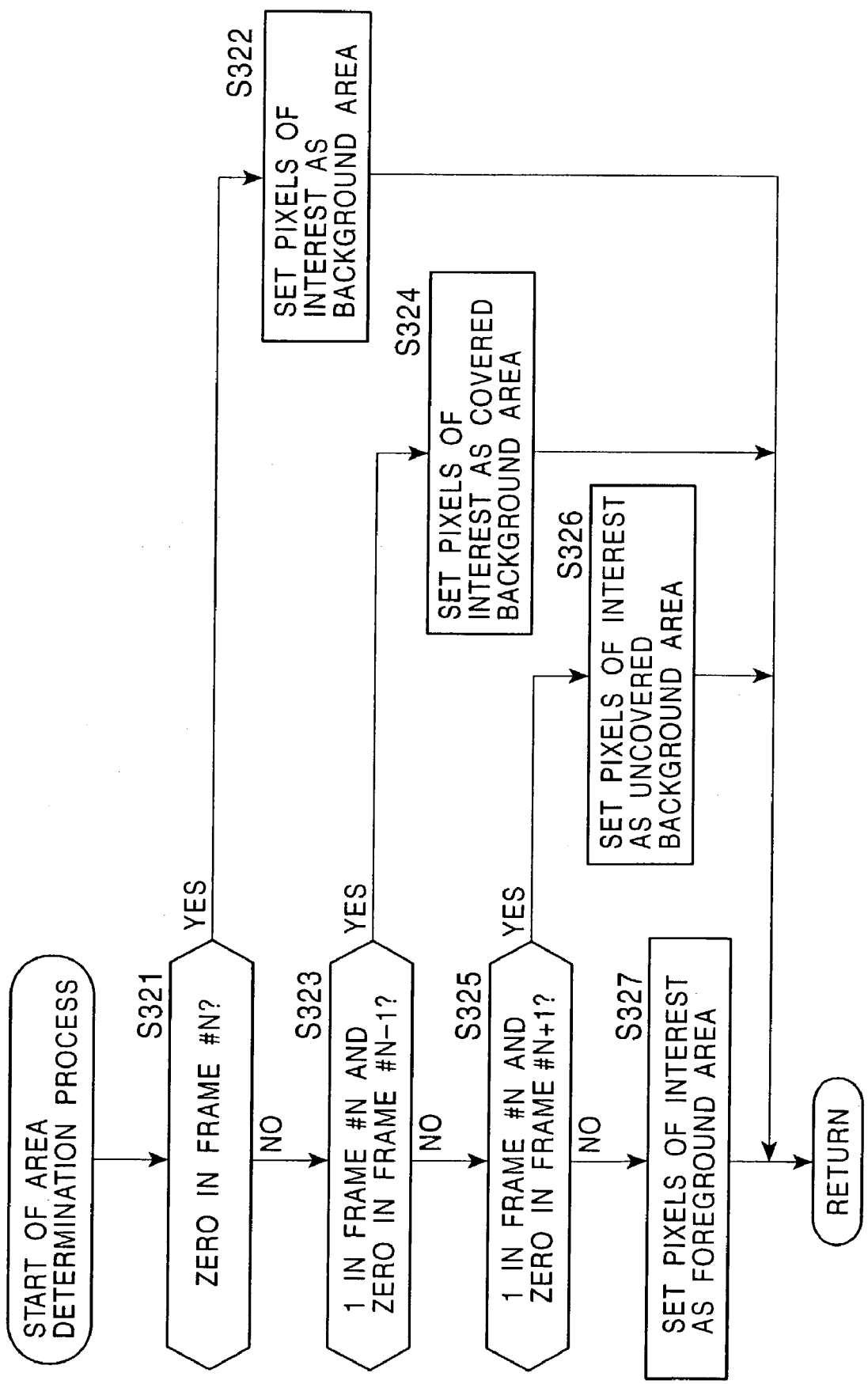
FIG. 42 is a flow diagram illustrating the area determination process in detail.

Referring to a flow diagram shown in FIG. 42, the area determination process in step S304 is discussed in detail. In step S321, the area determiner 342 in the chronological change detector 303 determines whether a target pixel in the frame #n stored in the frame memory 341 is 0. When it is determined that the target pixel is 0, the routine proceeds to step S322. The target pixel in the frame #n is set as falling within the background area, and then the routine ends.

When it is determined in step S321 that the target pixel in the frame #n is 1, the routine proceeds to step S323. The area determiner 342 in the chronological change detector 303 determines whether the target pixel in the frame #n stored in the frame memory 341 is 1 and whether the corresponding pixel in the frame #n−1 is 0. When it is determined that the target pixel in the frame #n stored in the frame memory 341 is 1 and that the corresponding pixel in the frame #n−1 is 0, the routine proceeds to step S324. The area determiner 342 sets the target pixel in the frame #n as falling within the covered background area, and ends the routine.

When it is determined in step S323 that the target pixel in the frame #n is 0 or that the corresponding pixel in the frame #n−1 is 1, the routine proceeds to step S325. The area determiner 342 in the chronological change detector 303 determines whether the target pixel in the frame #n stored in the frame memory 341 is 1, and whether the corresponding pixel in the frame #n+1 is 0. When it is determined that the target pixel in the frame #n stored in the frame memory 341 is 1, and that the corresponding pixel in the frame #n+1 is 0, the routine proceeds to step S326. The area determiner 342 sets the target pixel in the frame #n as falling within the uncovered background area and ends the routine.

When it is determined in step S325 that the target pixel in the frame #n is 0 or that the corresponding pixel in the frame #n+1 is 1, the routine proceeds to step S327. The area determiner 342 in the chronological change detector 303 sets the target pixel in the frame #n as falling within the foreground area, and ends the routine.

The area determiner 103 in this way determines which one of the foreground area, the background area, the covered background area, and the uncovered background area each pixel of the input image belongs to, based on the background image corresponding to the input image and the correlation value. The area determiner 103 generates the area information corresponding to the determination results.

Figure 43:
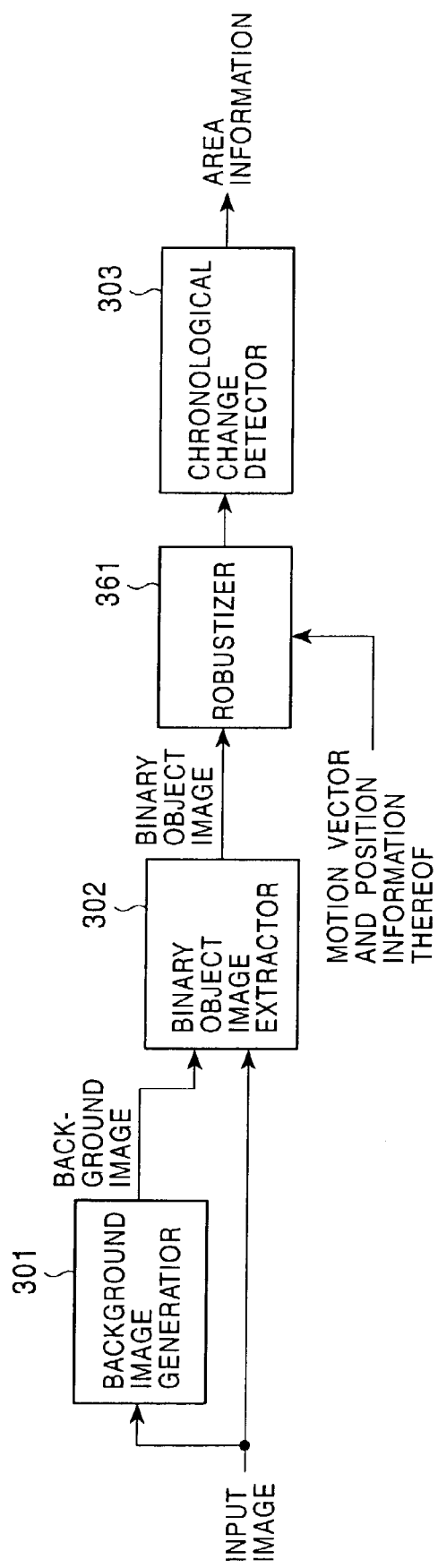
FIG. 43 is a block diagram illustrating yet another construction of the area determiner 103.

FIG. 43 is a block diagram illustrating yet another construction of the area determiner 103. The area determiner 103 illustrated in FIG. 43 uses the motion vector and the position information thereof supplied from the motion detector 102. Elements identical to those described with reference to FIG. 31 are designated with the same reference numerals, and the discussion thereof is omitted.

A robustizer 361 robustizes the binary object image based on N frames of binary object images supplied from the binary object image extractor 302, and feeds the robustized binary object image to the chronological change detector 303.

Figure 44:
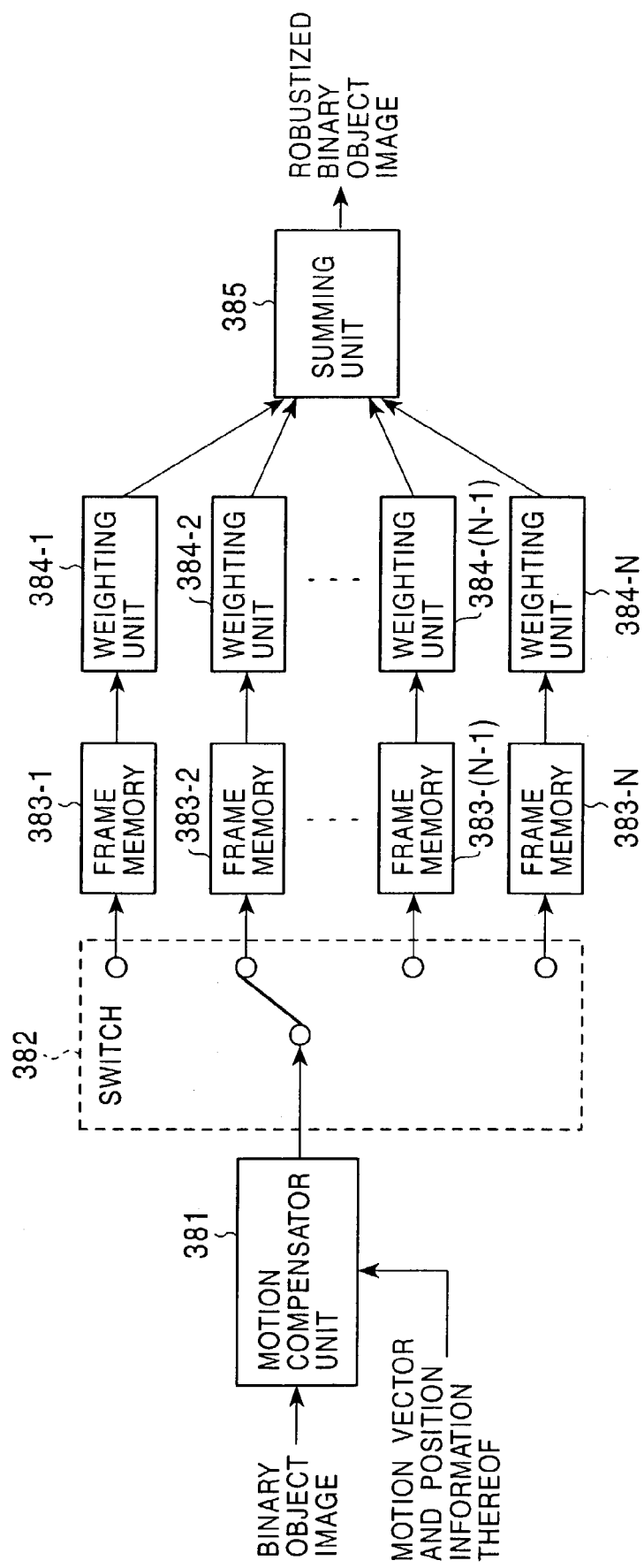
FIG. 44 is a block diagram illustrating the construction of a robustizer 361.

FIG. 44 is a block diagram illustrating the construction of the robustizer 361. A motion compensator 381 compensates for the motion of the N frames of binary object image based on the motion vector and the position information thereof supplied from the motion detector 102, and feeds the motion compensated binary object image to a switch 382.

Figure 45:
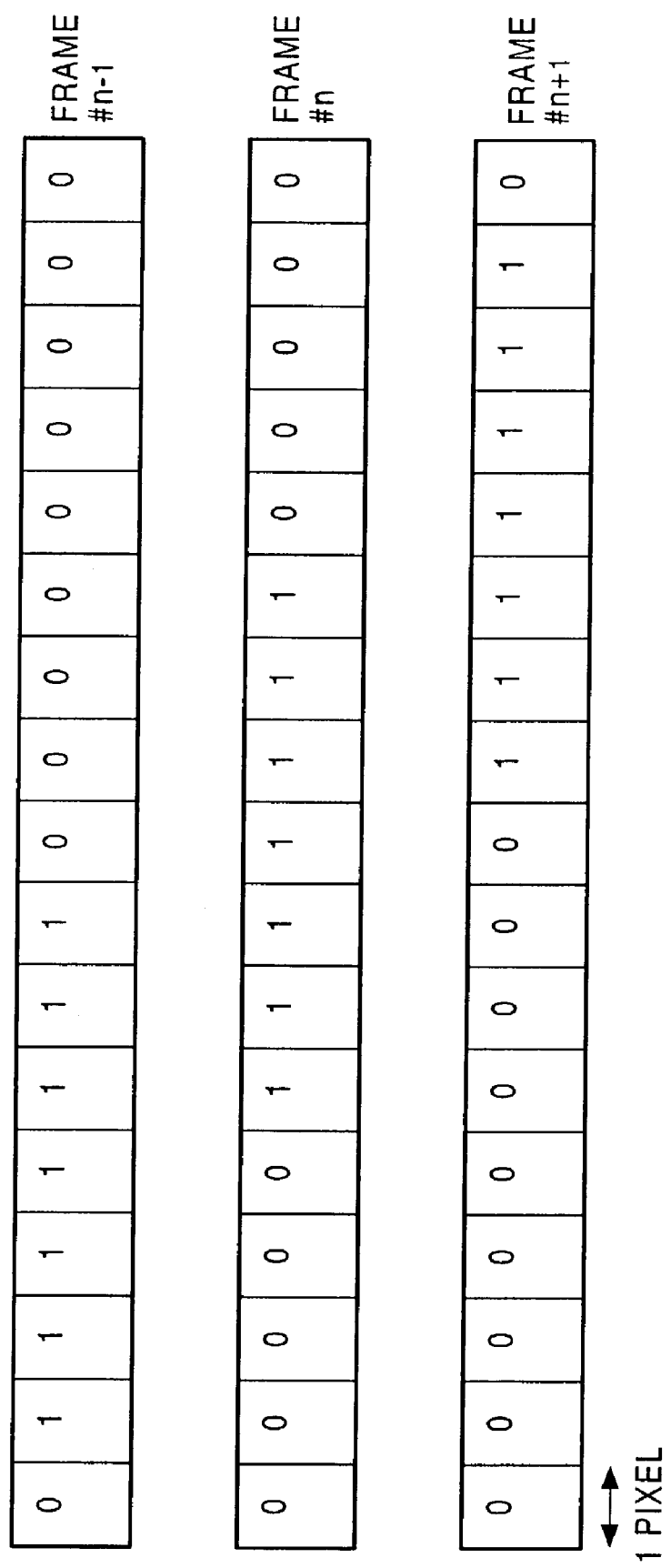
FIG. 45 illustrates a motion compensation of a motion compensator 381.
Figure 46:
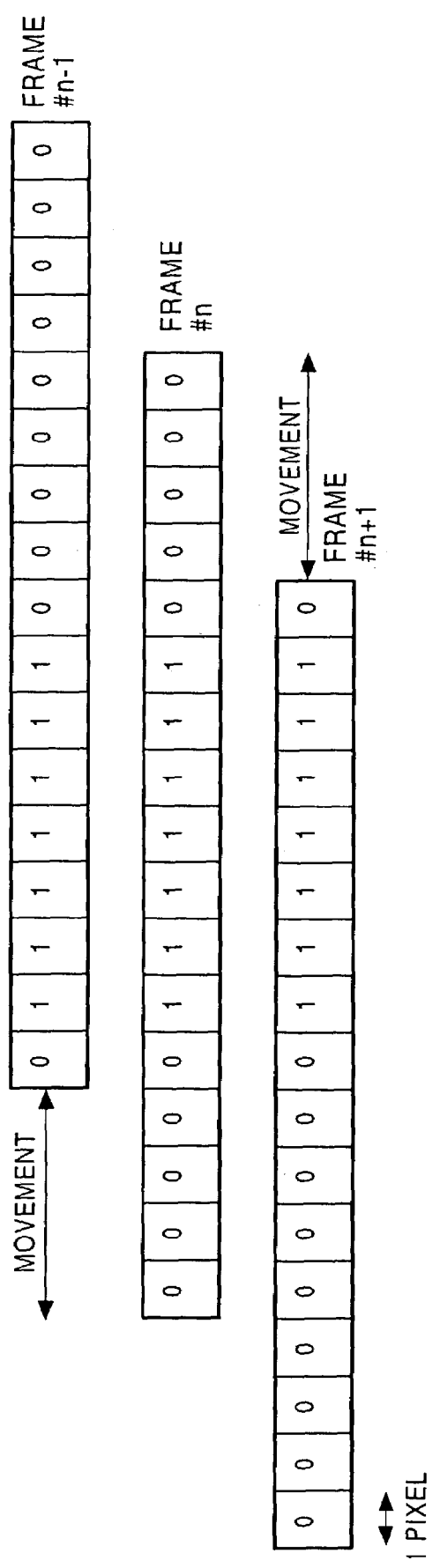
FIG. 46 illustrates a motion compensation of the motion compensator 381.

Referring to FIG. 45 and FIG. 46, the motion compensation of the motion compensator 381 is discussed. The frame #n−1, the frame #n, and the frame #n+1 of binary object image illustrated in FIG. 45 are input when the area determination of the frame #n is performed. Based on the motion vector supplied from the motion detector 102, the motion compensator 381 compensates for a motion in the frame #n−1 of binary object image, and the frame #n+1 of binary object image as shown in FIG. 46, and feeds the motion-compensated binary object images to the switch 382.

The switch 382 outputs a first frame motion-compensated binary object image to a frame memory 383-1, and outputs a second frame motion-compensated binary object to a frame memory 383-2. Likewise, the switch 382 outputs third through N−1-th frame motion-compensated binary object images to frame memories 383-3 through 383-(N−1), respectively, and finally outputs an N-th frame motion-compensated binary object image to a frame memory 383-N.

The frame memory 383-1 stores the first frame motion-compensated binary object image, and outputs the stored binary object image to a weighting unit 384-1. The frame memory 383-2 stores the second frame motion-compensated binary object image and outputs the stored binary object to the weighting unit 384-2.

The frame memories 383-3 through 383-(N−1) respectively store third through N−1-th frame motion-compensated binary object images, and outputs stored binary object images to weighting units 384-3 through 384-(N−1), respectively. The frame memory 383-N stores the N-th frame motion-compensated binary object image and outputs the stored binary object image to the weighting unit 384-N.

The weighting unit 384-1 multiplies the pixel value of the first frame motion-compensated binary object image supplied from the frame memory 383-1 by a predetermined weight w1, and feeds the product to a summing unit 385. The weighting unit 384-2 multiplies the pixel value of the second frame motion-compensated binary object image supplied from the frame memory 383-2 by a predetermined weight w2, and feeds the product to the summing unit 385.

Likewise, the weighting unit 384-3 through weighting unit 384-(N−1) respectively multiply the pixel values of the third through N−1-th frame motion-compensated binary object images by predetermined weights w3 through w(N−1), and feed the respective products to the summing unit 385. The weighting unit 384-N multiplies the pixel value of the N-th frame motion-compensated binary object image by a predetermined weight wN, and then feeds the product to the summing unit 385.

The summing unit 385 sums the pixels of the first through N-th frame motion-compensated binary object images respectively multiplied by the weights w1 through wN, and compares the sum of the products with a predetermined threshold value th0, thereby generating the binary object image.

The robustizer 361 robustizes the N binary object images and feeds the robustized object images to the chronological change detector 303. The area determiner 103 illustrated in FIG. 43 performs the area determination more accurately than the area determiner 103 illustrated in FIG. 31, even if the input image contains noise.

The area determination process of the area determiner 103 illustrated in FIG. 43 will now be discussed with reference to a flow diagram shown in FIG. 47. Step S341 through step S343 are respectively identical to step S301 through step S303 already discussed with reference to the flow diagram illustrated in FIG. 41, and the discussion thereof is omitted here.

In step S344, the robustizer 361 performs a robustization process.

In step S345, the chronological change detector 303 performs the area determination process, and ends the routine. The detail of the area determination process in step S345 is identical to that of the process discussed with reference to the flow diagram illustrated in FIG. 42, and the discussion thereof is omitted here.

Figure 47:
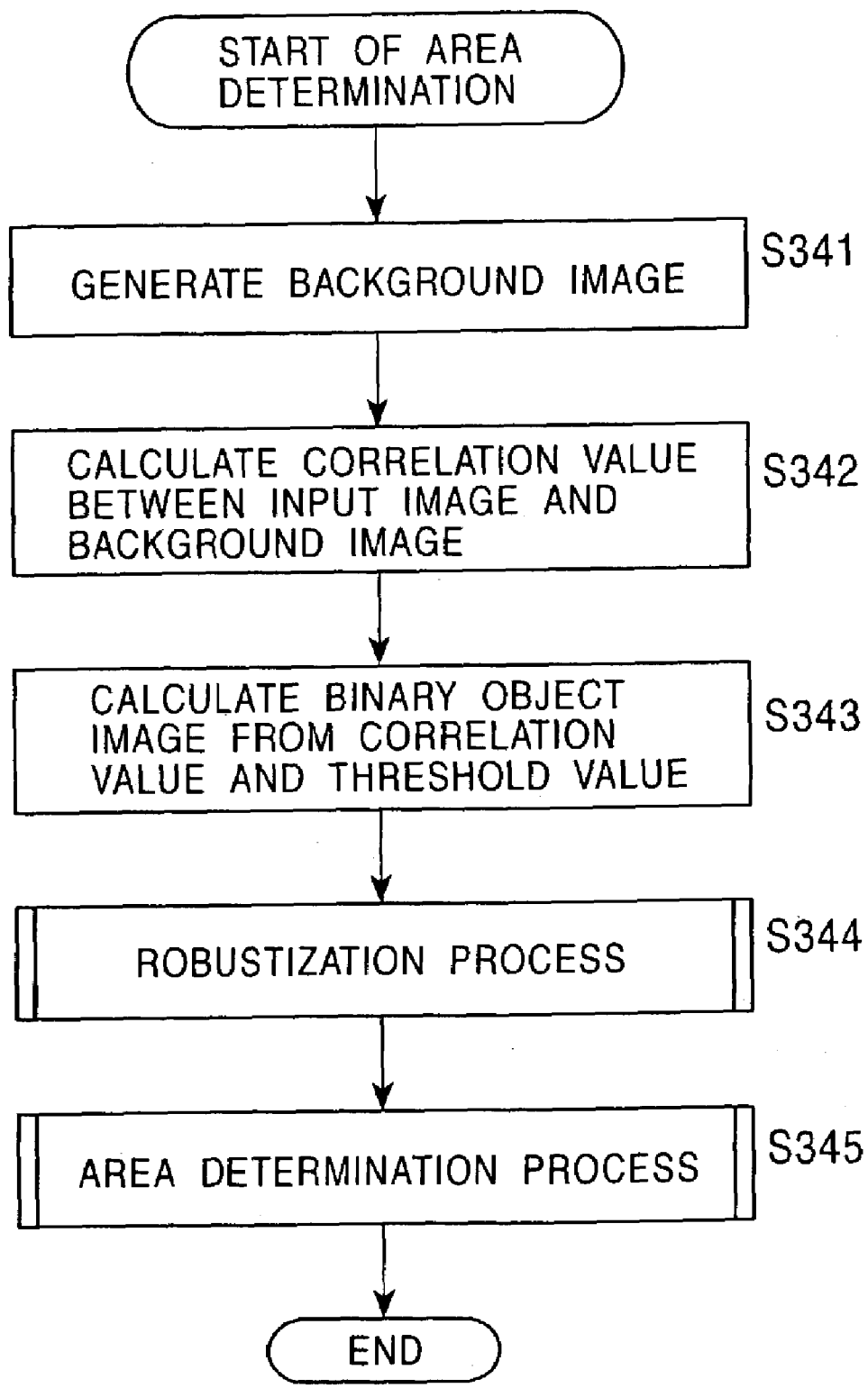
FIG. 47 is a flow diagram illustrating the area determination process.
Figure 48:
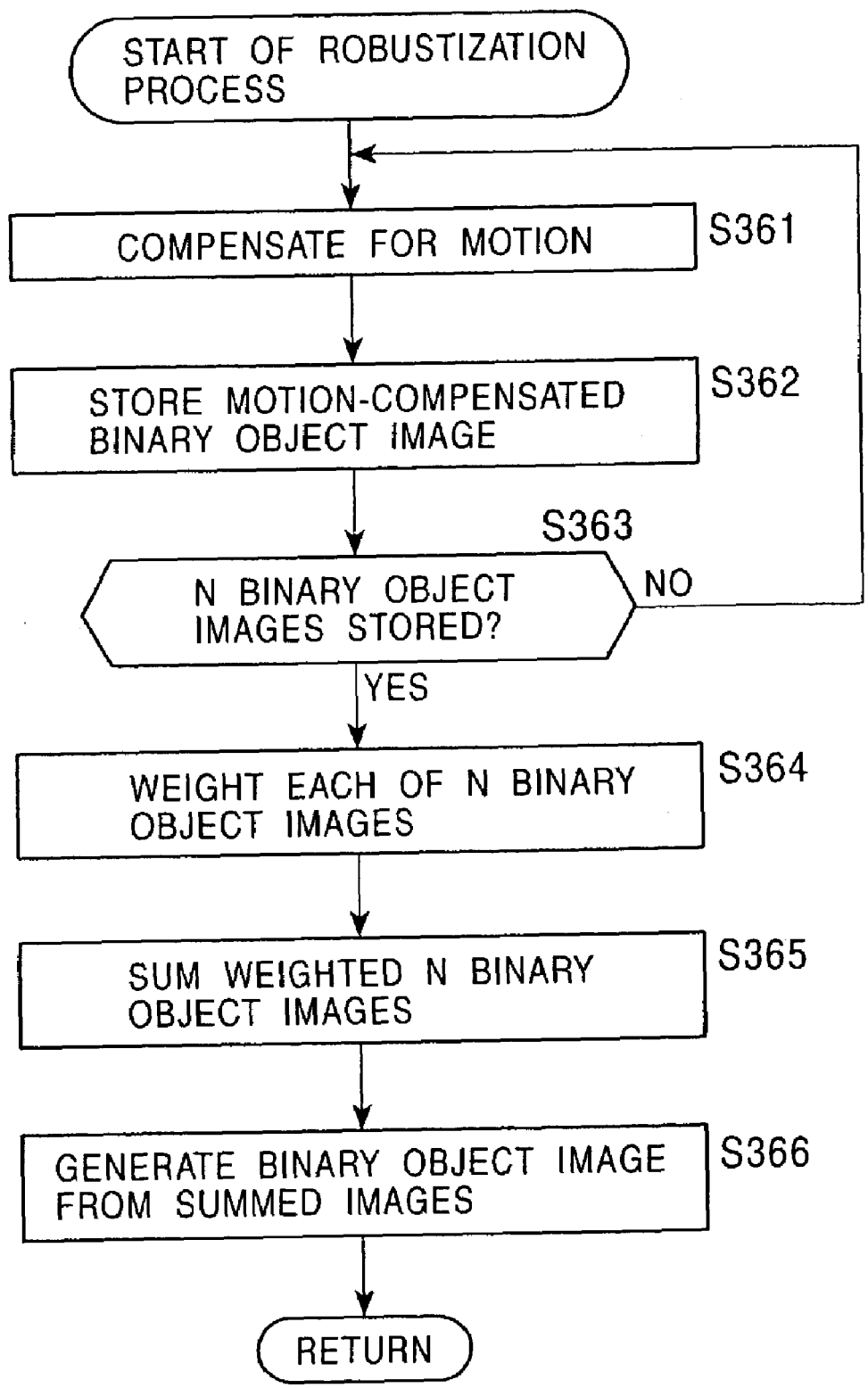
FIG. 48 is a flow diagram illustrating a robustization process in detail.

Referring to the flow diagram illustrated in FIG. 48, the robustization process in step 344 in FIG. 47 will now be detailed. In step S361, the motion compensator 381 performs a motion compensation process of the input binary object image in accordance with the motion vector and the position information thereof supplied from the motion detector 102. In step S362, one of the frame memories 383-1 through 383-N stores the motion-compensated binary object image supplied through the switch 382.

In step S363, the robustizer 361 determines whether the N binary object images have been stored. When it is determined that the N binary object images have not yet been stored, the routine loops to step S361 to perform the motion compensation process on the binary object image and to perform the storage process for storing the binary object image.

When it is determined in step S363 that the N binary object images have been stored, the routine proceeds to step S364. The weighting units 384-1 through 384-N multiply the N binary object images by the weights w1 through wN, respectively, for weighting.

In step S365, the summing unit 385 sums the weighted N binary object images.

In step S366, the summing unit 385 generates a binary object image from the summed image by comparing the summed binary object image with a predetermined threshold th1, and the routine ends.

In this way, the area determiner 103 configured as in FIG. 43 generates the area information based on the robustized binary object image.

Concerning each pixel contained in the frame, the area determiner 103 generates the area information that indicates which one of the moving portion, the still portion, the uncovered background area, and the covered background area each pixel belongs to.

Figure 49:
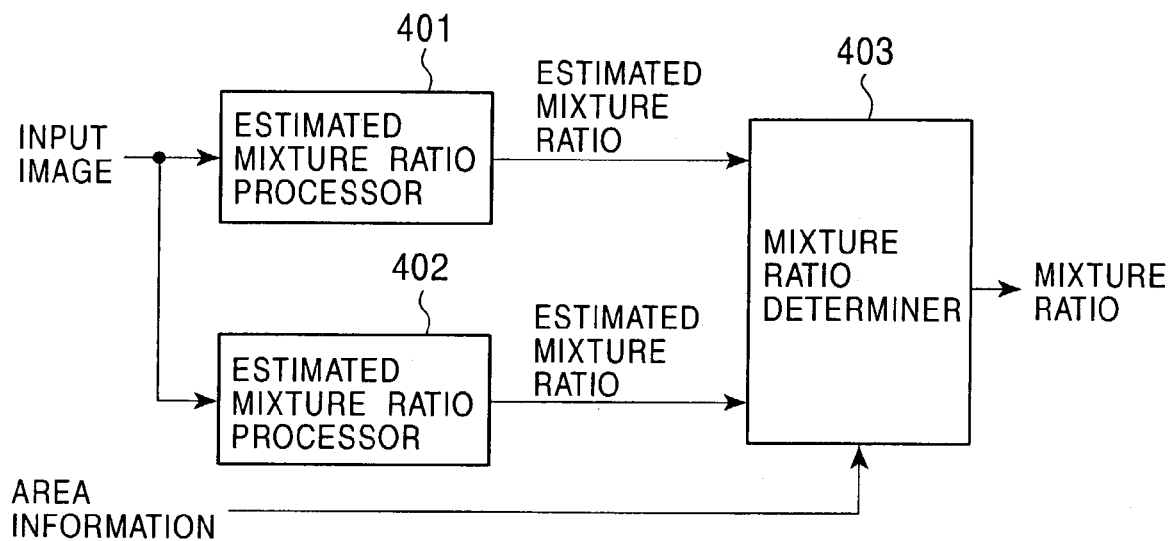
FIG. 49 is a block diagram illustrating the construction of a mixture ratio calculator 104.

FIG. 49 is a block diagram illustrating the construction of the mixture ratio calculator 104. An estimated mixture ratio processor 401 determines an estimated mixture ratio of each pixel by calculating a model of the covered background area in the input image, and then feeds the calculated estimated mixture ratio to a mixture ratio determiner 403.

A estimated mixture ratio processor 402 determines an estimated mixture ratio of each pixel by calculating a model of the covered background area in the input image, and then feeds the calculated estimated mixture ratio to a mixture ratio determiner 403.

The assumption that the object of the foreground is moving at a constant speed for shutter time holds, the mixture ratio α of the pixel belonging to the mixed area has the following property. Specifically, the mixture ratio α linearly varies with respect to a change in the position of pixels. For example, if the change in the position of the pixels is one-dimensional, the change in the mixture ratio α is expressed by a straight line. If the change in the position of the pixel is two-dimensional, the change in the mixture ratio α is expressed by a plane.

Since the duration of one frame is short, the assumption that the object of the foreground is a solid body and moving at a constant speed holds.

The gradient of the mixture ratio α is inversely proportional to the amount of movement v within the shutter time of the foreground.

Figure 50:
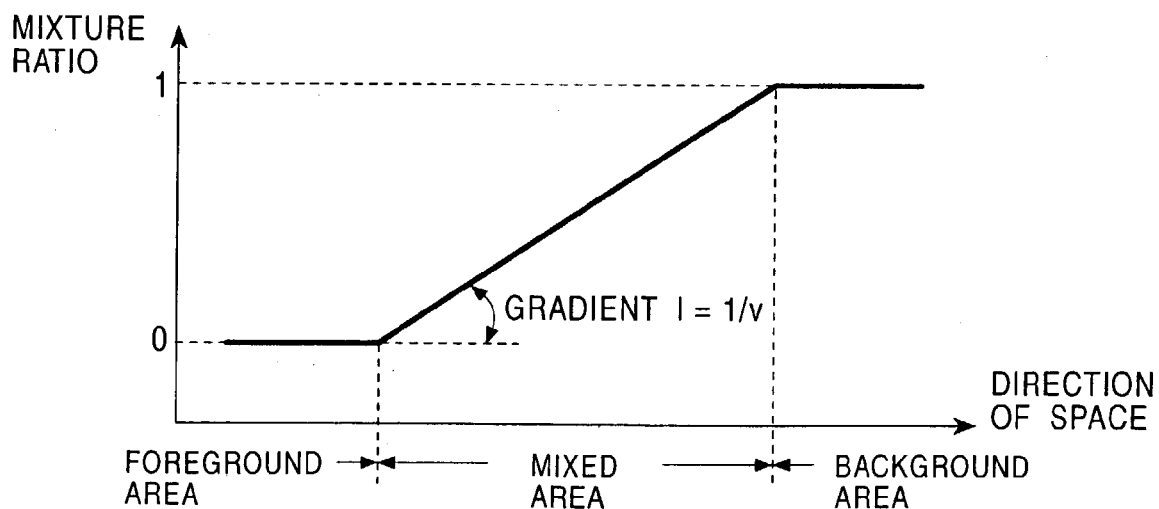
FIG. 50 illustrates an ideal mixture ratio α.

FIG. 50 illustrates an ideal mixture ratio α. The gradient 1 of the ideal mixture ratio α within the mixed area is expressed as being inversely proportional to the amount of movement v.

Referring to FIG. 50, the ideal mixture ratio α is 1 within the background area, zero within the foreground area, and above zero but smaller than 1 within the mixed area.

Figure 51:
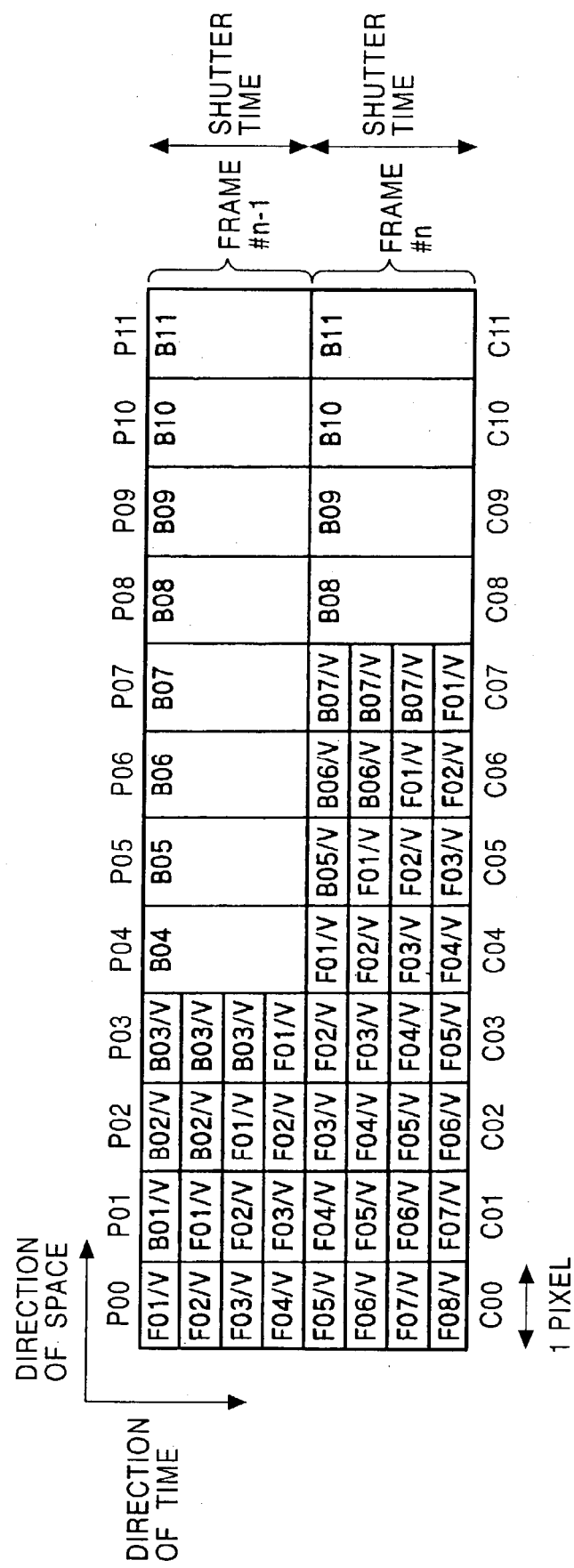
FIG. 51 is a model diagram illustrating pixel values developed in time axis for a duration of time, which is divided and corresponds to shutter time.

Referring to the example illustrated in FIG. 51, the pixel value C06 of a seventh pixel in the frame #n from the left-hand side thereof is expressed in equation (8) using a pixel value P06 of a seventh pixel in the frame #n−1 from the left-hand side thereof.

$$\begin{aligned} C06 &= B06/v + B06/v + F01/v + F02/v \\ &= P06/v + P06/v + F01/v + F02/v \\ &= 2/v \cdot P06 + \sum_{i=1}^{2} Fi/v \end{aligned} \quad (8)$$

In equation (8), the pixel value C06 is expressed as a pixel value M of a pixel in the mixed area, and the pixel value P06 is expressed as a pixel value B of a pixel in the background area. Specifically, the pixel value M of the pixel in the mixed area and the pixel value B of the pixel in the background area are expressed in equations (9) and (10).

$$M=C06 \quad (9)$$

$$B=P06 \quad (10)$$

2/v in equation (8) corresponds to the mixture ratio α. Since the amount of movement v is 4, the mixture ratio α of the seventh pixel in the frame #n from the left-hand side thereof becomes 0.5.

As discussed above, the pixel value C in the target frame #n is regarded as a pixel value in the mixed area, and the pixel value P of the frame #n−1 prior to the frame #n is regarded as a pixel value in the background area. Equation (3) expressing the mixture ratio α is rewritten as equation (11).

$$C=\alpha \cdot P+f \quad (11)$$

where f represents the sum $\Sigma_i Fi/v$ of the foreground components contained in a target pixel. Variables contained in equation (11) are the two, namely, the mixture ratio α and the sum f of the foreground components.

Figure 52:
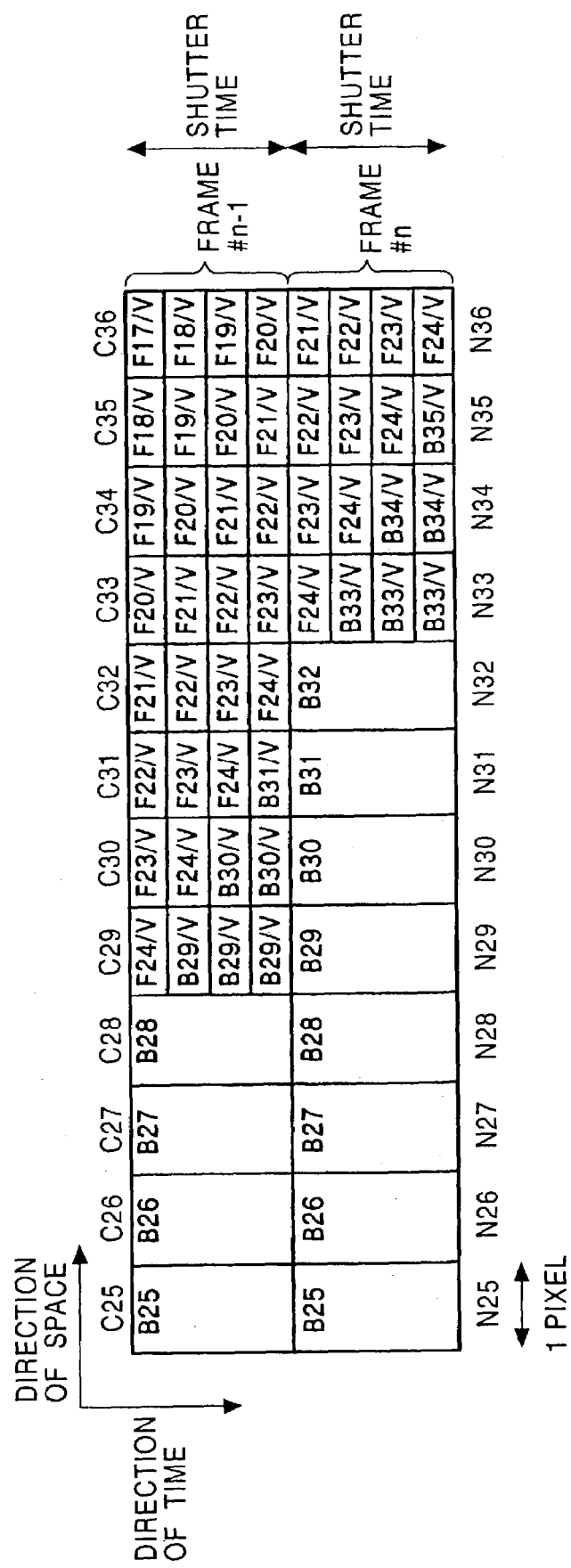
FIG. 52 is a model diagram illustrating pixel values developed in time axis for the duration of time, which is divided and corresponds to the shutter time.

FIG. 52 is a model diagram illustrating pixel values developed in time axis, wherein the amount of v is 4 and the virtual divisor number in the time axis is 4 in the uncovered background.

As in the expression of the pixel value in the covered background area, in the uncovered background area, the pixel value C of the target frame #n is regarded as a pixel value in the mixed area, and the pixel value N of the frame #n+1 subsequent to the frame #n is regarded as a pixel value in the background area. Equation (3) expressing the mixture ratio α is rewritten as equation (12).

$$C=\alpha \cdot N+f \quad (12)$$

The object of the background is still in the above discussion. Equations (8) through (12) are applied by using the pixel value of the pixel in a position corresponding to the amount of movement v even when the background object is moving. For example, when the amount of movement v of the background object is 2 and the virtual divisor number is 2, and the background object is moving rightwardly as shown, the pixel value B of the pixel in the background area in equation (10) becomes a pixel value P04.

Since each of equations (11) and (12) contains two variables, the mixture ratio α cannot be determined in the present forms thereof.

An equation for approximating the mixture ratio α and the sum of foreground components f in the direction of space is formulated taking advantage of the property of the mixture ratio α that linearly changes in response to a change in the position of the pixels with the object of the foreground moving at a constant speed. The equation that approximates the mixture ratio α and the sum of foreground component f is solved using a plurality of combinations of a pixel value of a pixel falling within the mixed area and a pixel value of a pixel falling within the background area.

The change in the mixture ratio α in the linear approximation thereof is expressed in equation (13).

$$\alpha=il+p \quad (13)$$

where i is an index in the direction of space with the position of a target pixel at zero, l is a gradient of a line of the mixture ratio α, p is an intercept of the line of the mixture ratio α, while being the mixture ratio α of the target pixel. In equation (13), the index i is known, but the gradient l and the intercept p are not known.

Figure 53:
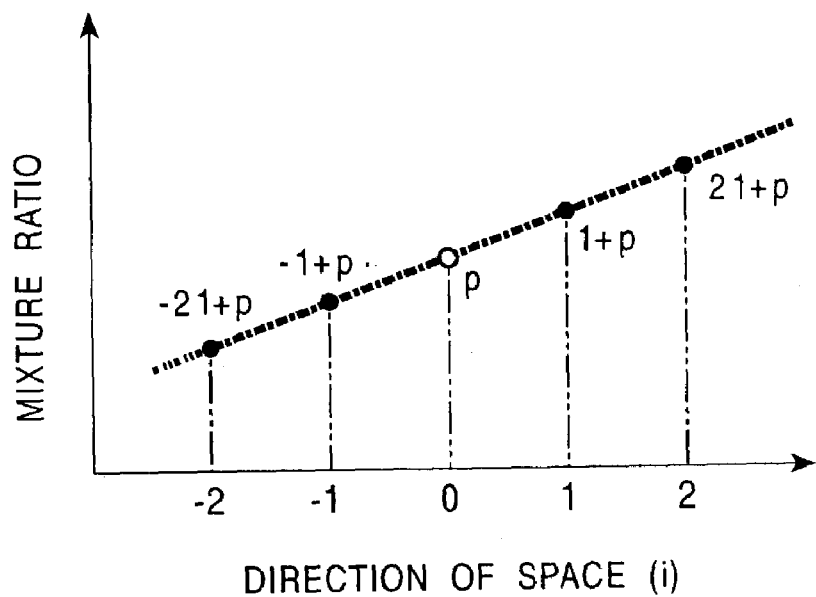
FIG. 53 illustrates a straight line approximating the mixture ratio α.

FIG. 53 illustrates the relationship of the index i, the gradient l, and the intercept p.

By approximating the mixture ratio α using equation (13), a plurality of different mixture ratios α for a plurality of pixels is expressed using the two variables. In the example shown in FIG. 53, five mixture ratios of five pixels are expressed using the two variables, namely, the gradient l and the intercept p.

Figure 54:
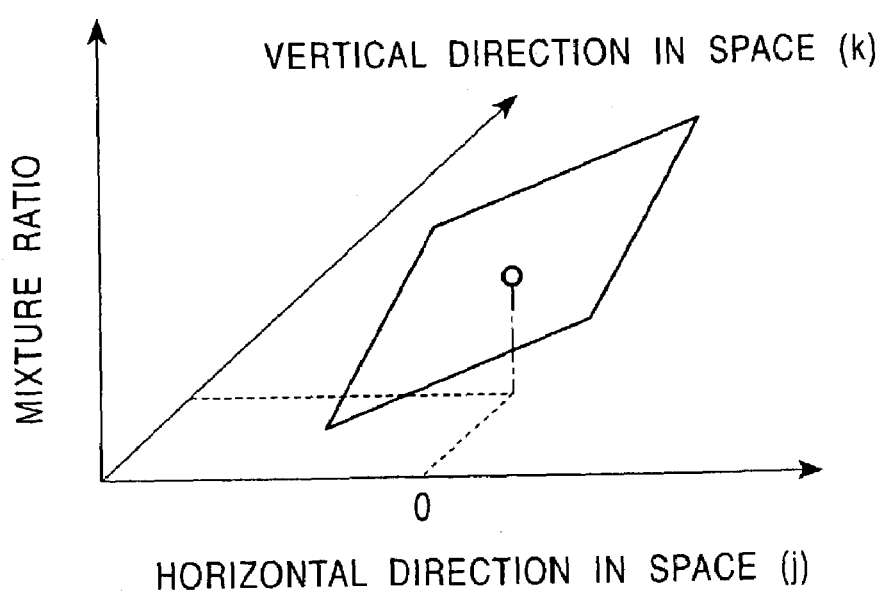
FIG. 54 illustrates a plane approximating the mixture ratio α.

Now, the mixture ratio α is approximated using a plane as illustrated in FIG. 54. When equation (13) is extended into the plane taking into consideration the movement v in two directions of the horizontal direction and the vertical direction of the image, the mixture ratio α is expressed in equation (14).

$$\alpha=jm+kq+p \quad (14)$$

where j is an index in the horizontal direction with the position of a target pixel at zero, k is an index in the vertical direction, m is a gradient of the plane of the mixture ratio α in the horizontal direction, q is a gradient of the plane of the mixture ratio α in the vertical direction, and p is an intercept of the plane of the mixture ratio α.

In the frame #n illustrated in FIG. 51, equations (15) through (17) are established concerning C05 through C07.

$$C05 = \alpha 05 \cdot B05/v + f05 \quad (15)$$

$$C06 = \alpha 06 \cdot B06/v + f06 \quad (16)$$

$$C07 = \alpha 07 \cdot B07/v + f07 \quad (17)$$

Assuming that the foreground components coincide with each other in the vicinity thereof, in other words, assuming that F01 through F03 equal each other, Fc is substituted for F01 and F03, and equation (18) holds.

$$f(x) = (l - \alpha(x)) \cdot Fc \quad (18)$$

where x represents a position in the direction of space.

If equation (14) is substituted for α(x), equation (18) is expressed as equation (19).

$$\begin{aligned} f(x) &= (1 - (jm + kq + p)) \cdot Fc \\ &= j \cdot (-m \cdot Fc) + k \cdot (-q \cdot Fc) + ((1 - p) \cdot Fc) \\ &= js + kt + u \end{aligned} \quad (19)$$

where (−m·Fc), (−q·Fc), and (l−p)·Fc are expressed in equations (20) through (22), respectively.

$$s = -m \cdot Fc \quad (20)$$

$$t = -q \cdot Fc \quad (21)$$

$$u = (l-p) \cdot Fc \quad (22)$$

where j is an index in the horizontal direction with the position of a target pixel at zero, and k is an index in the vertical direction.

In this way, the sum of the foreground component is expressed in equation (19) because the assumption that the foreground object moves at a constant speed within the shutter time, and the assumption that the foreground components coincide with each other in the vicinity thereof are established.

When the mixture ratio α is approximated using the straight line, the sum of the foreground components is expressed in equation (23).

$$f(x) = is + u \quad (23)$$

The pixel value M is expressed in equation (24) if equations (14) and (19) are substituted for the mixture ratio α in equation (13) and the sum of the foreground components.

$$\begin{aligned} M &= (jm + kq + p) \cdot B + js + kt + u \\ &= jB \cdot m + kB \cdot q + B \cdot p + j \cdot s + k \cdot t + u \end{aligned} \quad (24)$$

where unknown variables are six, namely, the gradient m of the plane of the mixture ratio α in the horizontal direction, the gradient q of the plane of the mixture ratio α in the vertical direction, the intercept p of the plane of the mixture ratio α, s, t, and u.

The pixel value M and pixel value B are set up in equation (24) for pixels in the vicinity of the target pixel, and the least square method is applied to a plurality of equations, in which the pixel M and the pixel B are set up, to calculate the mixture ratio α.

For example, if the pixel value M or the pixel value B is set up in the normal equation (24) for pixels of 3×3 surrounding the target pixel with the index j of the target pixel in the horizontal direction at zero and with the index k of the target pixel in the vertical direction at zero, equations (25) through (33) result.

$$M_{-1,-1} = (-1) \cdot B_{-1,-1} \cdot m + (-1) \cdot B_{-1,-1} \cdot q + B_{-1,-1} \cdot p + (-1) \cdot s + (-1) \cdot t + u \quad (25)$$

$$M_{0,-1} = (0) \cdot B_{0,-1} \cdot m + (-1) \cdot B_{0,-1} \cdot q + B_{0,-1} \cdot p + (0) \cdot s + (-1) \cdot t + u \quad (26)$$

$$M_{+1,-1} = (+1) \cdot B_{+1,-1} \cdot m + (-1) \cdot B_{+1,-1} \cdot q + B_{+1,-1} \cdot p + (+1) \cdot s + (-1) \cdot t + u \quad (27)$$

$$M_{-1,0} = (-1) \cdot B_{-1,0} \cdot m + (0) \cdot B_{-1,0} \cdot q + B_{-1,0} \cdot p + (-1) \cdot s + (0) \cdot t + u \quad (28)$$

$$M_{0,0} = (0) \cdot B_{0,0} \cdot m + (0) \cdot B_{0,0} \cdot q + B_{0,0} \cdot p + (0) \cdot s + (0) \cdot t + u \quad (29)$$

$$M_{+1,0} = (+1) \cdot B_{+1,0} \cdot m + (0) \cdot B_{+1,0} \cdot q + B_{+1,0} \cdot p + (+1) \cdot s + (0) \cdot t + u \quad (30)$$

$$M_{-1,+1} = (-1) \cdot B_{-1,+1} \cdot m + (+1) \cdot B_{-1,+1} \cdot q + B_{-1,+1} \cdot p + (-1) \cdot s + (+1) \cdot t + u \quad (31)$$

$$M_{0,+1} = (0) \cdot B_{0,+1} \cdot m + (+1) \cdot B_{0,+1} \cdot q + B_{0,+1} \cdot p + (0) \cdot s + (+1) \cdot t + u \quad (32)$$

$$M_{+1,+1} = (+1) \cdot B_{+1,+1} \cdot m + (+1) \cdot B_{+1,+1} \cdot q + B_{+1,+1} \cdot p + (+1) \cdot s + (+1) \cdot t + u \quad (33)$$

The index j of the target pixel in the horizontal direction is 0, and the index k of the target pixel in the vertical direction is 0. The mixture ratio α of the target pixel becomes equal to the intercept p with j=0 and k=0 in equation (14).

From nine equations (25) through (33), the horizontal gradient m, the vertical gradient q, the intercept p, s, t, and u are respectively calculated using the least squares method, and the intercept p is output as the mixture ratio α.

The routine for calculating the mixture ratio α using the least squares method is specifically discussed below.

If the index i and the index j are expressed using a single index x, the index i, the index j, and the index x are related in equation (34).

$$x = (j+1) \cdot 3 + (k+1) \quad (34)$$

The horizontal gradient m, the vertical gradient q, the intercept p, s, t, and u are respectively represented by w0, w1, w2, w3, w4, and w5, and jB, kB, B, j, k, and l are respectively represented by a0, a1, a2, a3, a4, and a5. Taking into account an error ex, equations (25) through (33) will be rewritten as equation (35).

$$Mx = \sum_{y=0}^{5} ay \cdot wy + ex \quad (35)$$

where x is one of integers 0 through 8.

Equation (35) leads to equation (36).

$$ex = Mx - \sum_{y=0}^{5} ay \cdot wy \qquad (36)$$

To apply the least squares method, the sum of squares of error is now defined by equation (37).

$$E = \sum_{x=0}^{8} ex^2 \qquad (37)$$

To minimize the error, a partial differential of the sum E of squares of error with respect to a variable Wv must be zero. Here, v represents one of integers 0 through 5, and wy that satisfies equation (38) is determined.

$$\frac{\partial E}{\partial wv} = 2 \cdot \sum_{x=0}^{8} ex \cdot \frac{\partial ex}{\partial wv} \qquad (38)$$

$$= 2 \cdot \sum_{x=0}^{8} ex \cdot av = 0$$

Equation (36) is substituted for ex in equation (38), and then equation (39) results.

$$\sum_{x=0}^{8} \left( av \cdot \sum_{y=0}^{5} ay \cdot wy \right) = \sum_{x=0}^{8} av \cdot Mx \qquad (39)$$

To calculate wy, the sweep-out method (Gauss-Jordan Elimination Method) is applied to the normal equation containing six equations which are obtained by substituting integers 0 through 5 for v in equation (39). As described above, w0 is the horizontal gradient m, w1 is the vertical gradient q, w2 is the intercept p, w3 is s, w4 is t, and w5 is u.

The horizontal gradient m, the vertical gradient q, the intercept pi s, t, and u are determined by applying the least squares method to the equations in which the pixel value M and the pixel value B are set.

The intercept p is the mixture ratio α at a center point with the indexes i and k at zero, and is output.

In the discussion of equations (25) through (33), the pixel value of the pixel in the mixed area is M and the pixel value of the pixel in the background area is B. The normal equation must be formulated in each case when the target pixel is in the covered background area or in the uncovered background area.

When the mixture ratio α of the pixel contained in the covered background in the frame #n as shown in FIG. 51 is determined, pixels C04 through C08 in the frame #n and pixel values P04 through P08 of the pixels in the frame #n−1 are factored into the normal equation.

When the mixture ratio α of the pixel contained in the uncovered background in the frame #n as shown in FIG. 52 is determined, pixels C28 through C32 in the frame #n and pixel values N28 through N32 of the pixels in the frame #n+1 are factored into the normal equation.

Figure 55:
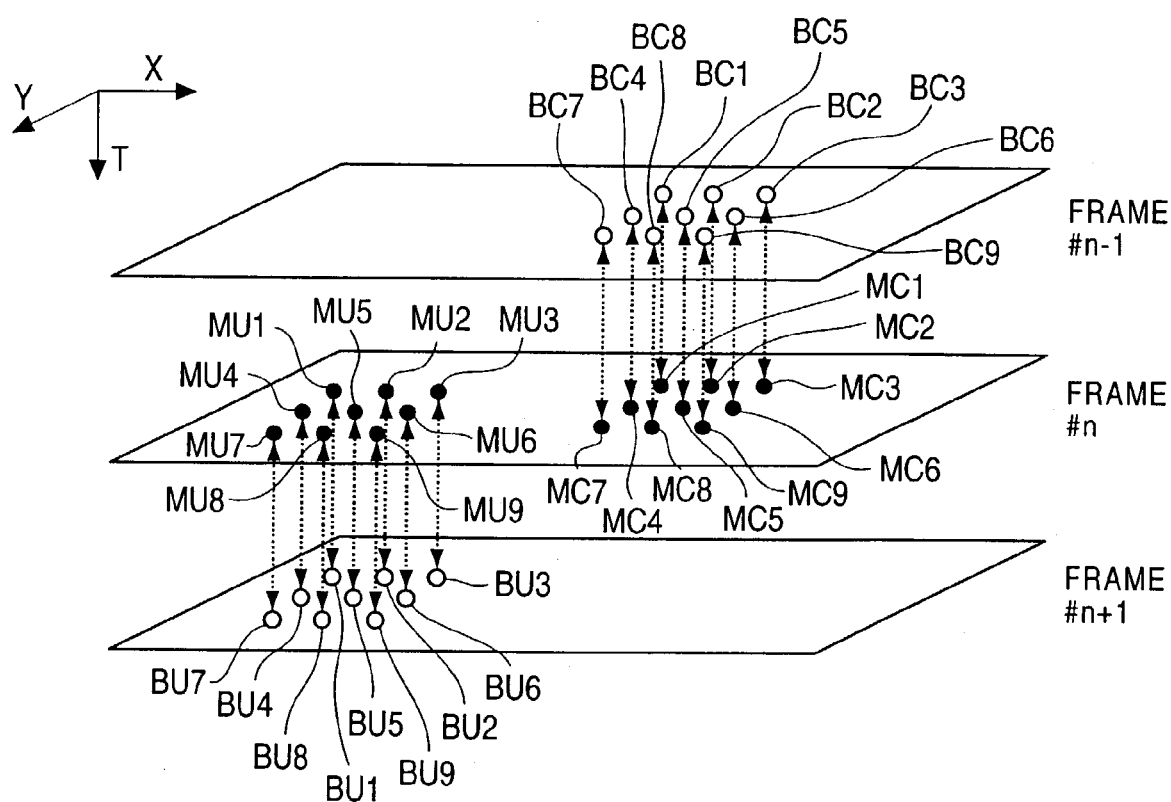
FIG. 55 is a diagram illustrating the correspondence of pixels among a plurality of frames in the calculation of the mixture ratio α.

When the mixture ratio α of the pixel contained in the covered background as shown in FIG. 55 is calculated, equations (40) through (48) hold. The pixel value of the pixel for calculating the mixture ratio α is Mc5.

$$Mc1 = (-1) \cdot Bc1 \cdot m + (-1) \cdot Bc1 \cdot q + Bc1 \cdot p + (-1) \cdot s + (-1) \cdot t + u \qquad (40)$$

$$Mc2 = (0) \cdot Bc2 \cdot m + (-1) \cdot Bc2 \cdot q + Bc2 \cdot p + (0) \cdot s + (-1) \cdot t + u \qquad (41)$$

$$Mc3 = (+1) \cdot Bc3 \cdot m + (-1) \cdot Bc3 \cdot q + Bc3 \cdot p + (+1) \cdot s + (-1) \cdot t + u \qquad (42)$$

$$Mc4 = (-1) \cdot Bc4 \cdot m + (0) \cdot Bc4 \cdot q + Bc4 \cdot p + (-1) \cdot s + (0) \cdot t + u \qquad (43)$$

$$Mc5 = (0) \cdot Bc5 \cdot m + (0) \cdot Bc5 \cdot q + Bc5 \cdot p + (0) \cdot s + (0) \cdot t + u \qquad (44)$$

$$Mc6 = (+1) \cdot Bc6 \cdot m + (0) \cdot Bc6 \cdot q + Bc6 \cdot p + (+1) \cdot s + (0) \cdot t + u \qquad (45)$$

$$Mc7 = (-1) \cdot Bc7 \cdot m + (+1) \cdot Bc7 \cdot q + Bc7 \cdot p + (-1) \cdot s + (+1) \cdot t + u \qquad (46)$$

$$Mc8 = (0) \cdot Bc8 \cdot m + (+1) \cdot Bc8 \cdot q + Bc8 \cdot p + (0) \cdot s + (+1) \cdot t + u \qquad (47)$$

$$Mc9 = (+1) \cdot Bc9 \cdot m + (+1) \cdot Bc9 \cdot q + Bc9 \cdot p + (+1) \cdot s + (+1) \cdot t + u \qquad (48)$$

When the mixture ratio α of the pixel contained in the covered background in the frame #n is calculated, the pixel values Bc1 through Bc9 of the pixels in the background area of the pixels in the frame #n−1 corresponding to the pixels in the frame #n are used in equations (40) through (48).

When the mixture ratio α of the pixels contained in the uncovered background area is calculated, the following equations (49) through (57) hold. The pixel value of the pixel for calculating the mixture ratio α is Mu5.

$$Mu1 = (-1) \cdot Bu1 \cdot m + (-1) \cdot Bu1 \cdot q + Bu1 \cdot p + (-1) \cdot s + (-1) \cdot t + u \qquad (49)$$

$$Mu2 = (0) \cdot Bu2 \cdot m + (-1) \cdot Bu2 \cdot q + Bu2 \cdot p + (0) \cdot s + (-1) \cdot t + u \qquad (50)$$

$$Mu3 = (+1) \cdot Bu3 \cdot m + (-1) \cdot Bu3 \cdot q + Bu3 \cdot p + (+1) \cdot s + (-1) \cdot t + u \qquad (51)$$

$$Mu4 = (-1) \cdot Bu4 \cdot m + (0) \cdot Bu4 \cdot q + Bu4 \cdot p + (-1) \cdot s + (0) \cdot t + u \qquad (52)$$

$$Mu5 = (0) \cdot Bu5 \cdot m + (0) \cdot Bu5 \cdot q + Bu5 \cdot p + (0) \cdot s + (0) \cdot t + u \qquad (53)$$

$$Mu6 = (+1) \cdot Bu6 \cdot m + (0) \cdot Bu6 \cdot q + Bu6 \cdot p + (+1) \cdot s + (0) \cdot t + u \qquad (54)$$

$$Mu7 = (-1) \cdot Bu7 \cdot m + (+1) \cdot Bu7 \cdot q + Bu7 \cdot p + (-1) \cdot s + (+1) \cdot t + u \qquad (55)$$

$$Mu8 = (0) \cdot Bu8 \cdot m + (+1) \cdot Bu8 \cdot q + Bu8 \cdot p + (0) \cdot s + (+1) \cdot t + u \qquad (56)$$

$$Mu9 = (+1) \cdot Bu9 \cdot m + (+1) \cdot Bu9 \cdot q + Bu9 \cdot p + (+1) \cdot s + (+1) \cdot t + u \qquad (57)$$

When the mixture ratio α of the pixel contained in the uncovered background in the frame #n is calculated, the pixel values Bu1 through Bu9 of the pixels in the background area of the pixels in the frame #n−1 corresponding to the pixels in the frame #n in equations (49) through (57) are used.

Figure 56:
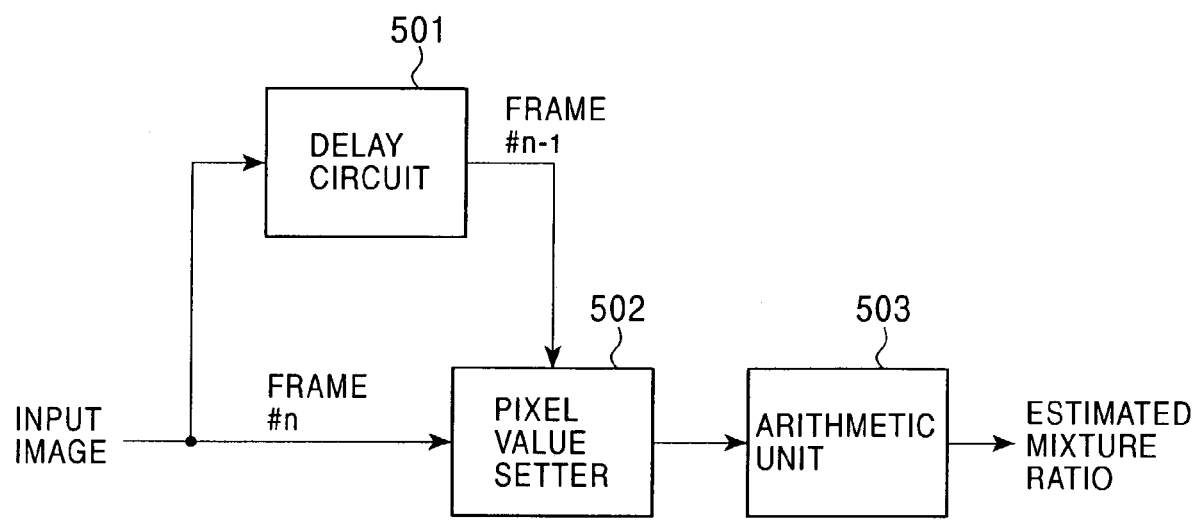
FIG. 56 is a block diagram illustrating an estimated mixture ratio processor 401.

FIG. 56 is a block diagram illustrating an estimated mixture ratio processor 401. The image, input to the estimated mixture ratio processor 401, is fed to a delay circuit 501 and a pixel value setter 502.

A delay circuit 221 delays the input image by one frame, and feeds the delayed input image to the pixel value setter 502. The delay circuit 221 supplies the pixel value setter 502 with the frame #n−1 when the frame #n is fed as the input image.

The pixel value setter 502 sets the pixel value of a pixel in the vicinity of a pixel for which the mixture ratio α is calculated, and a pixel value in the frame #n−1 in the normal equation. For example, based on equations (40) through (48), the pixel value setter 502 sets the pixel values Mc1 through Mc9 and the pixel values Bc1 through Bc9 in the normal equation. The pixel value setter 502 supplies an arithmetic unit 503 with the normal equation with the pixel values set therewithin.

The arithmetic unit 503 solves the normal equation supplied from the pixel value setter 502 using the sweep-out method to determine the estimated mixture ratio, and outputs the determined estimated mixture ratio.

In this way, the estimated mixture ratio processor 401 calculates the estimated mixture ratio based on the input image, and then feeds the estimated mixture ratio to the mixture ratio determiner 403.

The estimated mixture ratio processor 402 has the same construction as that of the estimated mixture ratio processor 401, and the discussion thereof is omitted here.

Figure 57:
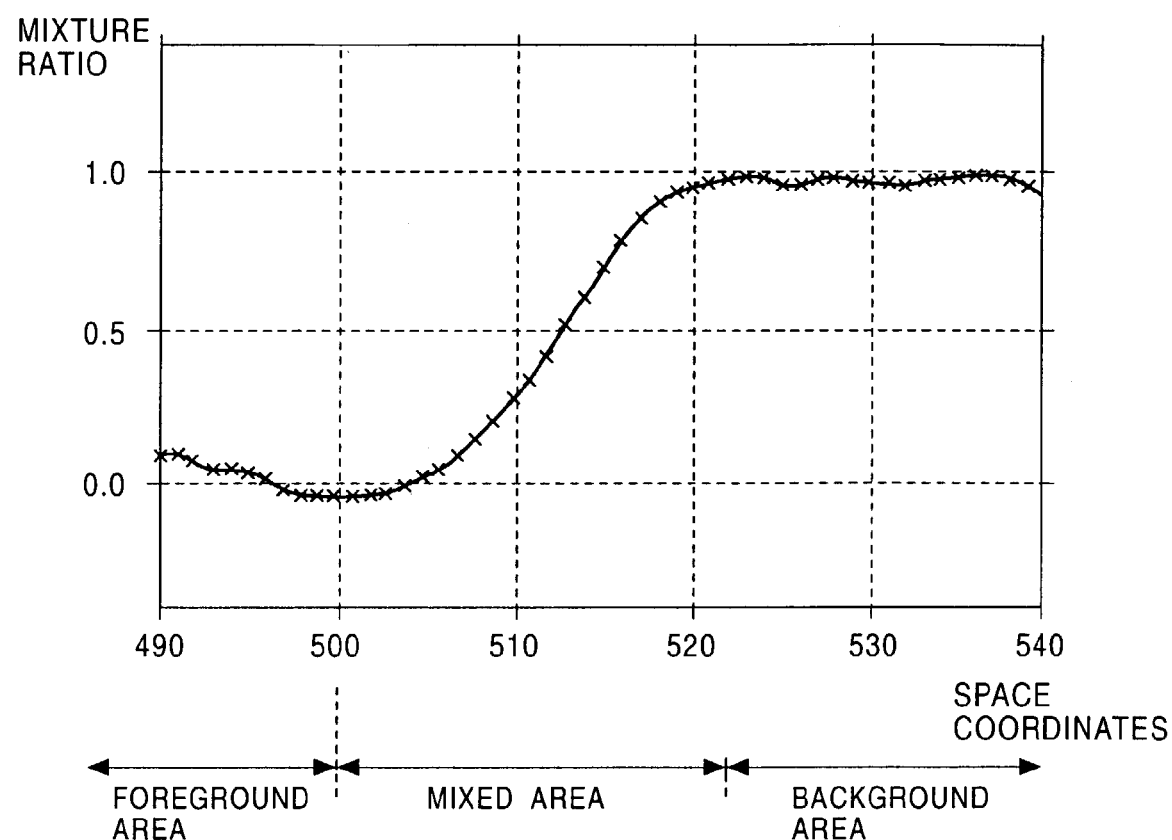
FIG. 57 illustrates an example of an estimated mixture ratio.

FIG. 57 illustrates an example of the estimated mixture ratio calculated by the estimated mixture ratio processor 401. Referring to FIG. 57, the movement v of the foreground object moving at a constant speed is 11, and the equations are formed using a block of 7×7 pixels as a unit. The estimated mixture ratio is then calculated from the equations and is illustrated with respect to one line.

The estimated mixture ratio generally linearly changes in the mixed area as illustrated in FIG. 50.

The mixture ratio determiner 403 sets the mixture ratio based on the area information which is provided by the area determiner 101 and indicates which one of the foreground area, the background area, the covered background area, and the uncovered background area each pixel with the mixture ratio thereof to be determined belongs to. The mixture ratio determiner 403 sets the mixture ratio to 0 when the target pixel belongs to the foreground area, sets the mixture ratio to 1 when the target pixel belongs to the background area, sets the mixture ratio to the estimated mixture ratio supplied from the estimated mixture ratio processor 401 when the target pixel belongs to the covered background area, and sets the mixture ratio to the estimated mixture ratio supplied from the estimated mixture ratio processor 402 when the target pixel belongs to the uncovered background area. The mixture ratio determiner 403 outputs the mixture ratio that is determined in response to the area information.

Figure 58:
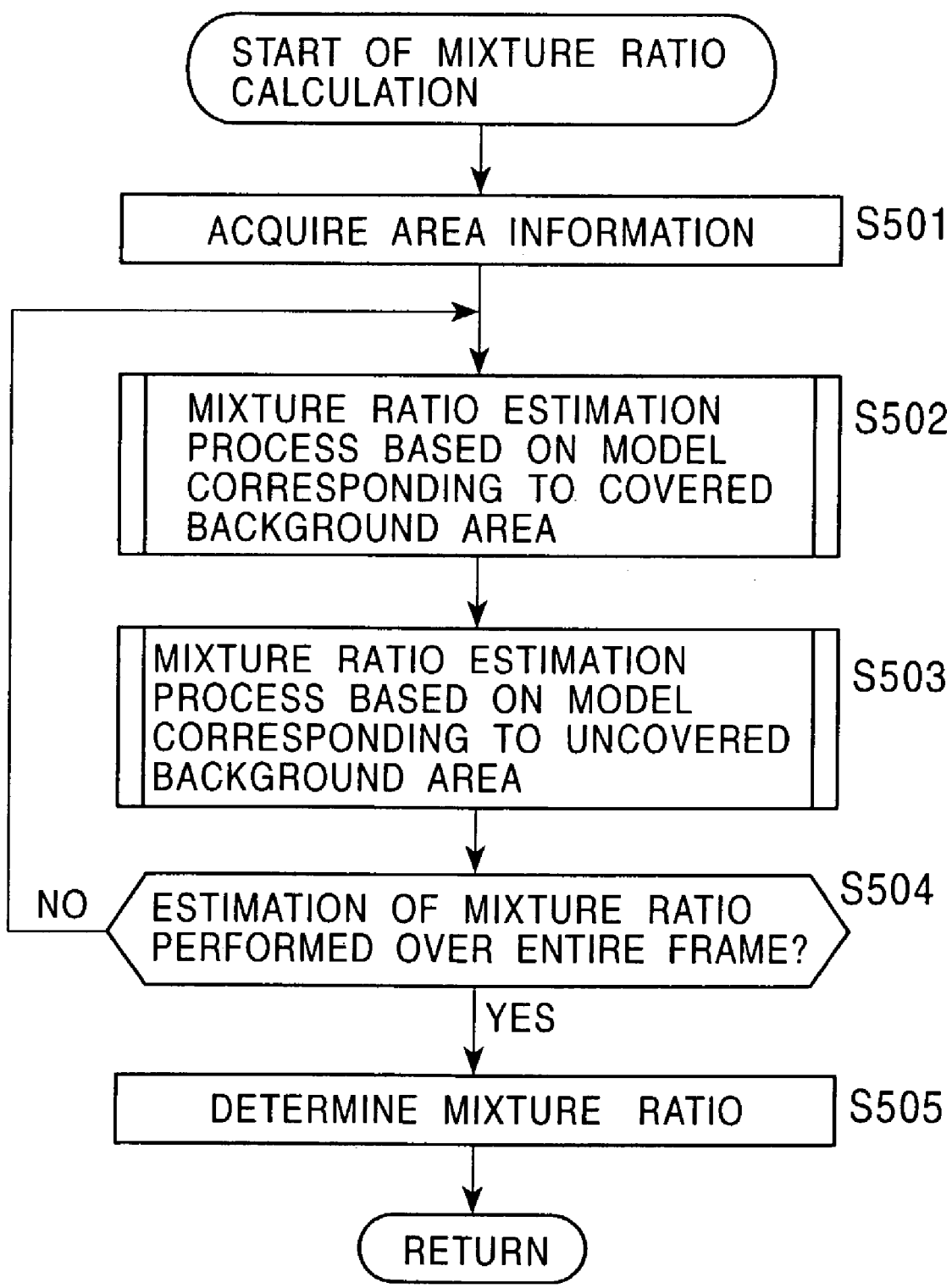
FIG. 58 is a flow diagram illustrating a calculation process of the mixture ratio.

Referring to a flow diagram illustrated in FIG. 58, the calculation process of the mixture ratio calculator 102 for calculating the mixture ratio is discussed. In step S501, the mixture ratio calculator 102 acquires the area information supplied from the area determiner 101. In step S502, the estimated mixture ratio processor 401 performs the mixture ratio estimation process using the model of the covered background area, and feeds the estimated mixture ratio to the mixture ratio determiner 403. The detail of the mixture ratio estimation process will be discussed later with reference to a flow diagram illustrated in FIG. 59.

In step S503, the estimated mixture ratio processor 402 performs the mixture ratio estimation process using the model of the uncovered background area, and feeds the estimated mixture ratio to the mixture ratio determiner 403.

In step S504, the mixture ratio calculator 102 determines whether the mixture ratio is estimated for the entire frame. When it is determined that the estimation of the mixture ratio is not completed for the entire frame, the routine returns to step S502 to perform the estimation of the mixture ratio for the next pixel.

When it is determined in step S504 that the estimation of the mixture ratio is completed for the entire frame, the routine proceeds to step S505. The mixture ratio determiner 403 sets the mixture ratio depending on the area information which is provided by the area determiner 101 and indicates which one of the foreground area, the background area, the covered background area, and the uncovered background area each pixel with the mixture ratio thereof to be determined belongs to. The mixture ratio determiner 403 sets the mixture ratio to 0 when the target pixel belongs to the foreground area, sets the mixture ratio to 1 when the target pixel belongs to the background area, sets the mixture ratio to the estimated mixture ratio supplied from the estimated mixture ratio processor 401 when the target pixel belongs to the covered background area, and sets the mixture ratio to the estimated mixture ratio supplied from the estimated mixture ratio processor 402 when the target pixel belongs to the uncovered background area.

In this way, the mixture ratio calculator 102 calculates the mixture ratio $\alpha$ which is a feature quantity of each pixel, based on the area information supplied from the area determiner 101 and the input image.

The use of the mixture ratio $\alpha$ allows the foreground component and the background component in the pixel value to be separated with the motion blur information contained in the image of the moving object left intact.

The mixture ratio estimation process using the model of the covered background area, corresponding to step 502 in FIG. 58, is discussed with reference to the flow diagram illustrated in FIG. 59.

In step S521, the pixel value setter 502 sets the pixel value of the pixel contained in the input image, and the pixel value of the pixel contained in the image supplied from the delay circuit 221 in the normal equation corresponding to the model of the covered background area.

In step S522, the estimated mixture ratio processor 401 determines whether the setting of the pixel value of the target pixel is complete. When it is determined that the setting of the pixel value is not yet complete, the routine loops to step S521. The setting of the pixel value in the normal equation is repeated.

When it is determined in step S522 that the setting of the pixel value is complete, the routine proceeds to step S523. The arithmetic unit 173 solves the normal equation with the pixel value set therewithin, thereby calculating the estimated mixture ratio and outputting the determined estimated ratio.

In this way, the estimated mixture ratio processor 401 calculates the estimated mixture ratio based on the input image.

Figure 59:
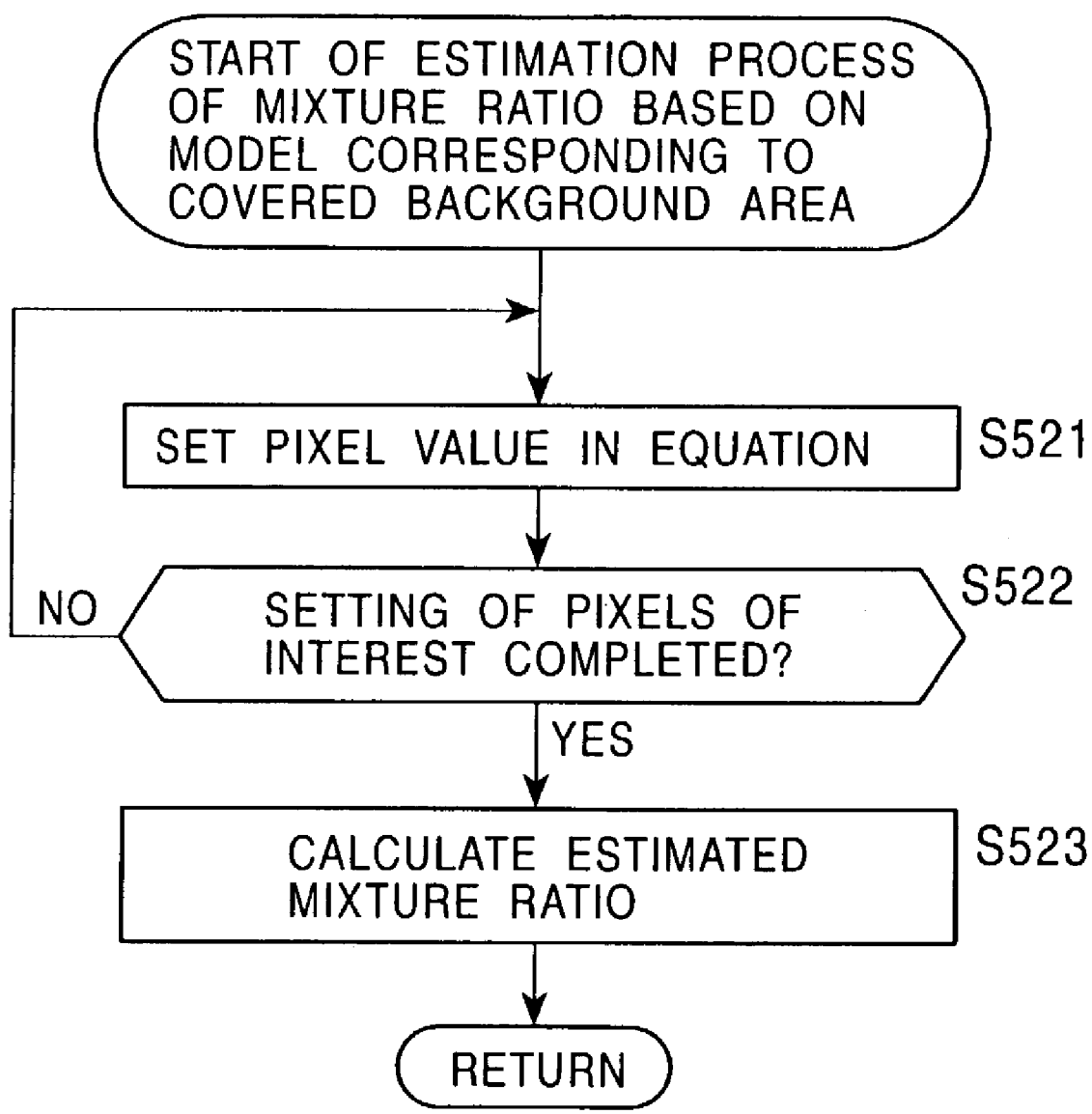
FIG. 59 is a flow diagram illustrating the mixture ratio estimation process in a model corresponding to the covered background area.

The mixture ratio estimation process of the model of the uncovered background in step S153 illustrated in FIG. 58 remains unchanged from the process in the flow diagram illustrated in FIG. 59 which uses the normal equation of the model of the uncovered background area, and the discussion thereof is omitted here.

In the above discussion, the object of the background is still. Even if the image corresponding to the background area has a moving component, the above-referenced mixture ratio determination process is applicable. For example, when the image corresponding to the background area uniformly moves, the estimated mixture ratio processor 401 performs the same process as when the object of the background is still, by shifting the entire image in accordance with the movement. When the image of the background area contains moving portions different from location to location, the estimated mixture ratio processor 401 selects pixels in response to respective movements, and performs the above-referenced process.

The mixture ratio calculator 104 may perform only the mixture ratio estimation process of the model corresponding to the covered background area for all pixels, and may output the calculated estimated mixture ratio as the mixture ratio $\alpha$. In this case, the mixture ratio $\alpha$ indicates the ratio of the background component for the pixels belonging to the covered background area, and indicates the ratio of the foreground component for the pixels belonging to the uncovered background area. The absolute value of the difference between the mixture ratio α thus calculated and 1 in connection with the pixels in the uncovered background area is calculated, and the calculated absolute value is set as a mixture ratio α. The signal processor 12 thus determines the mixture ratio α indicating the ratio of the background area for the pixels belonging to the uncovered background.

Similarly, the mixture ratio calculator 104 may perform only the mixture ratio estimation process of the model corresponding to the uncovered background area for all pixels, and may output the calculated estimated mixture ratio as the mixture ratio α.

Figure 60:
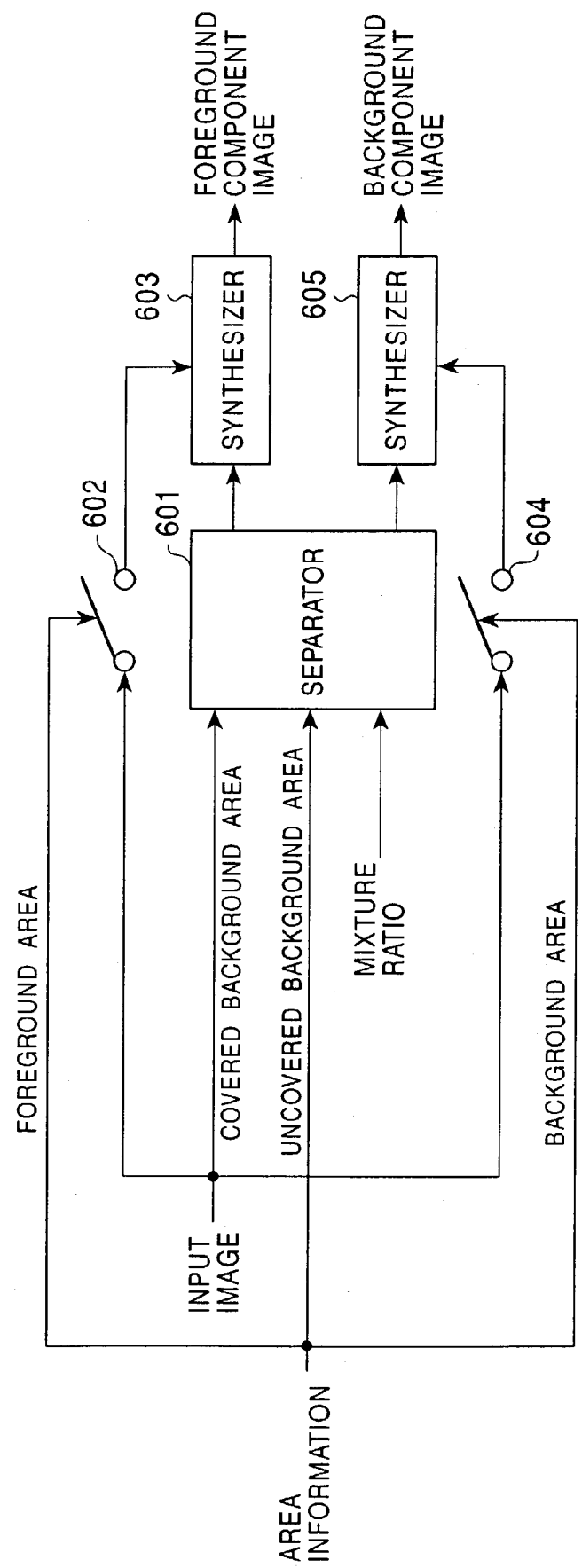
FIG. 60 is a block diagram illustrating one example of a foreground and background separator 105.

The foreground and background separator 105 is discussed below. FIG. 60 is a block diagram illustrating one example of the foreground and background separator 105. The input image fed to the foreground and background separator 105 is input to a separator 601, a switch 602, and a switch 604. The information indicating the covered background area and the area information from the area determiner 103 indicating the uncovered background area are fed to the separator 601. The area information indicating the foreground area is fed to the switch 602. The area information indicating the background area is fed to the switch 604.

The mixture ratio α supplied from the mixture ratio calculator 104 is fed to the separator 601.

The separator 601 separates the foreground component from the input image based on the area information indicating the covered background area, the area information indicating the uncovered background area, and the mixture ratio α, and feeds the separated foreground component to a synthesizer 603. Furthermore, the separator 601 separates the background component from the input image, and feeds the separated background component to a synthesizer 605.

In response to the area information indicating the foreground area, the switch 602 is closed when the pixel of the foreground is input, and feeds only the pixels of the foreground contained in the input image to the synthesizer 603.

In response to the area information indicating the background area, the switch 604 is closed when the pixel of the background is input, and feeds only the pixels of the background contained in the input image to the synthesizer 605.

The synthesizer 603 synthesizes a foreground component image based on the component of the foreground fed from the separator 601 and the pixel of the foreground supplied from the switch 602, and outputs the synthesized foreground component image. Since the foreground area and the mixed area do not overlap each other, the synthesizer 603 synthesizes the foreground component image by OR-gating the component of the foreground and the pixel of the foreground.

During an initialization process executed for a synthesis process of the foreground component image, the synthesizer 603 stores all images having pixel values of zero in the built-in frame memory, and then stores (writes) the foreground component image in the synthesis process of the foreground component image. Out of the foreground component image output from the synthesizer 603, the pixels of the background area have pixel values of zero.

The synthesizer 605 synthesizes the background component image based on the background component supplied from the separator 601 and the pixel of the background supplied from the switch 604, and outputs the synthesized background component image. Since the background area and the mixed area do not overlap each other, the synthesizer 605 synthesizes the background component image by OR-gating the background component and the pixel of the background.

During an initialization process executed for a synthesis process of the background component image, the synthesizer 605 stores all images having pixel values of zero in the built-in frame memory, and then stores (writes) the background component image in the synthesis process of the background component image. Out of the background component image output from the synthesizer 605, the pixels of the foreground area have pixel values of zero.

FIG. 61A is a diagram illustrating the input image input to the foreground and background separator 105, the foreground component image, and the background component image output from the foreground and background separator 105, and FIG. 61B is a diagram illustrating a model in which a line of pixels is developed in time axis, wherein the pixels in the foreground area, the pixels in the background area, and the pixels in the mixed area are included as illustrated in FIG. 61A.

Referring to FIG. 61A and FIG. 61B, the background component image output from the foreground and background separator 105 is composed of the foreground components contained in the pixels in the background area, and in the pixels in the mixed area.

Referring to FIG. 61A and FIG. 61B, the foreground component image output from the foreground and background separator 105 is composed of the foreground components contained in the pixels in the foreground area, and in the pixels in the mixed area.

The pixel value of a pixel in the mixed area is separated into a background component and a foreground component by the foreground and background separator 105. The separated background component forms the background component image together with the pixel belonging to the background area. The separated foreground component forms the foreground component image together with the pixel falling within the foreground area.

In the foreground component image, the pixel values of the pixels in the background area are set to be 0, while the pixel values of the pixels in the foreground area and the pixel values of the pixels in the mixed area are set to be meaningful values. Similarly, in the background component image, the pixel values of the pixels in the foreground area are set to be 0, while the pixel values of the pixels in the background area and the pixel values of the pixels in the mixed area are set to be meaningful values.

Discussed next is the separation process of the separator 601 for separating the foreground component and the background component from the pixel falling within the mixed area.

Figure 62:
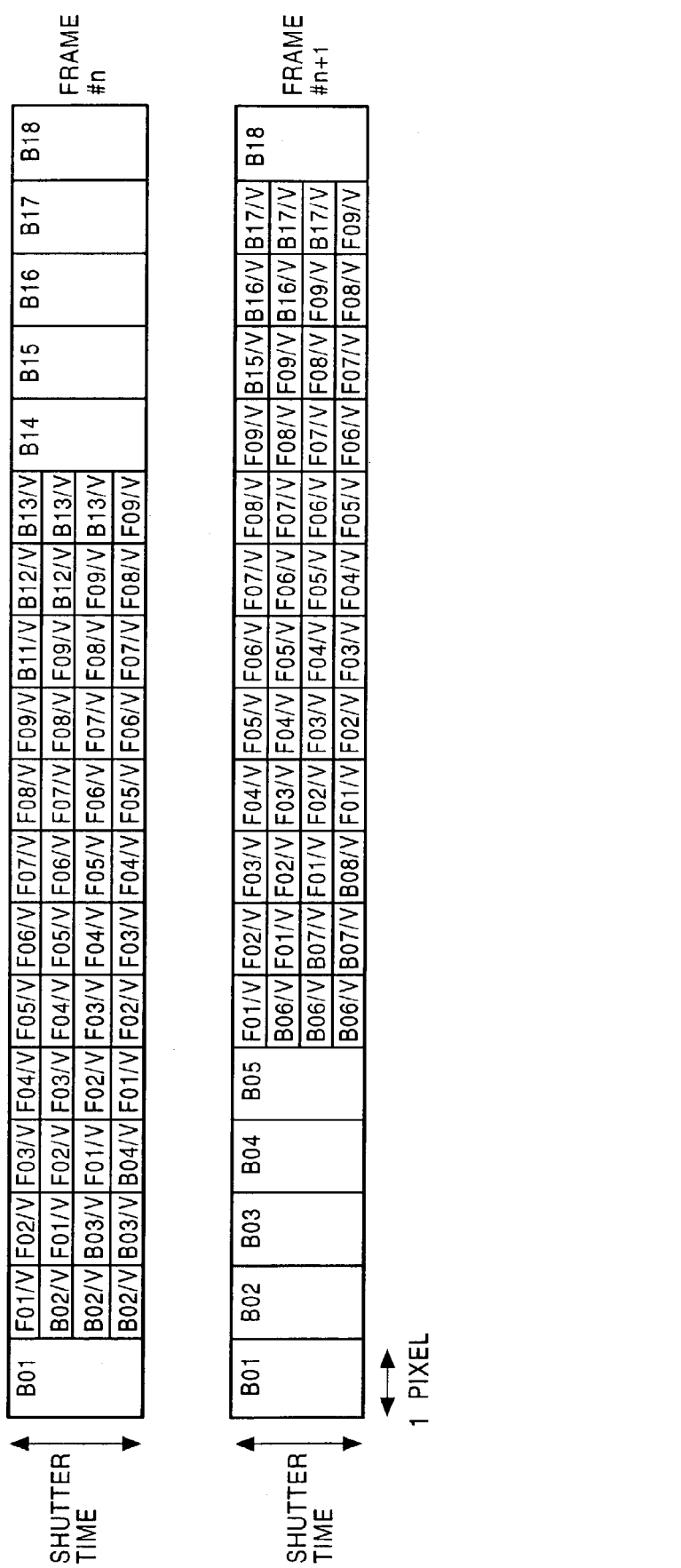
FIG. 62 is a model diagram illustrating the pixel values developed in time axis for a duration of time, which is divided and corresponds to shutter time.

FIG. 62 is a model diagram illustrating a model which includes the foreground component and the background component of two frames including a foreground object moving from left to right as shown. In the model of the image illustrated in FIG. 62, the amount of movement v of the foreground is 4, and the virtual-divisor number is 4.

The leftmost pixel and fourteenth through eighteenth pixels in the frame #n from the left-hand side thereof contain a background component only, and fall within the background area. The second through fourth pixels in the frame #n from the left-hand side thereof contain a background component and a foreground component, and fall within the uncovered background area. The eleventh through thirteenth pixels in the frame #n from the left-hand side thereof contain a background component and a foreground component and fall within the covered background area. The fifth through tenth pixels in the frame #n from the left-hand side thereof contain a foreground component only, and fall within the foreground area.

The first through fifth pixels and eighteenth pixel in the frame #n+1 from the left-hand side thereof contain a background component only, and fall within the background area. The sixth through eighth pixels in the frame #n+1 from the left-hand side thereof contain a background component and a foreground component, and fall within the uncovered background area. The fifteenth through seventeenth pixels in the frame #n+1 from the left-hand side thereof contain a background component and a foreground component, and fall within a covered background area. The ninth through fourteenth pixels in the frame #n+1 from the left-hand side thereof contain a foreground component only, and fall within the foreground area.

Figure 63:
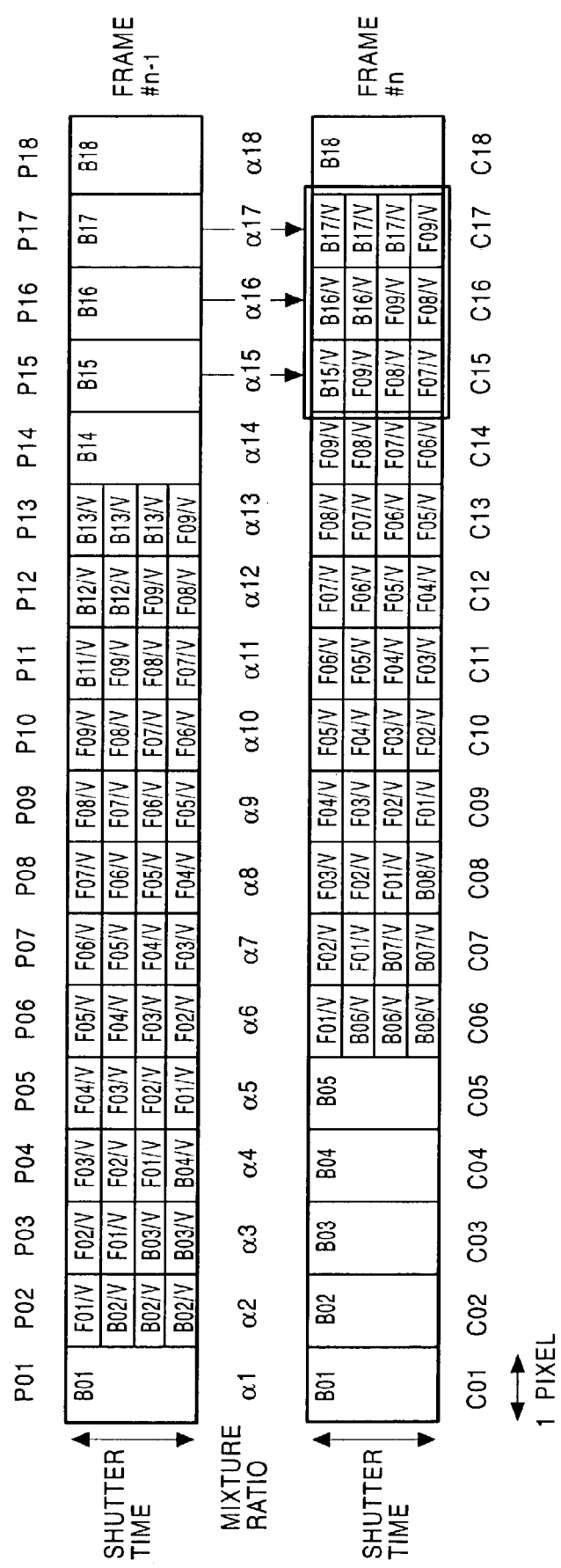
FIG. 63 is a model diagram illustrating the pixel values developed in the time axis for the duration of time, which is divided and corresponds to the shutter time.

FIG. 63 illustrates a process of separating a foreground component from a pixel of the covered background area. As shown, $\alpha 1$ through $\alpha 18$ are mixture ratios of the respective pixels in the frame #n. As shown, the fifteenth through seventeenth pixels from the left-hand side fall within the covered background area.

The pixel value C15 of the fifteenth pixel in the frame #n from the left-hand side thereof is expressed in equation (58).

$$C15 = B15/v + F09/v + F08/v + F07/v \qquad (58)$$
$$= \alpha 15 \cdot B15 + F09/v + F08/v + F07/v$$
$$= \alpha 15 \cdot P15 + F09/v + F08/v + F07/v$$

where $\alpha 15$ is a mixture ratio of the fifteenth pixel in the frame #n from the left-hand side thereof. P15 is a pixel value of the fifteenth pixel in the frame #n−1 from the left-hand side thereof.

From equation (58), the sum f15 of the foreground component of the fifteenth pixel in the frame #n from the left-hand side thereof is expressed in equation (59).

$$f15 = F09/v + F08/v + F07/v \qquad (59)$$
$$= C15 - \alpha 15 \cdot P15$$

Likewise, the sum f16 of the foreground component of the sixteenth pixel in the frame #n from the left-hand side thereof is expressed in equation (60). The sum f17 of the foreground component of the seventeenth pixel in the frame #n from the left-hand side thereof is expressed in equation (61).

$$f16 = C16 - \alpha 16 \cdot P16 \qquad (60)$$

$$f17 = C17 - \alpha 17 \cdot P17 \qquad (61)$$

The foreground component fc contained in the pixel value C of the pixel falling within the covered background is expressed in equation (62).

$$fc = C - \alpha \cdot P \qquad (62)$$

where P is a pixel value of the corresponding pixel in an immediately prior frame.

Figure 64:
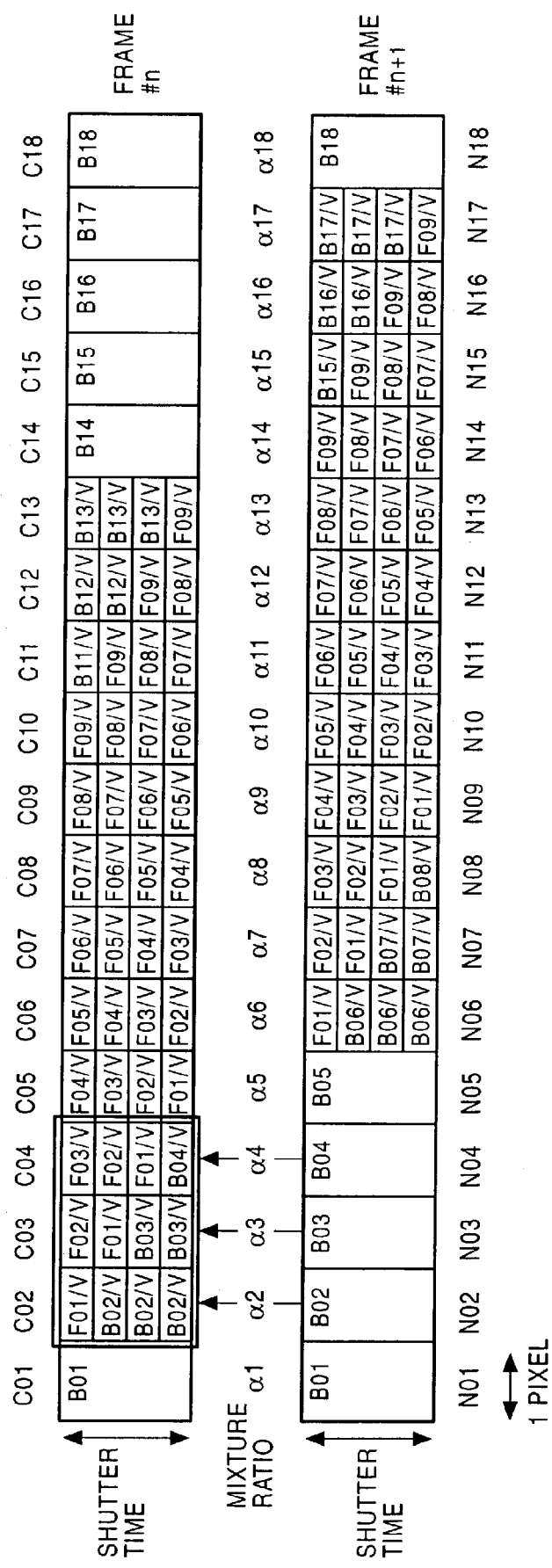
FIG. 64 is a model diagram illustrating the pixel values developed in the time axis for the duration of time, which is divided and corresponds to the shutter time.

FIG. 64 illustrates a process of separating a foreground component from a pixel of the uncovered background area. As shown, $\alpha 1$ through $\alpha 18$ are mixture ratios of the respective pixels in the frame #n. As shown, the second through fourth pixels from the left-hand side fall within the uncovered background area.

The pixel value C02 of the second pixel in the frame #n from the left-hand side thereof is expressed in equation (63).

$$C02 = B02/v + B02/v + B02/v + F01/v \qquad (63)$$
$$= \alpha 2 \cdot B02 + F01/v$$
$$= \alpha 2 \cdot N02 + F01/v$$

where $\alpha 2$ is a mixture ratio of the second pixel in the frame #n from the left-hand side thereof. N02 is a pixel value of the second pixel in the frame #n+1 from the left-hand side thereof.

From equation (63), the sum f02 of the foreground component of the second pixel in the frame #n from the left-hand side thereof is expressed in equation (64).

$$f02 = F01/v \qquad (64)$$
$$= C02 - \alpha 2 \cdot N02$$

Likewise, the sum f03 of the foreground component of the third pixel in the frame #n from the left-hand side thereof is expressed in equation (65). The sum f04 of the foreground component of the fourth pixel in the frame #n from the left-hand side thereof is expressed in equation (66).

$$f03 = C03 - \alpha 3 \cdot N03 \qquad (65)$$

$$f04 = C04 - \alpha 4 \cdot N04 \qquad (66)$$

The foreground component fu contained in the pixel value C of the pixel falling within the uncovered background is expressed in equation (67).

$$fu = C - \alpha \cdot N \qquad (67)$$

where N is a pixel value of the corresponding pixel in an immediately subsequent frame.

In this way, the separator 601 separates the foreground component and the background component from the pixel falling within the mixed area, based on the information indicating the covered background area, and the information indicating the uncovered background area contained in the area information, and the mixture ratio $\alpha$ of each pixel.

FIG. 65 is a block diagram illustrating one example of the construction of the separator 601. The image input to the separator 601 is fed to a frame memory 621, and the area information, indicating the covered background area and the uncovered background area, and the mixture ratio $\alpha$, supplied from the mixture ratio calculator 104 are fed to a separation processing block 622.

The frame memory 621 stores the input image in units of frame. When the frame to be processed is the frame #n, the frame memory 621 stores the frame #n−1, which is a frame immediately prior to the frame #n, the frame #n, and the frame #n+1, which is a frame immediately subsequent to the frame #n.

The frame memory 621 supplies the pixel values of the pixels of the frame #n−1, the frame #n, and the frame #n+1 to the separation processing block 622.

The separation processing block 622 applies the arithmetic operation discussed with reference to FIG. 63 and FIG. 64 to the pixel values of the pixels of the frame #n−1, the frame #n, and the frame #n+1 supplied from the frame memory 621, based on the area information indicating the covered background area, and the uncovered background area, and the mixture ratio α. The separation processing block 622 separates the foreground component and the background component falling within the mixed area in the frame #n, and feeds these components to a frame memory 623.

The separation processing block 622 includes an uncovered area processor 631, a covered area processor 632, a synthesizer 633, and a synthesizer 634.

A multiplier 641 in the uncovered area processor 631 multiplies the pixel value of the pixel in the frame #n+1 supplied from the frame memory 621 by the mixture ratio α, and then outputs the product to a switch 642. The switch 642 is closed when the pixel in the frame #n (corresponding to the pixel in the frame #n+1) supplied from the frame memory 621 falls within the uncovered background area, and feeds the pixel value multiplied by the mixture ratio α, supplied from the multiplier 641, to an arithmetic unit 643 and a synthesizer 634. The product which is obtained by multiplying the pixel value of the pixel in the frame #n+1 by the mixture ratio α and is output from the switch 642 equals the background component of the pixel value of the corresponding pixel in the frame #n.

The arithmetic unit 643 subtracts the background component supplied from the switch 642 from the pixel value of the pixel in the frame #n fed from the frame memory 621, thereby resulting in the foreground component. The arithmetic unit 643 supplies the synthesizer 633 with the foreground component of the pixel in the frame #n falling within the uncovered background area.

A multiplier 651 in the covered area processor 632 multiplies the pixel value of the pixel in the frame #n−1 supplied from the frame memory 621 by the mixture ratio α, and then outputs the product to a switch 652. The switch 652 is closed when the pixel in the frame #n (corresponding to the pixel in the frame #n−1) supplied from the frame memory 621 falls within the covered background area, and feeds the pixel value multiplied by the mixture ratio α, supplied from the multiplier 641, to an arithmetic unit 653 and the synthesizer 634. The product which is obtained by multiplying the pixel value of the pixel in the frame #n−1 by the mixture ratio α and is output from the switch 652 equals the background component of the pixel value of the corresponding pixel in the frame #n.

The arithmetic unit 653 subtracts the background component supplied from the switch 652 from the pixel value of the pixel in the frame,#n fed from the frame memory 621, thereby resulting in the foreground component. The arithmetic unit 653 supplies the synthesizer 633 with the foreground component of the pixel in the frame #n falling within the covered background area.

The synthesizer 633 synthesizes the foreground component of the pixel falling within the uncovered background area supplied from the arithmetic unit 643, and the foreground component of the pixel falling within the covered background area supplied from the arithmetic unit 653, and feeds the synthesized foreground component to the frame memory 623.

The synthesizer 634 synthesizes the background component of the pixel falling within the uncovered background area supplied from the switch 642, and the background component of the pixel falling within the covered background area supplied from the switch 652, and feeds the synthesized background component to the frame memory 623.

The frame memory 623 individually stores the foreground component and the background component of the pixel of the mixed area in the frame #n supplied from the separation processing block 622.

The frame memory 623 outputs the stored foreground component of the pixel of the mixed area in the frame #n and the stored background component of the pixel of the mixed area in the frame #n.

The use of the mixture ratio α, which is a feature quantity, allows the foreground component and the background component contained in the pixel value to be fully separated from each other.

The synthesizer 603 generates a foreground component image by synthesizing the foreground component of the pixel in the mixed area in the frame #n output from the separator 601 and the pixel of the foreground area. The synthesizer 605 generates a background component image by synthesizing the background component of the pixel in the mixed area in the frame #n output from the separator 601 and the pixel of the background area.

Figure 66A:
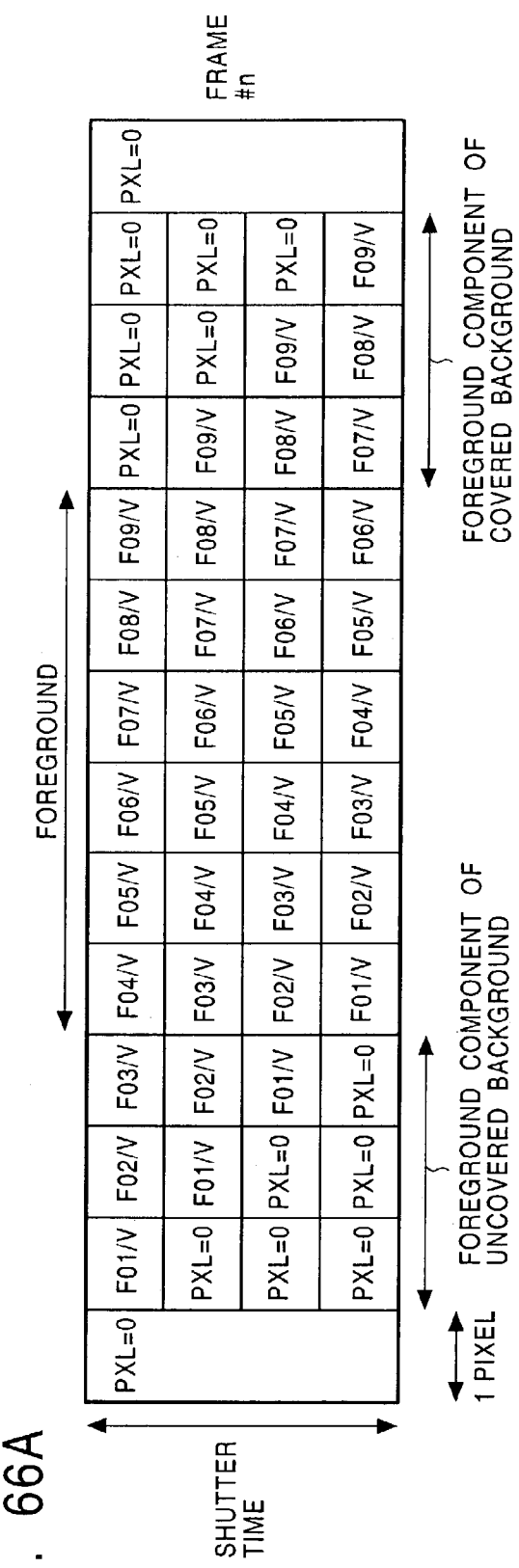
FIG. 66A is a diagram illustrating an example of a separated foreground component image.

FIG. 66A is a diagram illustrating an example of a separated foreground component image in the frame #n illustrated in FIG. 62. The leftmost pixel and the fourteenth pixel from the left-hand side have a pixel value of zero because these pixels contain the background component only before the foreground is separated from the background.

Prior to the separation of the foreground and the background, the second through fourth pixels from the left-hand side have fallen within the uncovered background area and have zero background components with foreground components remaining. Prior to the separation of the foreground and the background, the eleventh through thirteenth pixels from the left-hand side have fallen within the covered background area, and have zero background components with foreground components remaining. The fifth through tenth pixels from the left-hand side have had foreground components only and continuously have these components.

Figure 66B:
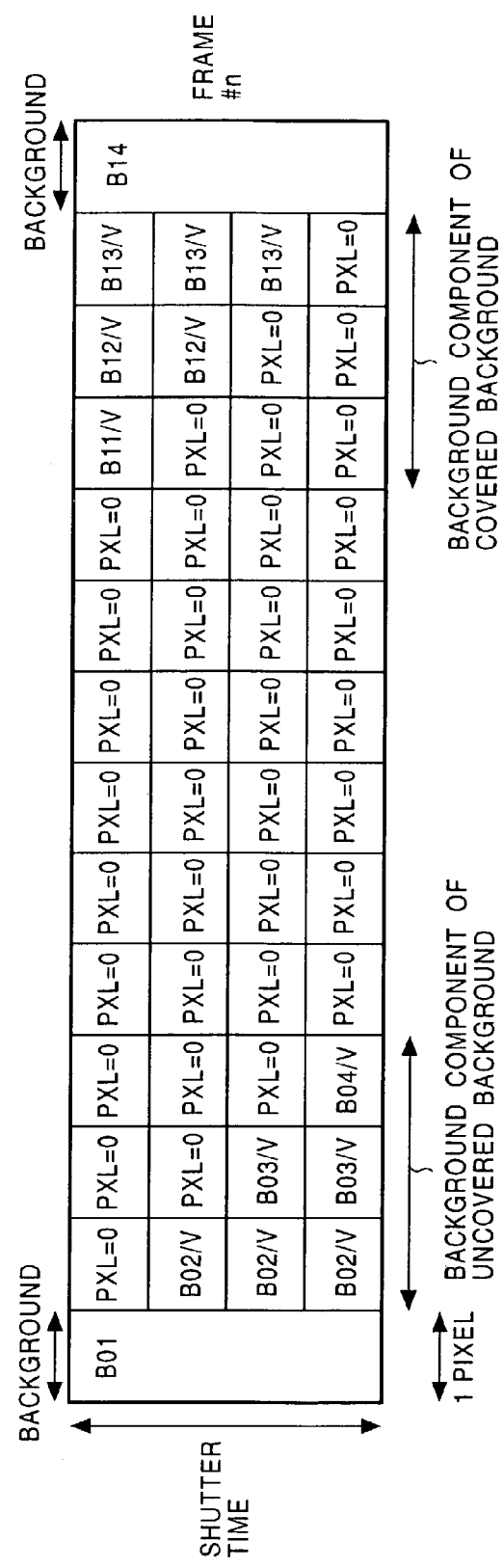
FIG. 66B is a diagram illustrating an example of a separated background component image.

FIG. 66B is a diagram illustrating an example of the separated background component image in the frame #n illustrated in FIG. 62. The leftmost pixel and the fourteenth pixel in the frame #n from the left-hand side thereof have contained the background components only prior to the separation of the foreground and the background, and continuously have these components.

Prior to the separation of the foreground and the background, the second through fourth pixels from the left-hand side have fallen within the uncovered background area and have zero foreground components with the background components remaining. Prior to the separation of the foreground and the background, the eleventh through thirteenth pixels from the left-hand side have fallen within the covered background area, and have zero foreground components with background components remaining. Prior to the separation of the foreground and the background, the fifth through tenth pixels from the left-hand side have had foreground components only and have pixel values of zero.

Figure 67:
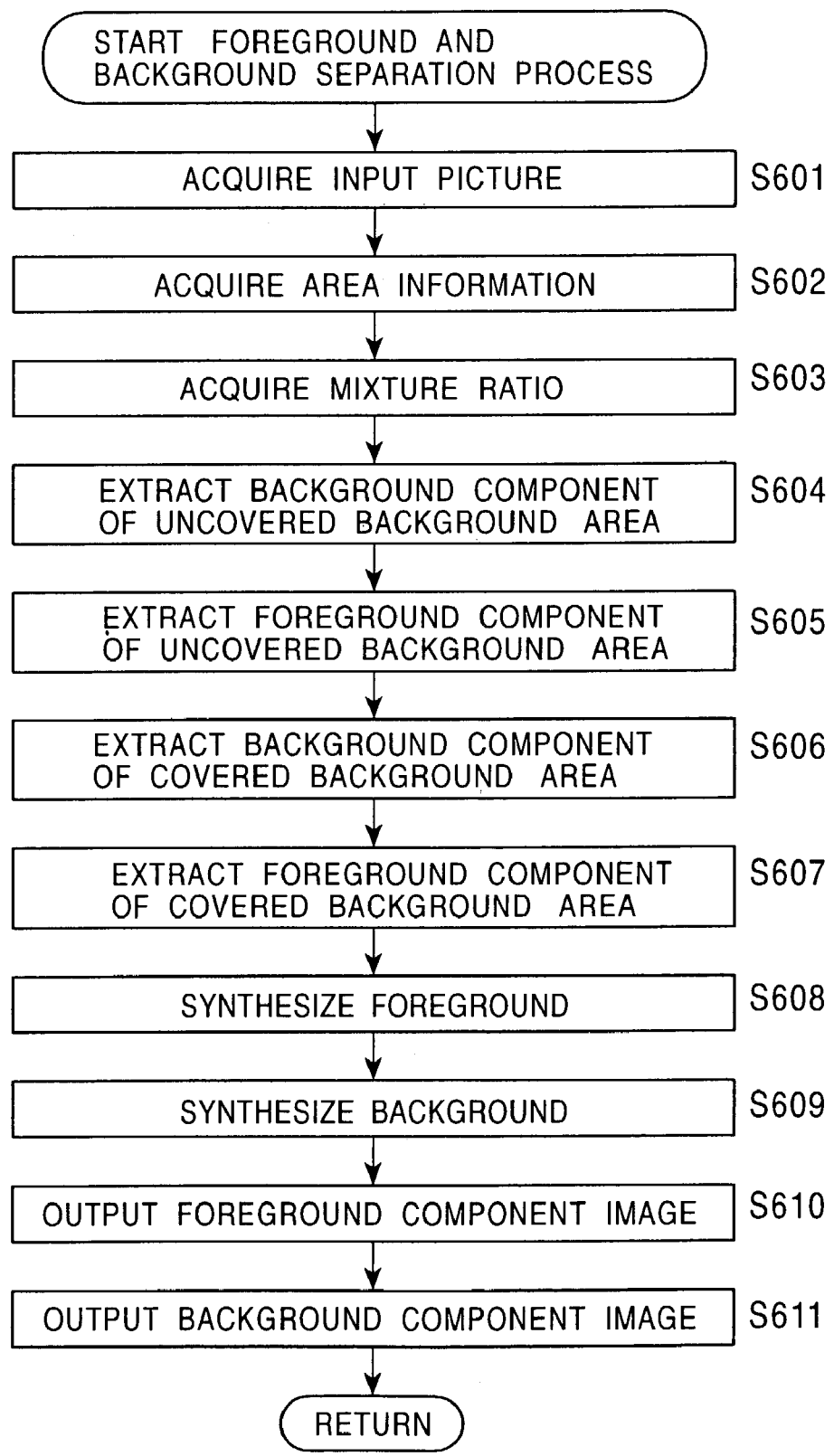
FIG. 67 is a flow diagram illustrating the separation process of the foreground and the background.

The foreground and background separation process of the foreground and background separator 105 is discussed below with reference to a flow diagram shown in FIG. 67. In step S601, the frame memory 621 in the separator 601 acquires the input image, and stores the frame #n to be processed for the foreground and background separation, together with the prior frame #n−1 and the subsequent frame #n+1.

In step S602, the separation processing block 622 in the separator 601 acquires the area information supplied from the mixture ratio calculator 104. In step S603, the separation processing block 622 in the separator 601 acquires the mixture ratio α supplied from the mixture ratio calculator 104.

In step S604, the uncovered area processor 631 extracts the background component from the pixel value of the pixel in the uncovered background area supplied from the frame memory 621, based on the area information and the mixture ratio α.

In step S605, the uncovered area processor 631 extracts the foreground component from the pixel value of the pixel in the uncovered background supplied from the frame memory 621, based on the area information and the mixture ratio α.

In step S606, the covered area processor 632 extracts the background component from the pixel value of the pixel in the covered background are supplied from the frame memory 621, based on the area information and the mixture ratio α.

In step S607, the covered area processor 632 extracts the foreground component from the pixel value of the pixel in the covered background area supplied from the frame memory 621, based on the area information and the mixture ratio α.

In step S608, the synthesizer 633 synthesizes the foreground component of the pixel in the uncovered background area extracted in step S605, and the foreground component of the pixel in the covered background area extracted in step S607. The synthesized foreground component is fed to the synthesizer 603. The synthesizer 603 then generates the foreground component image by synthesizing the pixel of the foreground area supplied through the switch 602, and the foreground component supplied from the separator 601.

In step S609, the synthesizer 634 synthesizes the background component of the pixel in the uncovered background area extracted in step S604, and the background component of the pixel in the covered background area extracted in step S606. The synthesized foreground component is fed to the synthesizer 605. The synthesizer 605 then generates a background component image by synthesizing the pixel of the background area supplied through the switch 604, and the background component supplied from the separator 601.

In step S610, the synthesizer 603 outputs the foreground component image. In step S611, the synthesizer 605 outputs the background component image. The routine then ends.

In this way, the foreground and background separator 105 separates the foreground component and the background component from the input image based on the area information and the mixture ratio α, and outputs the foreground component image formed of the foreground component only, and the background component image formed of the background component only.

The adjustment of the motion blur from the foreground component image is discussed below.

Figure 68:
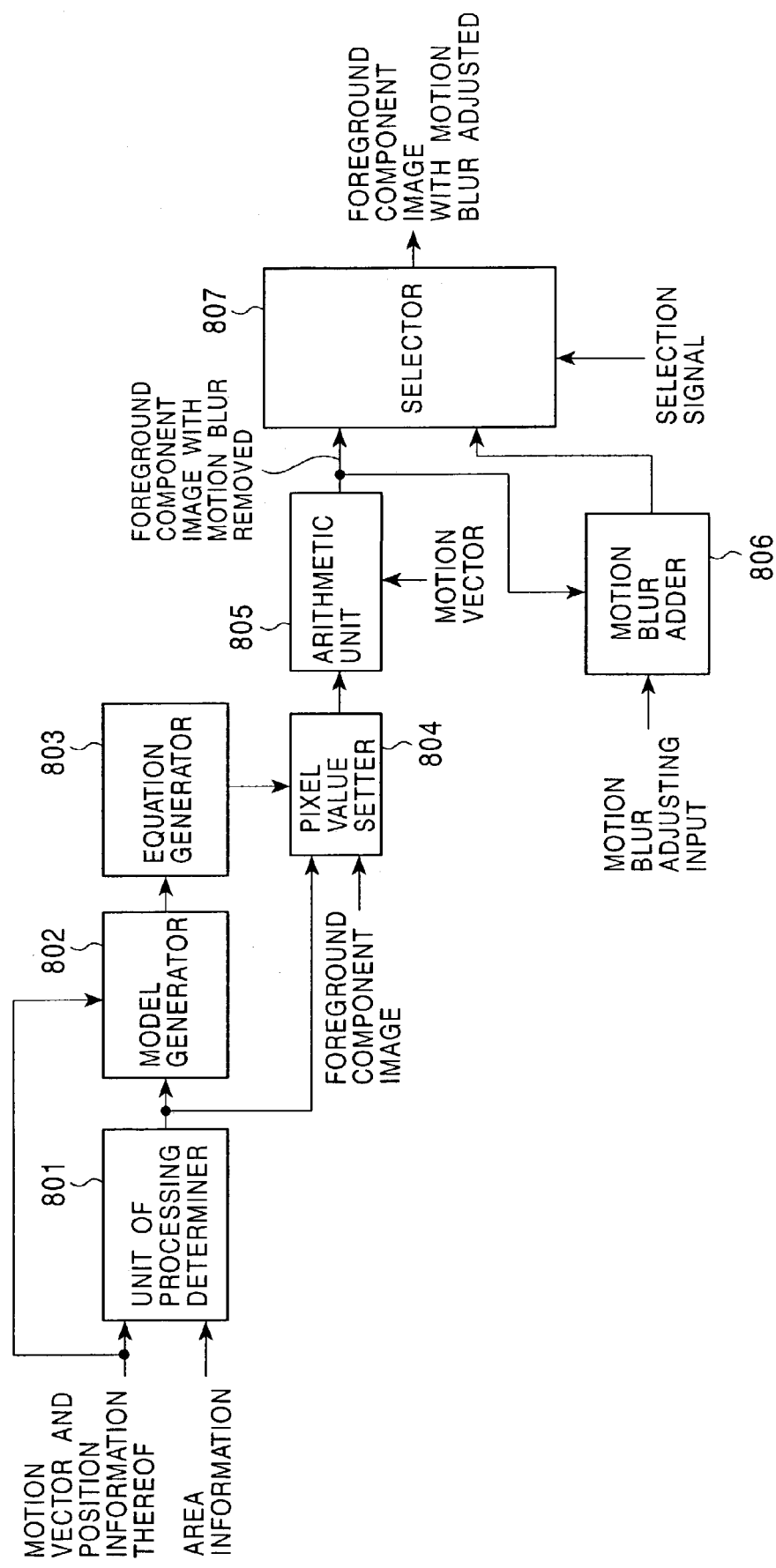
FIG. 68 is a block diagram illustrating one example of a motion blur adjuster 106.

FIG. 68 is a block diagram illustrating one example of the motion blur adjuster 106. The motion vector and the position information thereof supplied from the motion detector 102, and the area information supplied from the area determiner 103 are fed to a unit of processing determiner 801 and a model generator 802. The foreground component image supplied from the foreground and background separator 105 is fed to a pixel value setter 804.

The unit of processing determiner 801 feeds the motion vector and the generated unit of processing to the model generator 802 together with the motion vector, the position information thereof, and the area information. The unit of processing determiner 801 feeds the generated unit of processing to the pixel value setter 804.

Figure 69:
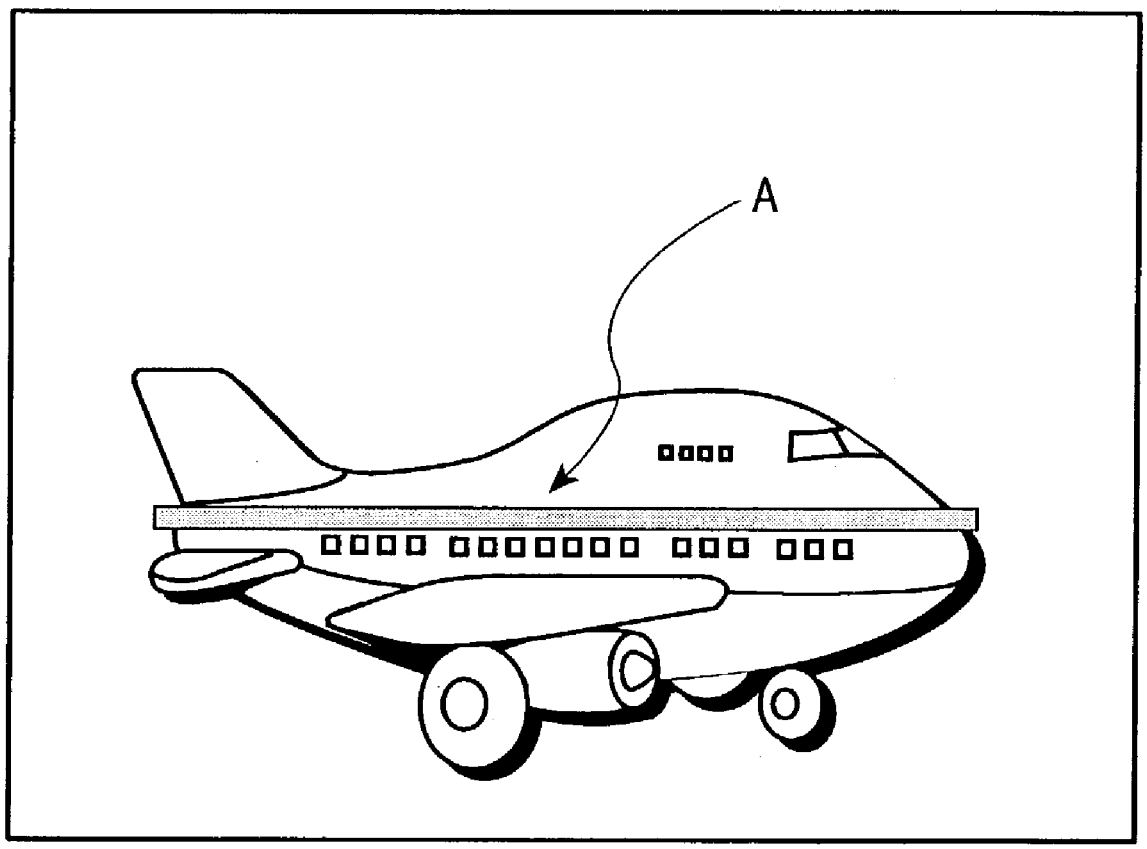
FIG. 69 illustrates a unit of processing.

Referring to the letter A in FIG. 69, the unit of processing generated by the unit of processing determiner 801 indicates consecutively arranged pixels in the direction of movement starting with a pixel of the covered background area of the foreground component image and ending with a pixel in the uncovered background area, or consecutively arranged pixels in the direction movement starting with a pixel of the uncovered background area of the foreground component image and ending with a pixel in the covered background area. For example, the unit of processing includes two pieces of data of a top left point (a pixel, designated by the unit of processing, at the leftmost position or topmost position in the image) and a right bottom point.

Figure 70:
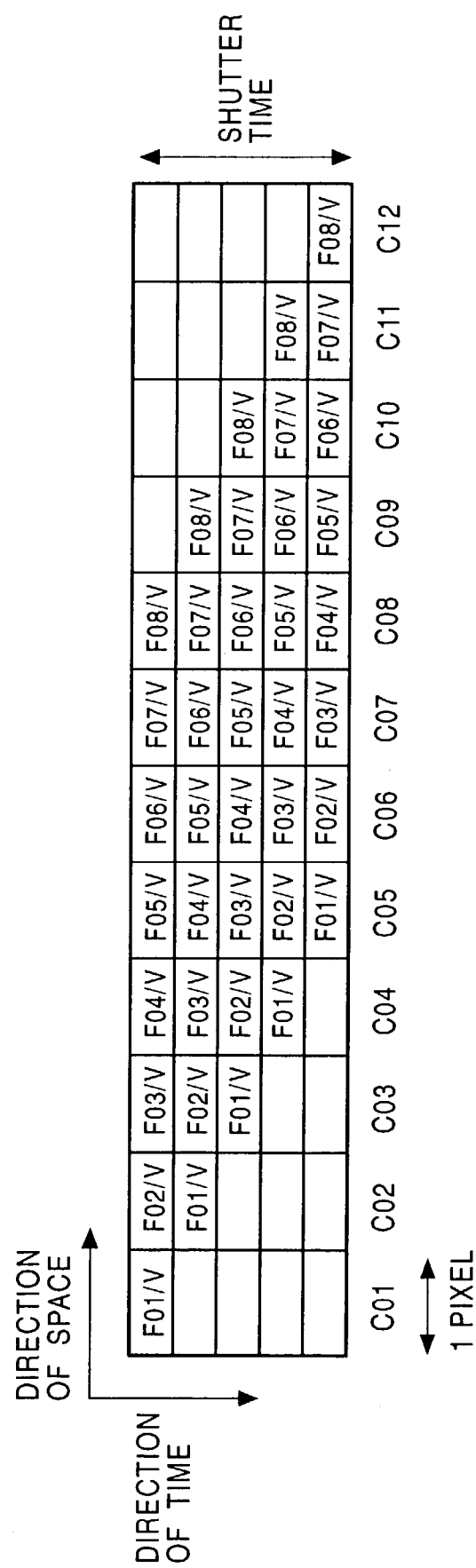
FIG. 70 is a model diagram illustrating the pixel values developed in time axis for a duration of time, which is divided and corresponds to shutter time.

The model generator 802 generates a model based on the motion vector and the input unit of processing. Specifically, the model generator 802 stores beforehand the number of pixels contained in the unit of processing, the virtual divisor number applied to the pixel value in the direction of time, and a plurality of models corresponding to the number of foreground components for each pixel. Based on the unit of processing and the virtual divisor number applied to the pixel values in the direction of time, the model generator 802 selects a model that designates a correspondence between a pixel value and a foreground component as illustrated in FIG. 70.

Now, the number of pixels per the unit of processing is 12, and the amount of movement v in the shutter time is 5. The model generator 802 sets the virtual divisor number to 5, and selects a model including eight foreground components, wherein the leftmost pixel has one foreground component, the second pixel from the left-hand side has two foreground components, the third pixel from the left-hand side has three foreground components, the fourth pixel from the left-hand side has four foreground components, the fifth pixel from the left-hand side has five foreground components, the sixth pixel from the left-hand side has five foreground components, the seventh pixel from the left-hand side has five foreground components, the eighth pixel from the left-hand side has five foreground components, the ninth pixel from the left-hand side has four foreground components, the tenth pixel from the left-hand side has three foreground components, the eleventh pixel from the left-hand side has two foreground components, and the twelfth pixel from the left-hand side has one foreground component.

The model generator 802 may generate a model based on the motion vector and the unit of processing when the motion vector and the unit of processing are supplied, rather than selecting a model from among stored models.

The model generator 802 supplies an equation generator 803 with the selected model.

The equation generator 803 generates an equation based on the model supplied from the model generator 802. Referring to the model of the foreground component image illustrated in FIG. 70, the equation generated by the equation generator 803 will be discussed on the assumption that the number of foreground components is 8, that the number of pixels per the unit of processing is 12, that the amount of movement v is 5, and that the virtual divisor number is 5.

When the foreground components F01/v through F08/v are contained in the foreground component image for the shutter time, the relationship between F01/v through F08/v and pixel values C01 through C12 is expressed in equations (68) through (79).

$$C01 = F01/v \qquad (68)$$

$$C02 = F02/v + F01/v \qquad (69)$$

$$C03 = F03/v + F02/v + F01/v \qquad (70)$$

$$C04 = F04/v + F03/v + F02/v + F01/v \qquad (71)$$

$$C05 = F05/v + F04/v + F03/v + F02/v + F01/v \qquad (72)$$

$$C06 = F06/v + F05/v + F04/v + F03/v + F02/v \qquad (73)$$

$$C07 = F07/v + F06/v + F05/v + F04/v + F03/v \qquad (74)$$

$$C08 = F08/v + F07/v + F06/v + F05/v + F04/v \qquad (75)$$

$$C09 = F08/v + F07/v + F06/v + F05/v \qquad (76)$$

$$C10 = F08/v + F07/v + F06/v \qquad (77)$$

$$C11 = F08/v + F07/v \qquad (78)$$

$$C12 = F08/v \qquad (79)$$

The equation generator 803 generates equations by modifying the generated equations. The equations generated by the equation generator 803 are expressed as equations (80) through (91).

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \qquad (80)$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \qquad (81)$$

$$C03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v \qquad (82)$$

$$C04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v \qquad (83)$$

$$C05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v \qquad (84)$$

$$C06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v \qquad (85)$$

$$C07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v \qquad (86)$$

$$C08 = 0 \cdot F01/v + 0 \cdot F02/v + 0 \cdot F03/v + 1 \cdot F04/v + 1 \cdot F05/v + 1 \cdot F06/v + 1 \cdot F07/v + 1 \cdot F08/v \qquad (87)$$

$$C09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v \qquad (88)$$

$$C10 = 0 \cdot F01/v + 0 \cdot F02/v + 0 \cdot F03/v + 0 \cdot F04/v + 0 \cdot F05/v + 1 \cdot F06/v + 1 \cdot F07/v + 1 \cdot F08/v \qquad (89)$$

$$C11 = 0 \cdot F01/v + 0 \cdot F02/v + 0 \cdot F03/v + 0 \cdot F04/v + 0 \cdot F05/v + 0 \cdot F06/v + 1 \cdot F07/v + 1 \cdot F08/v \qquad (90)$$

$$C12 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v \qquad (91)$$

Equations (80) through (91) may be expressed as equation (92).

$$Cj = \sum_{i=01}^{08} aij \cdot Fi/v \qquad (92)$$

where j is the position of each pixel. In this equation, j may be one of 1 through 12. Furthermore, i represents the position of a foreground value. In this equation, i is one of 1 through 8. Here, aij has 0 or 1 depending on the value of i and j.

If an error is taken into consideration, equation (92) may be expressed as equation (93).

$$Cj = \sum_{i=01}^{08} aij \cdot Fi/v + ej \qquad (93)$$

where ej is an error contained in a target pixel Cj.

Equation (93) may be expressed as equation (94).

$$ej = Cj - \sum_{i=01}^{08} aij \cdot Fi/v \qquad (94)$$

To apply the least squares method, the sum E of squares of the error is defined in equation (95).

$$E = \sum_{j=01}^{12} ej^2 \qquad (95)$$

To minimize the error, a partial differential of the sum E of squares of error with respect to a variable Fk must be zero. Fk satisfying equation (96) is determined.

$$\frac{\partial E}{\partial Fk} = 2 \cdot \sum_{j=01}^{12} ej \cdot \frac{\partial ej}{\partial Fk} \qquad (96)$$

$$= 2 \cdot \sum_{j=01}^{12} \left\{ \left( Cj - \sum_{i=01}^{08} aij \cdot Fi/v \right) \cdot (-akj/v) \right\} = 0$$

Since the amount of movement v in equation (96) is a fixed value, equation (97) is obtained.

$$\sum_{j=01}^{12} akj \cdot \left( Cj - \sum_{i=01}^{08} aij \cdot Fi/v \right) = 0 \qquad (97)$$

The development and transposition of equation (97) leads to equation (98).

$$\sum_{j=01}^{12}\left(akj\cdot\sum_{i=01}^{08}aij\cdot Fi\right)=v\sum_{j=01}^{12}akj\cdot Cj \quad (98)$$

One integer of 1 through 8 is substituted for k in equation (98), and eight equations result. The eight equations are expressed in a single matrix. This equation is called a normal equation.

One example of the normal equation generated by the equation generator 803 based on the least squares method is expressed in equation (99).

$$\begin{bmatrix}5&4&3&2&1&0&0&0\\4&5&4&3&2&1&0&0\\3&4&5&4&3&2&1&0\\2&3&4&5&4&3&2&1\\1&2&3&4&5&4&3&2\\0&1&2&3&4&5&4&3\\0&0&1&2&3&4&5&4\\0&0&0&1&2&3&4&5\end{bmatrix}\begin{bmatrix}F01\\F02\\F03\\F04\\F05\\F06\\F07\\F08\end{bmatrix}=v\cdot\begin{bmatrix}\sum_{i=08}^{12}Ci\\\sum_{i=07}^{11}Ci\\\sum_{i=06}^{10}Ci\\\sum_{i=05}^{09}Ci\\\sum_{i=04}^{08}Ci\\\sum_{i=03}^{07}Ci\\\sum_{i=02}^{06}Ci\\\sum_{i=01}^{05}Ci\end{bmatrix} \quad (99)$$

If equation (99) is expressed as A·F=v·C, C, A, and v are known, and F is unknown, and A and v are known at the time of model generation, and C becomes known when the pixel values are input during the pixel value setting operation.

By calculating the foreground component using the normal equation based on the least squares method, the error contained in the pixel C is dispersed.

The equation generator 803 supplies the pixel value setter 804 with the normal equation thus generated.

The pixel value setter 804 sets the pixel value contained in the foreground component image in the matrix supplied from the equation generator 803, based on the unit of processing supplied from the unit of processing determiner 801. The pixel value setter 804 feeds the matrix with the pixel value C set therewithin to an arithmetic unit 805.

The arithmetic unit 805 calculates the foreground component Fi/v with the motion blur removed through a solution using the sweep-out method (the Gauss-Jordan Elimination), and then calculates the pixel value Fi for i, i.e., one of the integers 0 through 8, of the foreground with the motion blur removed. The arithmetic unit 805 then outputs the foreground component image formed of the pixel value Fi with the motion blur removed as shown in FIG. 71, to a motion blur adder 806 and a selector 807.

Figure 71:
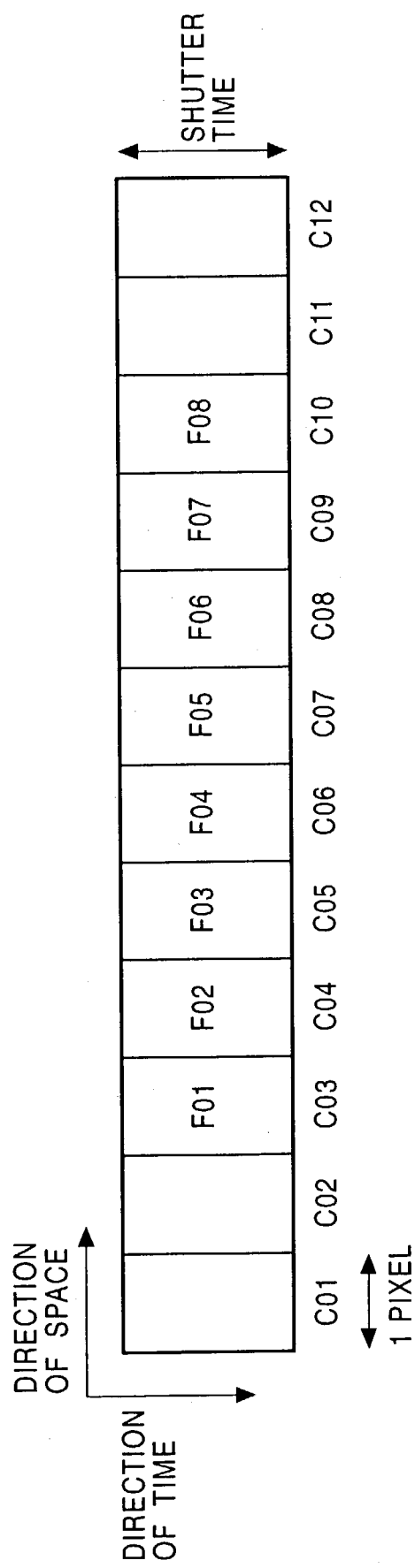
FIG. 71 is a model diagram illustrating the pixel values developed in the time axis for the duration of time, which is divided and corresponds to the shutter time.

F01 through F08 are respectively set in C03 through C10 in the foreground component image with the motion blur removed in FIG. 71 so that the position of the foreground component image is not changed with respect to the screen. The foreground component image is thus set in any position.

Figure 72:
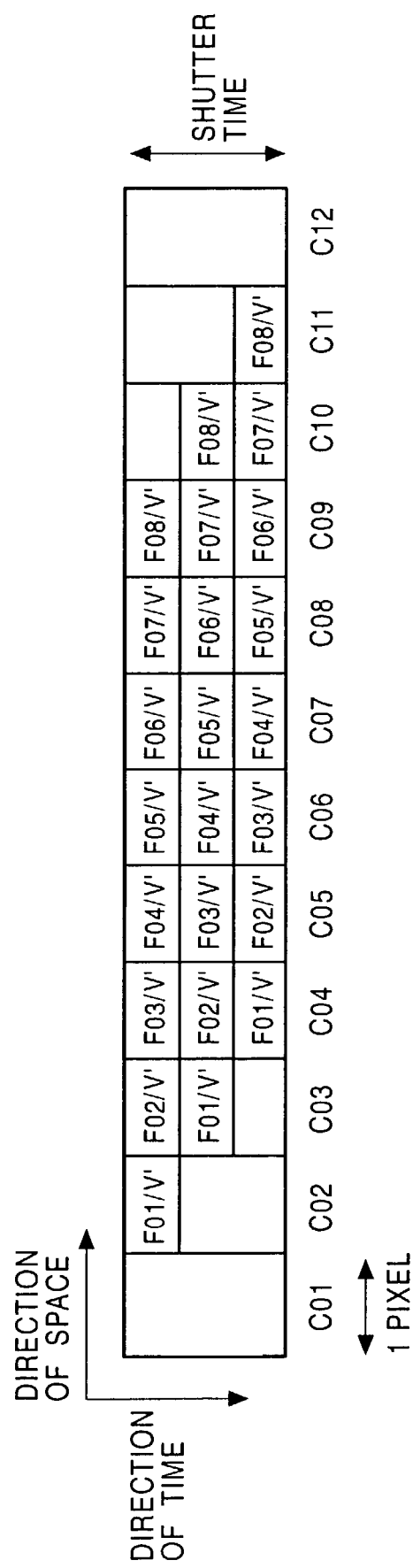
FIG. 72 is a model diagram illustrating the pixel values developed in the time axis for the duration of time, which is divided and corresponds to the shutter time.
Figure 73:
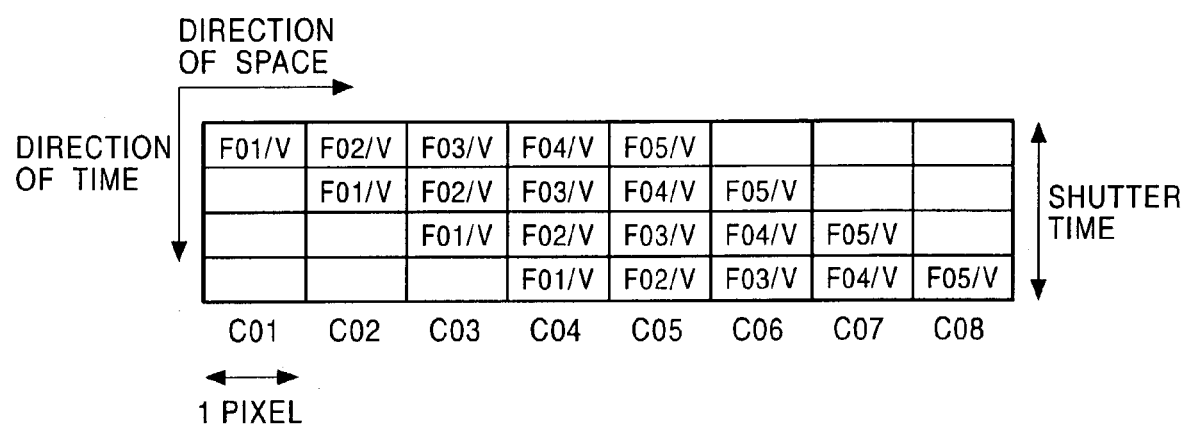
FIG. 73 is a model diagram illustrating the pixel values developed in the time axis for the duration of time, which is divided and corresponds to the shutter time.

The motion blur adder 806 adjusts the amount of motion blur by providing a motion blur adjusting input v', which is different from the amount of motion v, or a motion blur adjusting input v', which is half the amount of movement v, or a motion blur adjusting input v', which is not related to the amount of movement v. Referring to FIG. 72, for example, the motion blur adder 806 calculates the foreground component Fi/v' by dividing the pixel value Fi of the foreground with the motion blur removed by the motion blur adjusting input v', and sums the foreground component Fi/v', and then generates the pixel value with the motion blur adjusted. For example, when the motion blur adjusting input v' is 3, the pixel value C02 is (F01)/v', the pixel value V03 is (F01+F02)/v', the pixel value C04 is (F01+F02+F03)/v', and the pixel value C05 is (F02+F03+F04)/v'.

The motion blur adder 806 supplies the selector 807 with the foreground component image with the motion blur adjusted.

In response to a selection signal input by a user, the selector 807 selects between the foreground component image, with the motion blur removed, supplied from the arithmetic unit 805 and the foreground component image, with the motion blur adjusted, supplied from the motion blur adder 806. The selector 807 outputs the selected foreground component image.

The motion blur adjuster 106 adjusts the amount of motion blur based on the selection signal and the motion blur adjusting input v'.

For example, when the number of pixels per unit of processing is 8, and the amount of movement is 4, the motion blur adjuster 106 generates a matrix (100).

$$\begin{bmatrix}4&3&2&1&0\\3&4&3&2&1\\2&3&4&3&2\\1&2&3&4&3\\0&1&2&3&4\end{bmatrix}\begin{bmatrix}F01\\F02\\F03\\F04\\F05\end{bmatrix}=v\cdot\begin{bmatrix}\sum_{i=05}^{08}Ci\\\sum_{i=04}^{07}Ci\\\sum_{i=03}^{06}Ci\\\sum_{i=02}^{05}Ci\\\sum_{i=01}^{04}Ci\end{bmatrix} \quad (100)$$

The motion blur adjuster 106 formulates equations with the number thereof corresponding to the unit of processing, and calculates Fi, which is the pixel value with the amount of motion blur adjusted. Likewise, when the number of pixels per unit of processing is 100, equations corresponding to 100 pixels are generated to calculate Fi.

Figure 74:
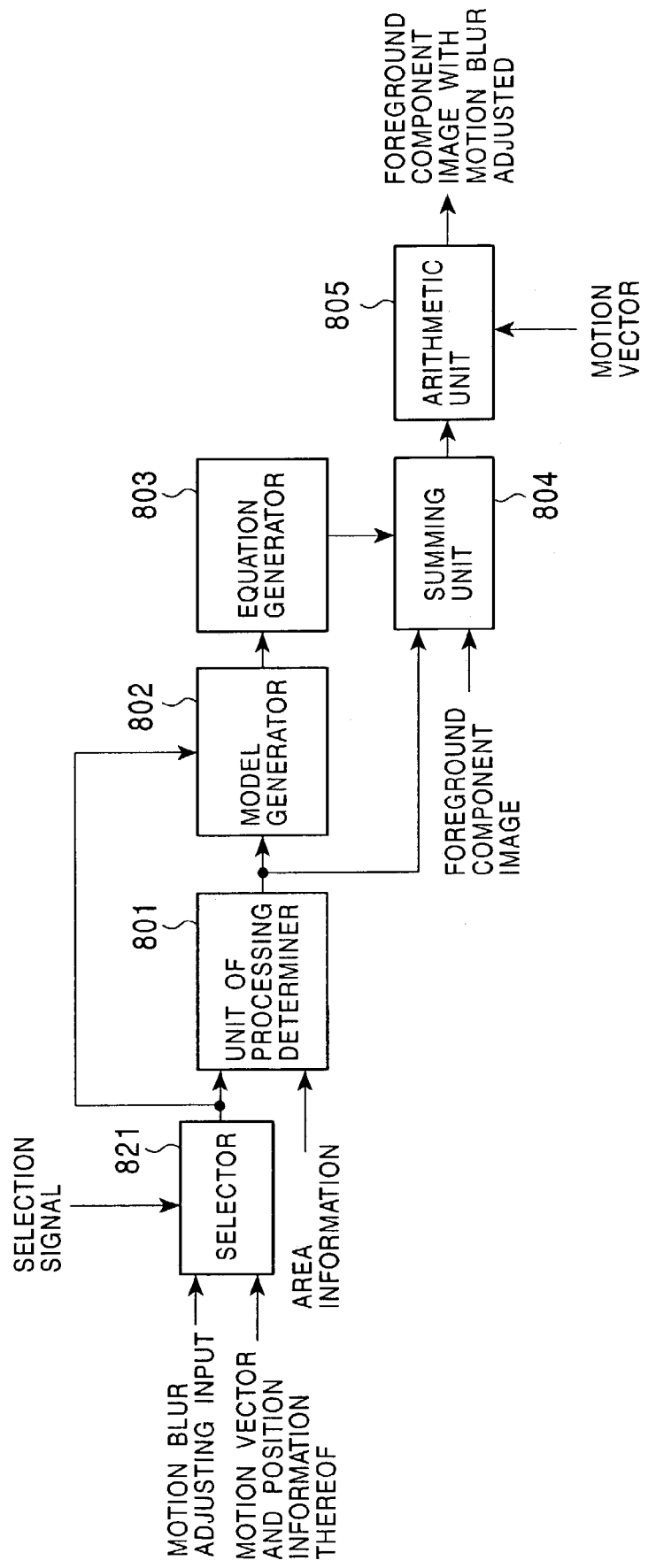
FIG. 74 is a diagram illustrating another construction of the motion blur adjuster 106.

FIG. 74 is a diagram illustrating another construction of the motion blur adjuster 106. Elements identical to those described with reference to FIG. 68 are designated with the same reference numerals, and the discussion thereof is omitted here.

In response to a selection signal, a selector 821 selects between supplying the unit of processing determiner 801 and the model generator 802 with the input motion vector and position signal thereof and supplying the unit of processing determiner 801 and the model generator 802 with the motion vector and position signal thereof with the magnitude of the motion vector replaced with the motion blur adjusting input v'.

In this way, the unit of processing determiner 801 through the arithmetic unit 805 in the motion blur adjuster 106 in FIG. 74 adjust the amount of motion blur in accordance with the amount of movement v and the motion blur adjusting input v'. For example, when the amount of movement is 5, and the motion blur adjusting input v' is 3, the unit of processing determiner 801 through the arithmetic unit 805 in the motion blur adjuster 106 in FIG. 74 use the model having the motion blur adjusting input v' of 3 as illustrated in FIG. 72 and the foreground component image having the amount of movement v of 5 as illustrated in FIG. 74. The unit of processing determiner 801 through the arithmetic unit 805 in the motion blur adjuster 106 in FIG. 74 then calculate an image with the amount of motion blur in response to the amount of movement v of approximately 1.7, because (the amount of movement v)/(the motion blur adjusting input v')=5/3. In this case, the calculated image does not contain the motion blur responsive to the amount of movement v of 3, and thus, the relationship between the amount of movement v and the motion blur adjusting input v' is different from that applicable to the results provided by the motion blur adder 806.

As described above, the motion blur adjuster 106 generates the equations in response to the amount of movement v and the unit of processing, sets the pixel values of the foreground component image into the generated equations, and calculates the foreground component image with the motion blur adjusted.

Figure 75:
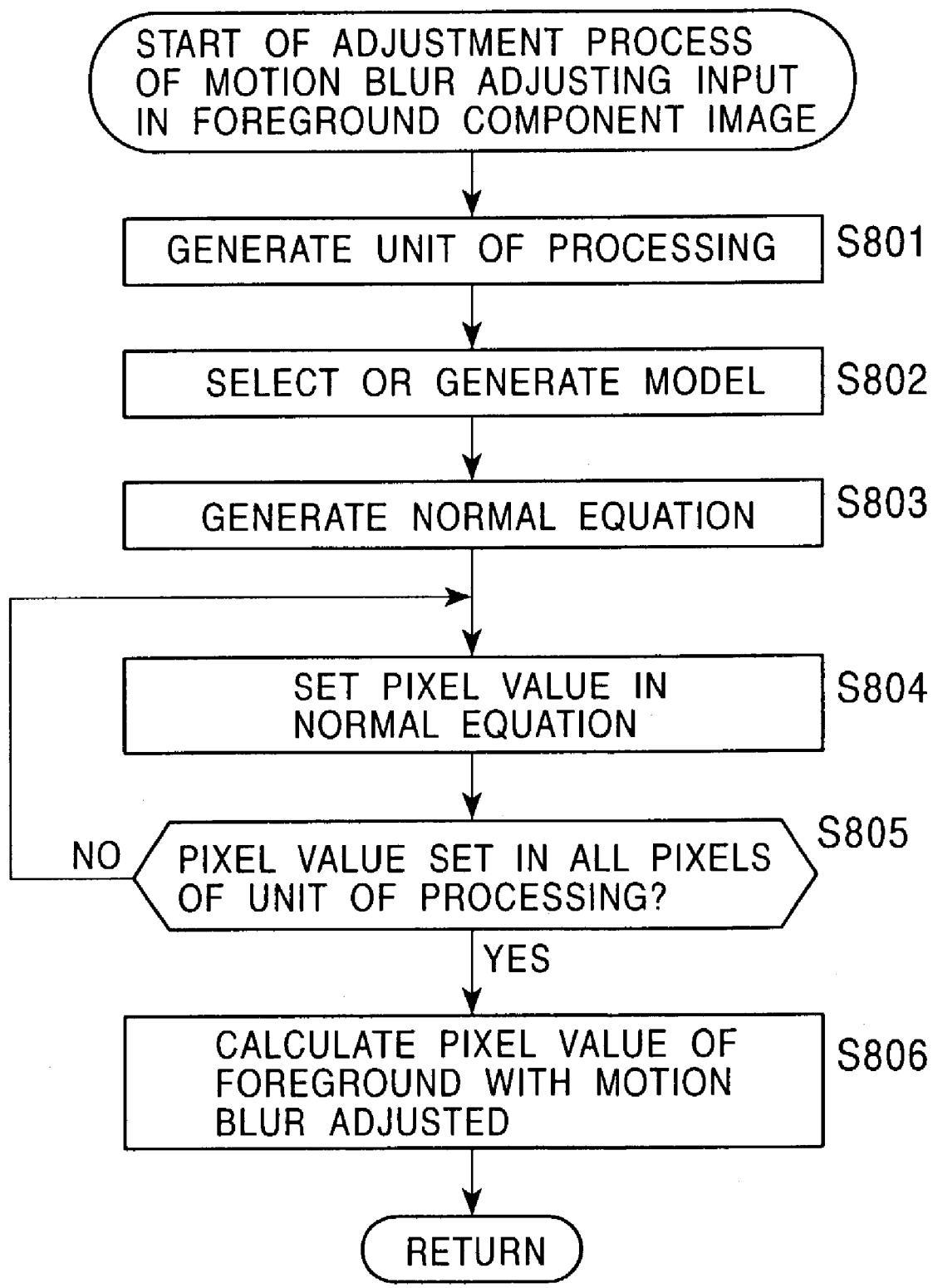
FIG. 75 is a flow diagram illustrating the adjustment process of the motion blur adjuster 106 for a motion blur contained in a foreground component image.

Referring to a flow diagram illustrated in FIG. 75, the adjustment process of the motion blur adjuster 106 for adjusting the amount of motion blur contained in the foreground component image is discussed.

In step S801, the unit of processing determiner 801 in the motion blur adjuster 106 generates the unit of processing based on the motion vector and the area information, and feeds the generated unit of processing to the model generator 802.

In step S802, the model generator 802 in the motion blur adjuster 106 selects or generates the model in accordance with the amount of movement v and the unit of processing. In step S803, the equation generator 803 generates the normal equation based on the selected model.

In step S804, the pixel value setter 804 sets the pixel values of the foreground component image into the generated normal equation. In step S805, the pixel value setter 804 determines whether the pixel values of all pixels corresponding to the unit of process have been set. When it is determined that the pixel values of all pixels corresponding to the unit of process have not yet been set, the routine loops to step S804, and the process of setting the pixel values into the normal equation resumes.

When it is determined in step S805 that the pixel values of all pixels corresponding to the unit of process have been set, the routine proceeds to step S806. The arithmetic unit 805 calculates the pixel value of the foreground component image with the motion blur adjusted, based on the normal equation with the pixel values set therewithin and supplied from the pixel value setter 804. The routine thus ends.

In this way, the motion blur adjuster 106 adjusts the amount of motion blur in the foreground image containing the motion blur based on the motion vector and the area information.

The amount of motion blur contained in the pixel value as sampled data is thus adjusted.

The signal processor 12 shown in FIG. 4 adjusts the amount of motion blur contained in the input image in this way. The signal processor 12, with the construction thereof illustrated in FIG. 4, calculates the mixture ratio α, which is embedded information, and then outputs the mixture ratio α.

Figure 76:
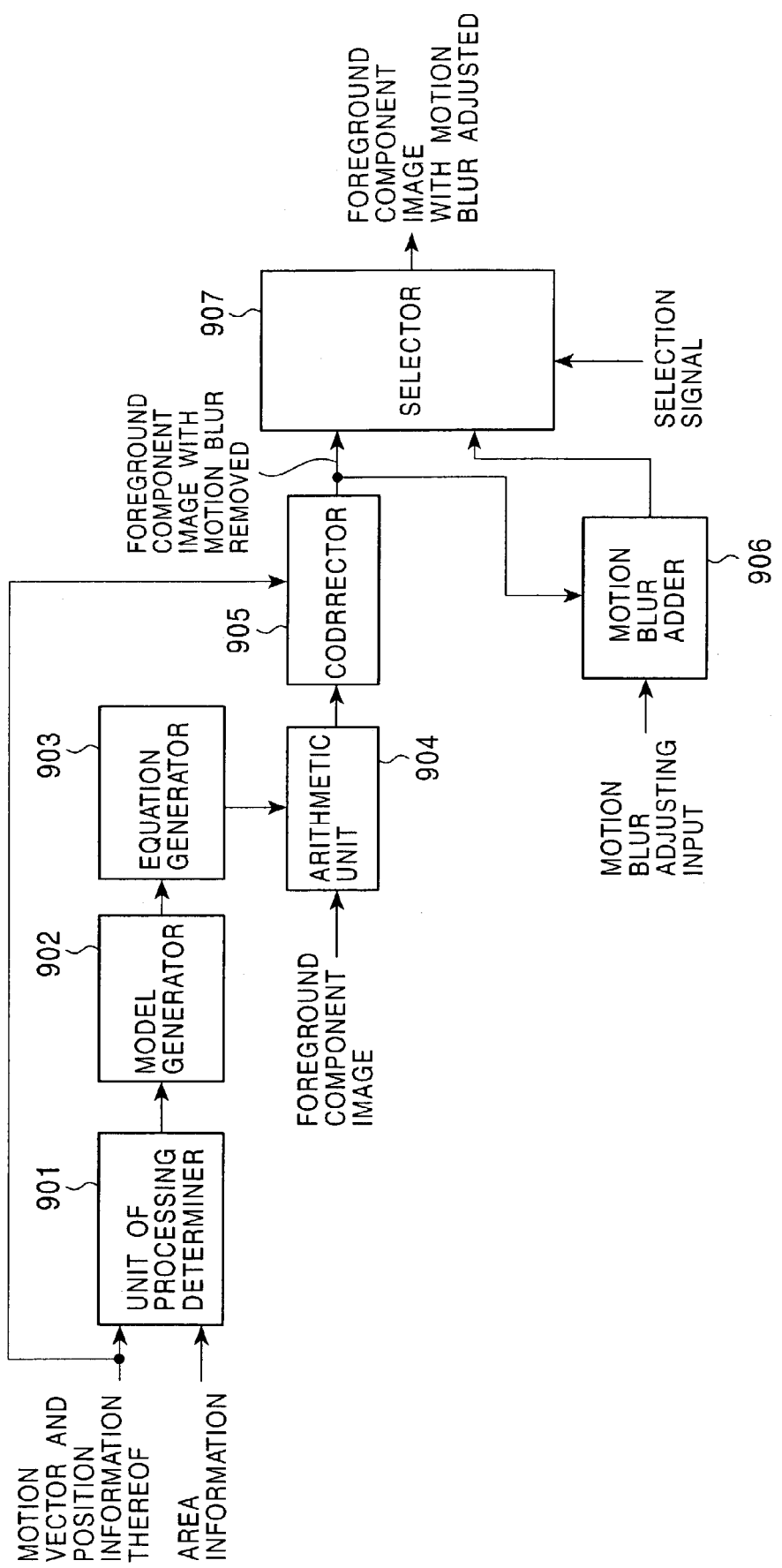
FIG. 76 is a block diagram illustrating yet another construction of the motion blur adjuster 106.

FIG. 76 is a block diagram illustrating yet another construction of the motion blur adjuster 106. The motion vector and the position information thereof supplied from the motion detector 102 are fed to a unit of processing determiner 901 and a corrector 905, and the area information supplied from the area determiner 103 is fed to the unit of processing determiner 901. The foreground component image supplied from the foreground and background separator 105 is fed to an arithmetic unit 904.

The unit of processing determiner 901 feeds the generated unit of processing together with the motion vector to a model generator 902, based on the motion vector, the position information thereof, and the area information.

The model generator 902 generates a model based on the motion vector and the input unit of processing.

An equation generator 903 generates equations based on the model supplied from the model generator 902.

Figure 77:
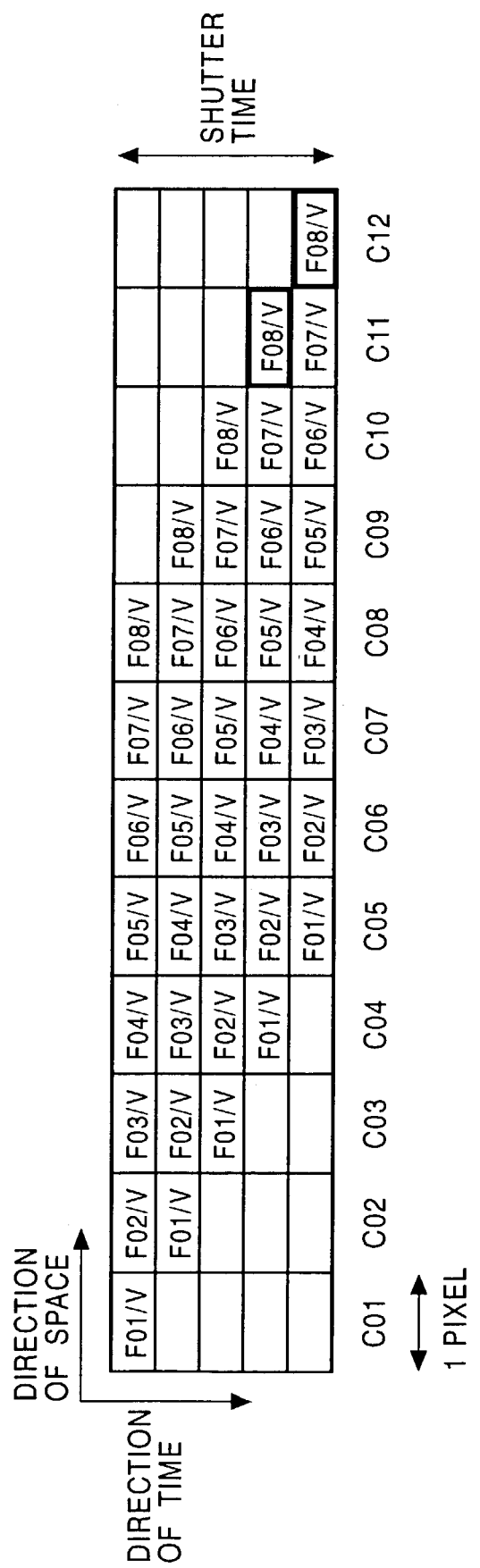
FIG. 77 is a model diagram illustrating a model which designates a correspondence between the pixel values and the components of the foreground.
Figure 78:
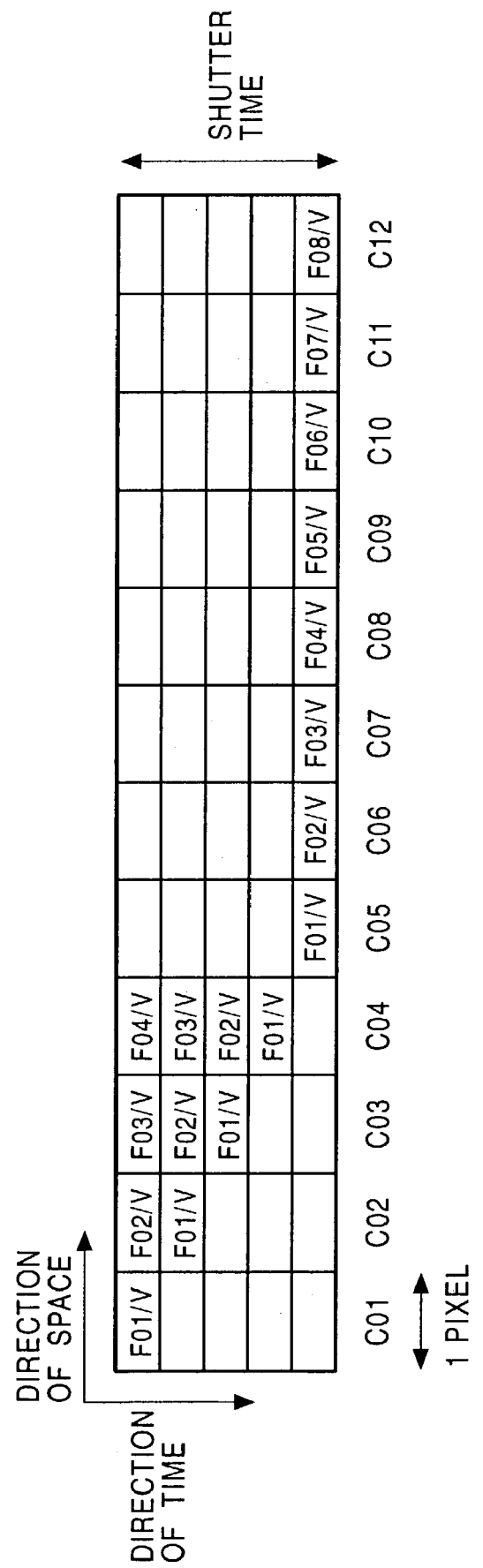
FIG. 78 illustrates the calculation of the foreground component.
Figure 79:
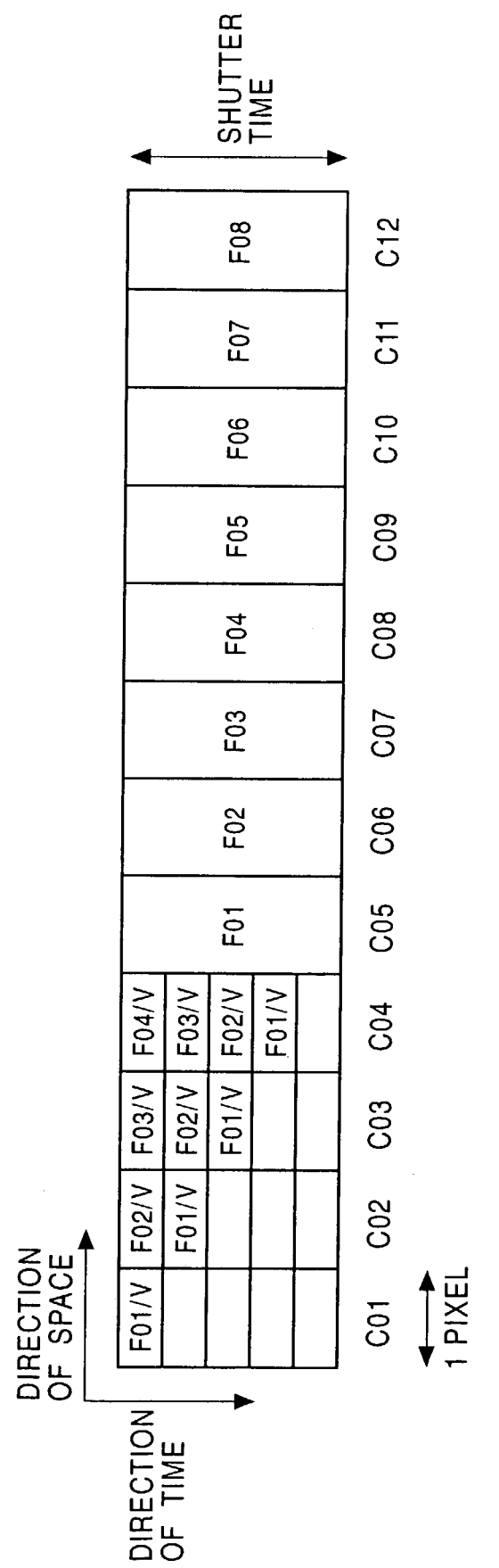
FIG. 79 illustrates the calculation of the foreground component.

The equations generated by the equation generator 903 are discussed with reference to a model of the foreground component image illustrated in FIG. 77 through FIG. 79, wherein the number of foreground components is 8, the number of pixels per unit of processing is 12, and the amount of movement v is 5.

When the foreground components for the shutter time /v contained in the foreground component image are F01/v through F08/v, the relationship between pixel values C01 through C12 and F01/v through F08/v is expressed in equations (68) through (79).

Concerning pixel values C12 and C11, the pixel value C12 contains only the foreground component F08/v as expressed in equation (101), and the pixel value C11 contains the sum of the foreground component F08/v and the foreground component F07/v. The foreground component F07/v is thus determined using equation (102).

$$F08/v = C12 \quad (101)$$

$$F07/v = C11 - C12 \quad (102)$$

Likewise, the foreground components F06/v through F01/v are determined using equations (103) through (108) because the foreground components are contained in pixel values C01 through C10.

$$F06/v = C10 - C11 \quad (103)$$

$$F05/v = C09 - C10 \quad (104)$$

$$F04/v = C08 - C09 \quad (105)$$

$$F03/v = C07 - C08 + C12 \quad (106)$$

$$F02/v = C06 - C07 + C11 - C12 \quad (107)$$

$$F01/v = C05 - C06 + C10 - C11 \quad (108)$$

The equation generator 903 generates the equations (101) through (108) for calculating the foreground components from the differences between the pixel values. The equation generator 903 feeds the generated equations to the arithmetic unit 904.

The arithmetic unit 904 sets the pixel values of the foreground component image into the equations supplied from the equation generator 903, and calculates the foreground components based on the equations with the pixel values set therewithin. The arithmetic unit 904 sets the pixel values C05 through C12 into the equations (101) through (108) when the equations (101) through (108) are supplied from the equation generator 903.

The arithmetic unit 904 calculates the foreground components based on the equations with the pixel values set therewithin. For example, as illustrated in FIG. 78, the arithmetic unit 904 calculates the foreground components F01/v through F08/v from the equations (101) through (108) with the pixel values C05 through C12 set therewithin. The arithmetic unit 904 supplies the corrector 905 with the foreground components F01/v through F08/v.

The corrector 905 multiplies the foreground components supplied from the arithmetic unit 904 by the amount of movement v contained in the motion vector supplied from the unit of processing determiner 901, thereby calculating the pixel values of the foreground with the motion blur removed. For example, upon receiving the foreground components F01/v through F08/v supplied from the arithmetic unit 904, the corrector 905 multiplies each of the foreground components F01/v through F08/v by the amount of movement v of 5, thereby resulting in the pixel values F01 through F08 of the foreground with the motion blur removed.

The corrector 905 supplies a motion blur adder 906 and a selector 907 with the foreground component image formed of the foreground pixel values with the motion blur removed.

The motion blur adder 906 adjusts the amount of motion blur by providing a motion blur adjusting input v', which is different from the amount of motion v, for example, a motion blur adjusting input v', which is half the amount of movement v, or which is not related to the amount of movement v. Referring to FIG. 72, for example, the motion blur adder 906 calculates the foreground component Fi/v' by dividing the pixel value Fi of the foreground with the motion blur removed by the motion blur adjusting input v', and sums the foreground component Fi/v', and then generates the pixel value with the motion blur adjusted. For example, when the motion blur adjusting input v' is 3, the pixel value C02 is (F01)/v', the pixel value V03 is (F01+F02)/v', the pixel value C04 is (F01+F02+F03)/v', and the pixel value C05 is (F02+F03+F04)/v'.

The motion blur adder 906 supplies the selector 907 with the foreground component image with the motion blur adjusted.

In response to a selection signal input by a user, the selector 907 selects between the foreground component image, with the motion blur removed, supplied from the arithmetic unit 905 and the foreground component image, with the motion blur adjusted, supplied from the motion blur adder 906. The selector 807 outputs the selected foreground component image.

The motion blur adjuster 106 adjusts the amount of motion blur based on the selection signal and the motion blur adjusting input v'.

Figure 80:
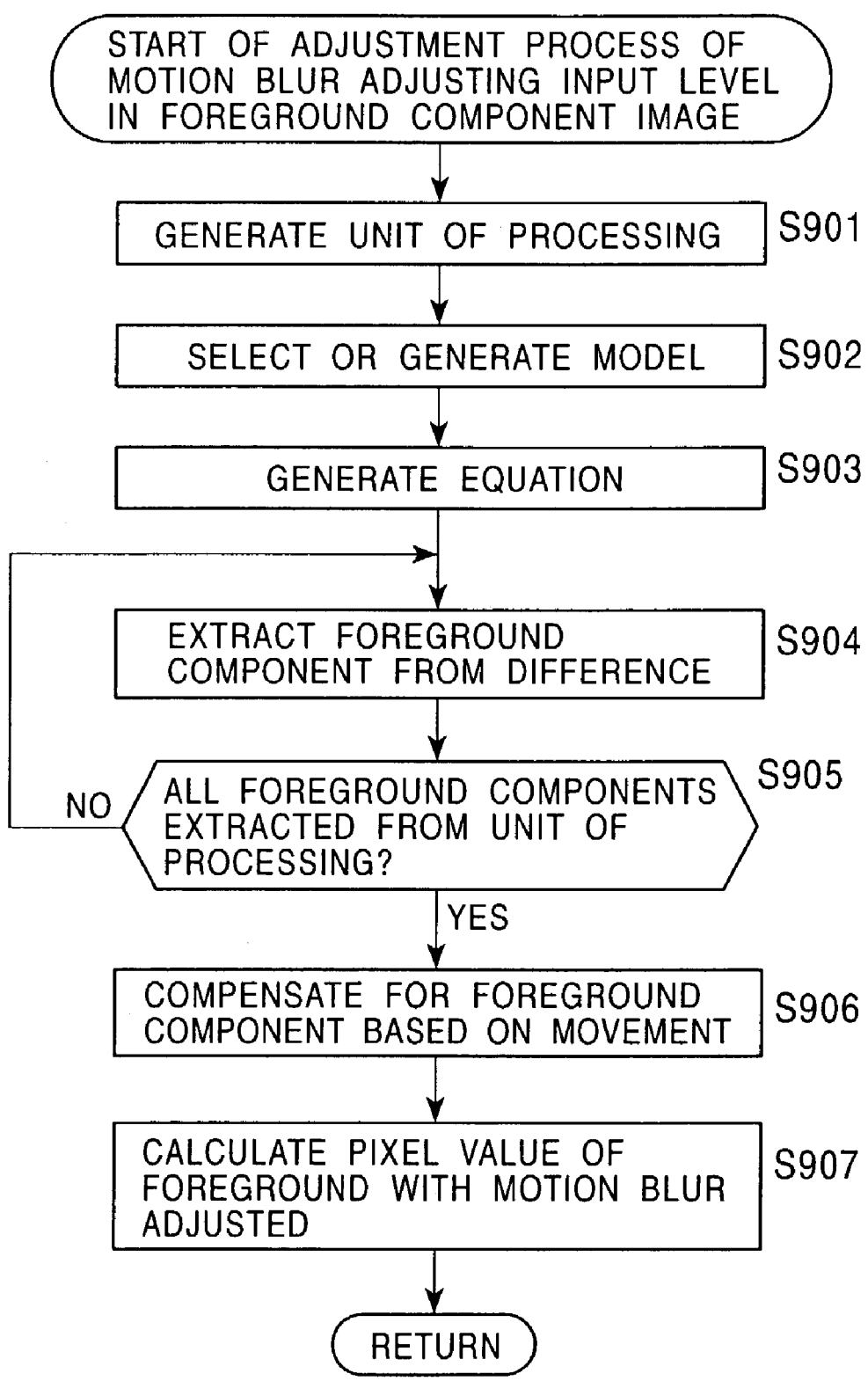
FIG. 80 is a flow diagram illustrating a removal process of the motion blur in the foreground.

The adjustment process of the motion blur adjuster 106 illustrated in FIG. 76 for adjusting the amount of motion blur in the foreground is discussed below with reference to a flow diagram illustrated in FIG. 80.

In step S901, the unit of processing determiner 901 in the motion blur adjuster 106 generates the unit of processing based on the motion vector and the area information, and then feeds the generated unit of processing to the model generator 902 and the corrector 905.

In step S902, the model generator 902 in the motion blur adjuster 106 selects or generates the model in accordance with the amount of movement v and the unit of processing.

In step S903, based on the selected model or the generated model, the equation generator 903 generates equations for calculating the foreground components in response to the differences between the pixel values of the foreground component image.

In step S904, the arithmetic unit 904 sets the pixel values of the foreground component image into the generated equations, and extracts the foreground components from the difference between the pixel values based on the equations with the pixel values set therewithin. In step S905, the arithmetic unit 904 determines whether all foreground components have been extracted for the unit of processing. When it is determined that all foreground components have not been extracted for the unit of processing, the routine loops to step S904. The extraction process of the foreground component then resumes.

When it is determined in step S905 that all foreground components have been extracted for the unit of processing, the routine proceeds to step S906. In response to the amount of movement v, the corrector 905 corrects each of the foreground components F01/v through F08/v supplied from the arithmetic unit 904, thereby calculating the pixel values F01 through F08/v of the foreground with the motion blur removed.

In step S907, the motion blur adder 906 calculates the pixel values of the foreground with the amount of motion blur adjusted, and the selector 907 selects between the image with the motion blur removed and the image with the motion blur adjusted, and then outputs the selected image. The routine then ends.

The motion blur adjuster 106 illustrated in FIG. 76 quickly adjusts the motion blur in the foreground image through simple calculations.

The conventional technique to partly remove motion blur, such as a Wiener filter, is effective in an ideal state, but proves insufficient in the deblurring of an actual image quantized and containing noise. The motion blur adjuster 106 illustrated in FIG. 76 proves sufficient in the deblurring an image quantized and containing noise. Precise deblurring of the image becomes possible.

Figure 81:
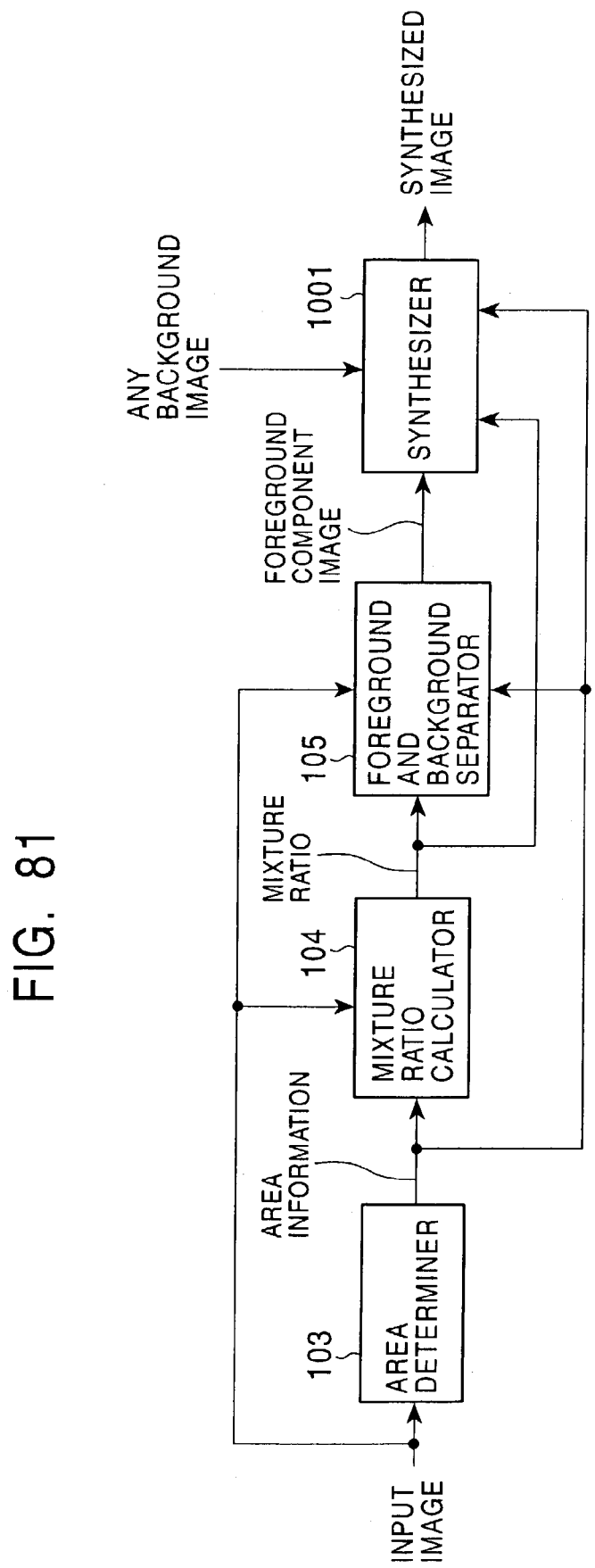
FIG. 81 is a block diagram illustrating a function configuration of a signal processor 12.

FIG. 81 is a block diagram illustrating a function configuration of the signal processor 12.

The elements identical to those described with reference to FIG. 4 are designated with the same reference numerals, and the discussion thereof is omitted here.

The area determiner 103 feeds the area information to the mixture ratio calculator 104 and a synthesizer 1001.

The mixture ratio calculator 104 supplies the foreground and background separator 105 and the synthesizer 1001 with the mixture ratio α.

The foreground and background separator 105 feeds the foreground component image to the synthesizer 1001.

The synthesizer 1001 synthesizes any background image and the foreground component image supplied from the foreground and background separator 105, based on the mixture ratio α supplied from the mixture ratio calculator 104 and the area information supplied from the area determiner 103, and outputs a synthesized image of the background image and the foreground component image.

Figure 82:
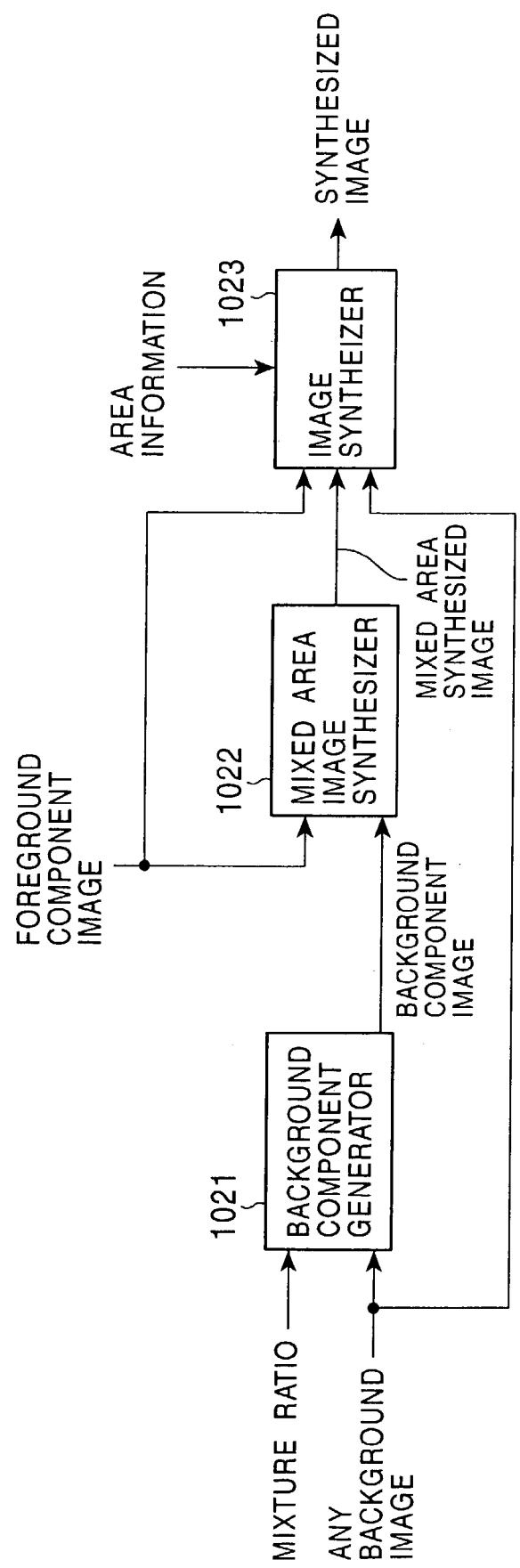
FIG. 82 is a diagram illustrating the construction of a synthesizer 1001.

FIG. 82 is a diagram illustrating the construction of a synthesizer 1001. A background component generator 1021 generates a background component image based on the mixture ratio α and any background image, and feeds the background component image to a mixed area image synthesizer 1022.

The mixed area image synthesizer 1022 generates a mixed area synthesized image by synthesizing the background component image and the foreground component image supplied from the background component generator 1021, and then feeds the generated mixed area synthesized image to an image synthesizer 1023.

The image synthesizer 1023 synthesizes the foreground component image, the mixed area synthesized image provided by the mixed area image synthesizer 1022, and any background image, based on the area information, and then outputs the synthesized image.

In this way, the synthesizer 1001 synthesizes any background image from the foreground component image.

The image which is obtained by synthesizing the foreground component image with any background image based on the mixture ratio α looks more natural than an image that is obtained by merely synthesizing images.

Figure 83:
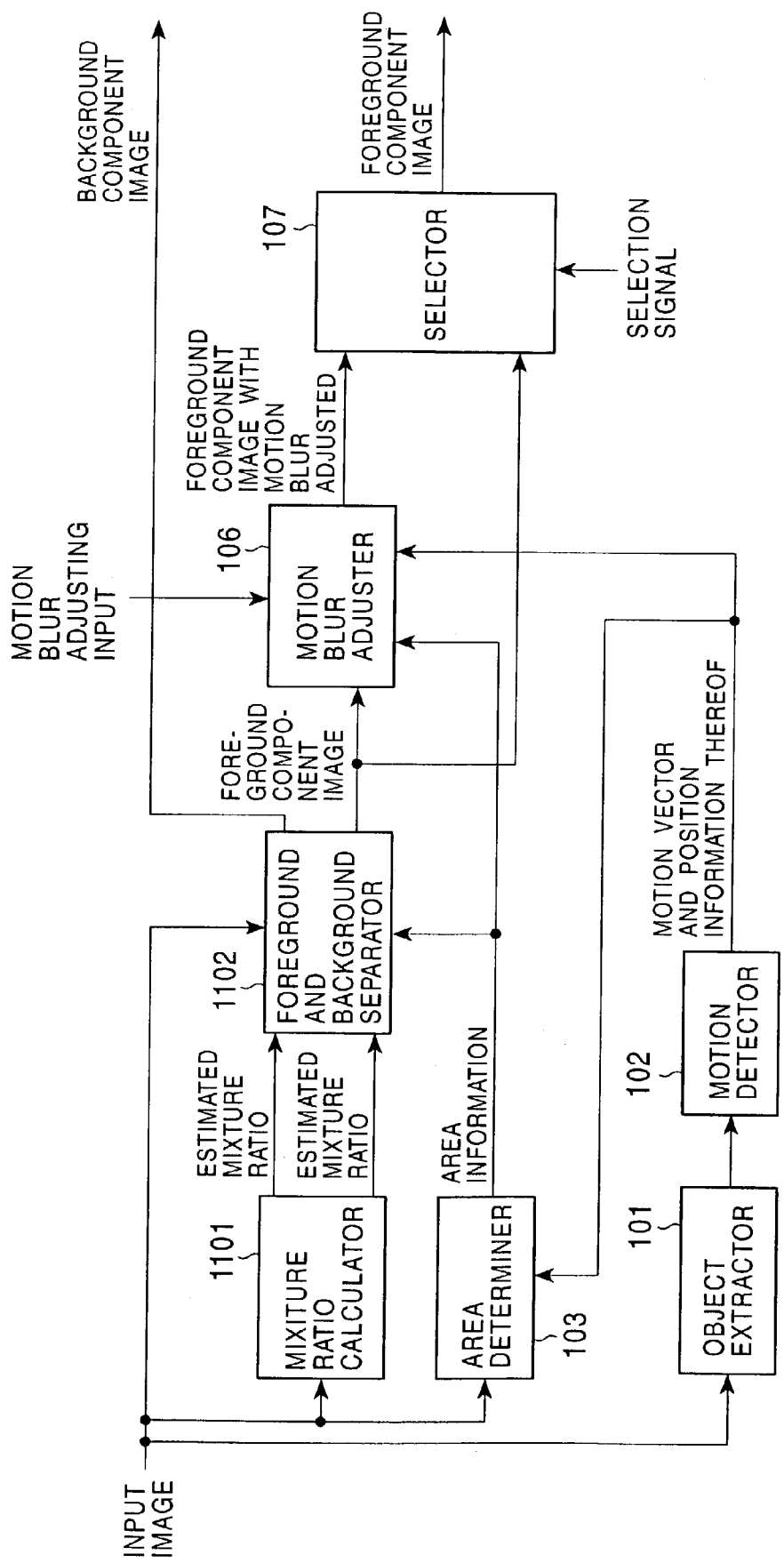
FIG. 83 is a block diagram illustrating another function configuration of the signal processor 12.

FIG. 83 is a block diagram illustrating another function configuration of the signal processor 12 for adjusting the motion blur. The signal processor 12 illustrated in FIG. 4 sequentially calculates the area determination and the mixture ratio α, while the signal processor 12 illustrated in FIG. 83 calculates the area determination and the mixture ratio α in parallel.

Elements identical to those described with reference to the block diagram illustrated in FIG. 4 are designated with the same reference numerals, and the discussion thereof is omitted here.

The input image is fed to each of a mixture ratio calculator 1101, a foreground and background separator 1102, an area determiner 103, and an object extractor 101.

In response to the input image, the mixture ratio calculator 1101 calculates, for each pixel of the input image, an estimated mixture ratio that is based on the assumption that a pixel falls within a covered background area and an estimated mixture ratio that is based on the assumption that a pixel falls within an uncovered background area. The mixture ratio calculator 1101 then supplies the foreground and background separator 1102 with the estimated mixture ratio that is based on the assumption that the pixel falls within the covered background area and the estimated mixture ratio that is based on the assumption that the pixel falls within the uncovered background area.

Figure 84:
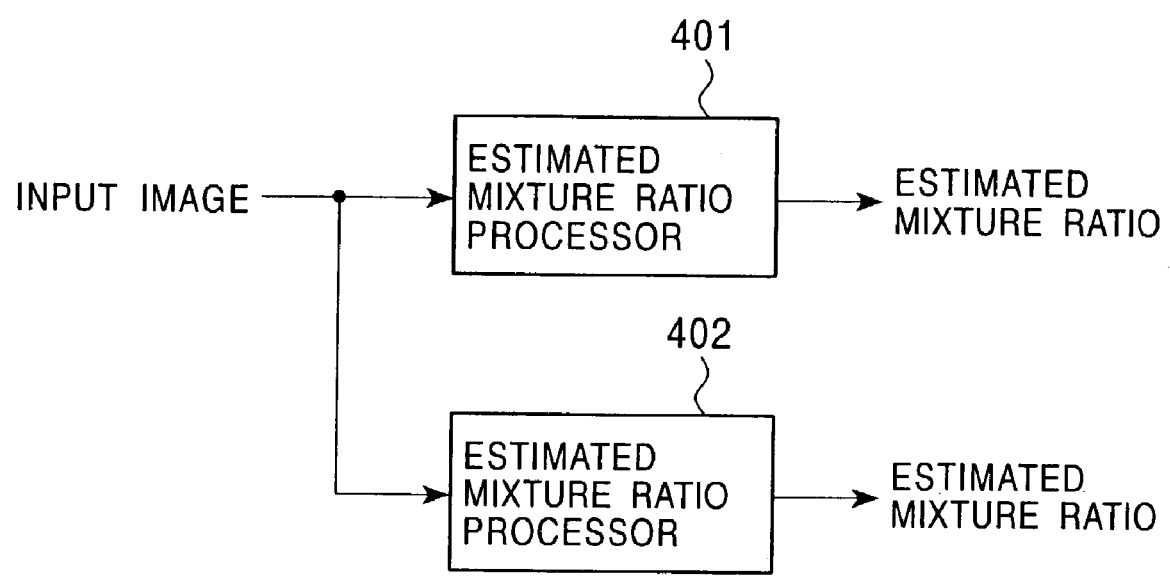
FIG. 84 is a block diagram illustrating the construction of a mixture ratio calculator 1101.

FIG. 84 is a block diagram illustrating the construction of the mixture ratio calculator 1101.

An estimated mixture ratio processor 401 illustrated in FIG. 84 remains unchanged from the estimated mixture ratio processor 401 illustrated in FIG. 49. An estimated mixture ratio processor 402 illustrated in FIG. 84 remains unchanged from the estimated mixture ratio processor 402 illustrated in FIG. 49.

The estimated mixture ratio processor 401 calculates an estimated mixture ratio for each pixel through the calculation of the model of the covered background area, and outputs the calculated mixture ratio.

The estimated mixture ratio processor 402 calculates an estimated mixture ratio for each pixel through the calculation of the model of the uncovered background area, and outputs the calculated mixture ratio.

The foreground and background separator 1102 generates the foreground component image from the input image, based on the estimated mixture ratio that is based on the assumption that the pixel falls within the covered background area, the estimated mixture ratio that is based on the assumption that the pixel falls within the uncovered background area, and the area information supplied from the area determiner 103, and feeds the generated foreground component image to the motion blur adjuster 106 and the selector 107.

Figure 85:
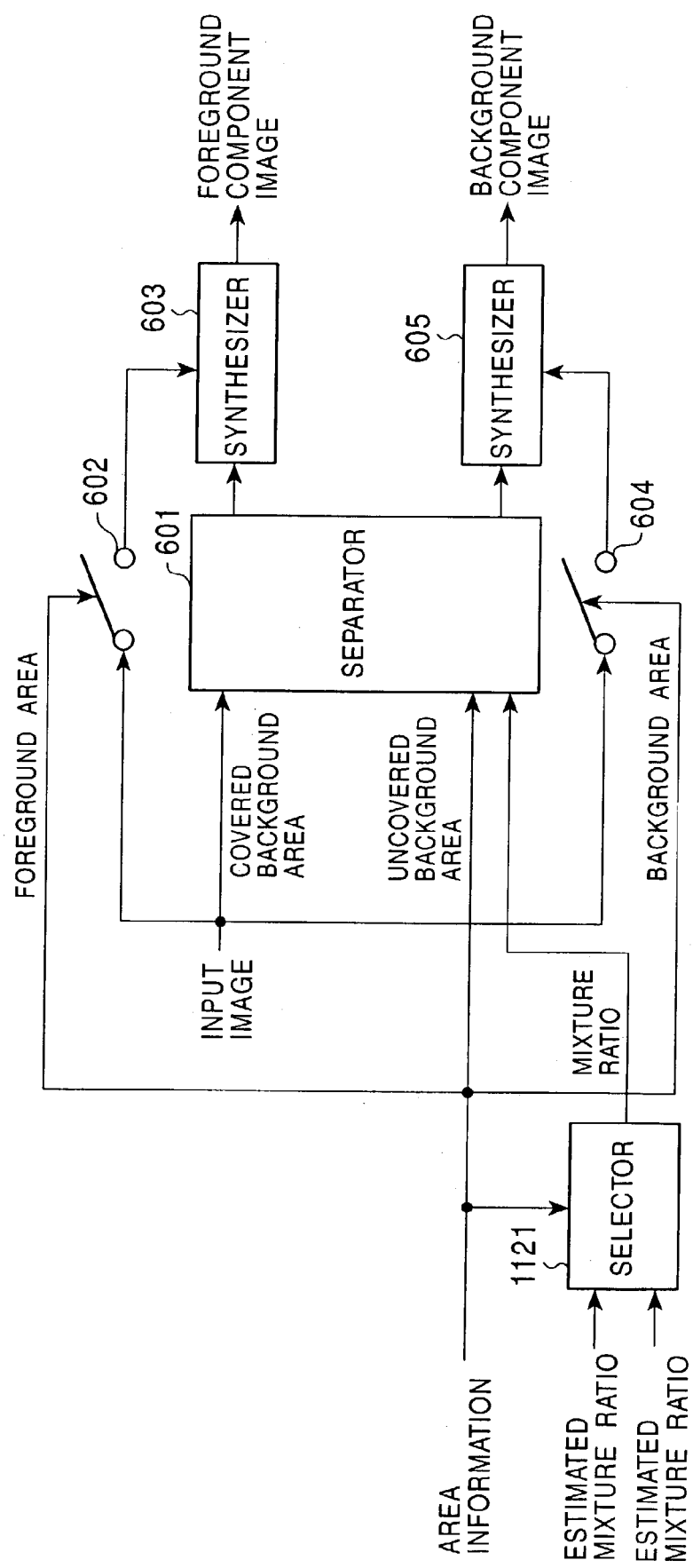
FIG. 85 is a block diagram illustrating a foreground and background separator 1102.

FIG. 85 is a block diagram illustrating the foreground and background separator 1102.

Elements identical to those described in connection with the foreground and background separator 105 illustrated in FIG. 60 are designated with the same reference numerals and the discussion thereof is omitted here.

Based on the area information supplied from the area determiner 103, a selector 1121 selects between the estimated mixture ratio that is based on the assumption that the pixel falls within the covered background area, and the estimated mixture ratio that is based on the assumption that the pixel falls within the uncovered background area, supplied from the mixture ratio calculator 1101. The selector 1121 supplies the separator 601 with the selected estimated mixture ratio as a mixture ratio α.

The separator 601 extracts the foreground component and the background component from the pixel value of the pixel falling within the mixed area based on the mixture ratio α supplied from the selector 1121 and the area information, and supplies the synthesizer 603 with the foreground component and supplies the synthesizer 605 with the background component.

The separator 601 has the same construction as the one illustrated in FIG. 65.

The synthesizer 603 synthesizes and outputs the foreground component image. The synthesizer 605 synthesizes and outputs the background component image.

The motion blur adjuster 106 illustrated in FIG. 83 had the same construction as the one illustrated in FIG. 4. The motion blur adjuster 106 adjusts the amount of motion blur contained in the foreground component image supplied from the foreground and background separator 1102 based on the area information and the motion vector, and then outputs the foreground component image with the motion vector adjusted.

Based on the selection signal in response to the user, the selector 107 in FIG. 83 selects between the foreground component image supplied from the foreground and background separator 1102 and the foreground component image with the motion blur thereof adjusted and supplied from the motion blur adjuster 106, and outputs the selected foreground component image.

The signal processor 12 shown in FIG. 83 adjusts the amount of motion blur contained in the input corresponding to the foreground object contained in the input image, and outputs the image. As in the firs embodiment, the signal processor 12 illustrated in FIG. 83 calculates the mixture ratio α, which is embedded information, and outputs the calculated mixture ratio α.

Figure 86:
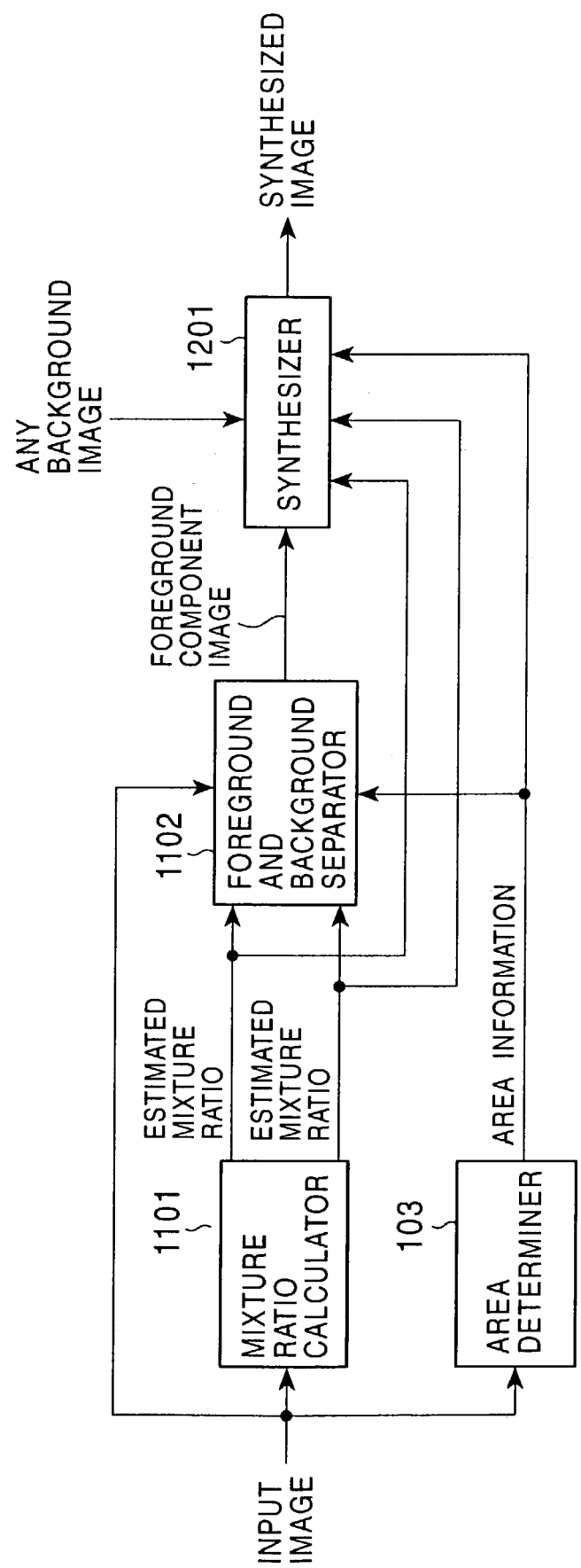
FIG. 86 is a block diagram illustrating yet another function configuration of the signal processor 12.

FIG. 86 is a block diagram illustrating yet another function configuration of the signal processor 12 for synthesizing the foreground component image with any background image. The signal processor 12 illustrated in FIG. 81 serially calculates the area determination and the mixture ratio α, while the signal processor 12 illustrated in FIG. 86 calculates the area determination and the mixture ratio α in parallel.

Functions identical to those described with reference to the block diagram illustrated in FIG. 83 are designated with the same reference numerals, and the discussion thereof is omitted here.

In response to the input image, the mixture ratio calculator 1101 illustrated in FIG. 86 calculates, for each pixel of the input image, an estimated mixture ratio that is based on the assumption that a pixel falls within a covered background area and an estimated mixture ratio that is based on the assumption that a pixel falls within an uncovered background area. The mixture ratio calculator 1101 then supplies the foreground and background separator 1102 and a synthesizer 1201 with the estimated mixture ratio that is based on the assumption that the pixel falls within the covered background area and the estimated mixture ratio that is based on the assumption that the pixel falls within the uncovered background area.

The foreground and background separator 1102, illustrated in FIG. 86, generates the foreground component image from the input image, based on the estimated mixture ratio that is based on the assumption that the pixel falls within the covered background area, the estimated mixture ratio that is based on the assumption that the pixel falls within the uncovered background area, and the area information supplied from the area determiner 103, and feeds the generated foreground component image to the synthesizer 1201.

The synthesizer 1201 synthesizes any background image and the foreground component image supplied from the foreground and background separator 1102, based on the estimated mixture ratio that is based on the assumption that the pixel falls within the covered background area, the estimated mixture ratio that is based on the assumption that the pixel falls within the uncovered background area, the two estimated mixture ratios supplied from the mixture ratio calculator 1101, and the area information supplied from the area determiner 103. The synthesizer 1201 outputs an image synthesized from the background image and the foreground component image.

Figure 87:
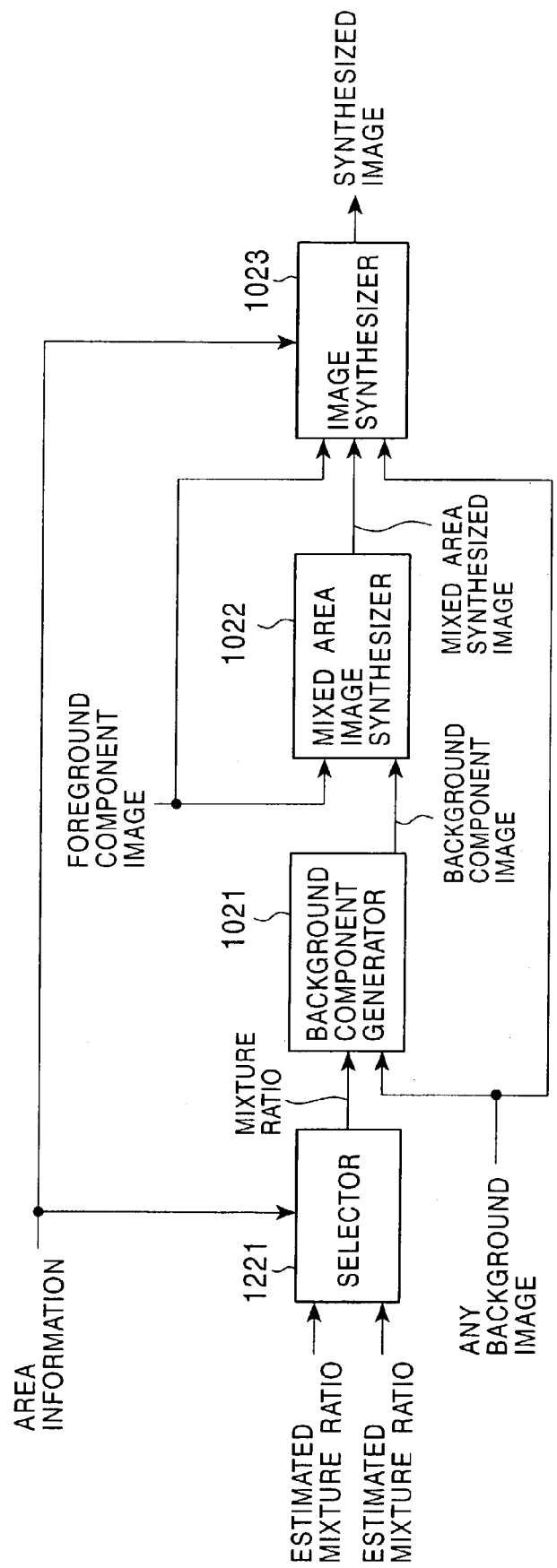
FIG. 87 illustrates the construction of a synthesizer 1201.

FIG. 87 illustrates the construction of the synthesizer 1201. Elements identical to those described with reference to the block diagram illustrated in FIG. 82 are designated with the same reference numerals, and the discussion thereof is omitted here.

Based on the area information supplied from the area determiner 103, a selector 1221 selects between the estimated mixture ratio that is based on the assumption that the pixel falls within the covered background area, and the estimated mixture ratio that is based on the assumption that the pixel falls within the uncovered background area, supplied from the mixture ratio calculator 1101. The selector 1121 supplies the background component generator 1021 with the selected estimated mixture ratio as a mixture ratio α.

The background component generator 1021 illustrated in FIG. 87 generates a background component image based on the mixture ratio α supplied from the selector 1221 and any background image, and then feeds the background component image to the mixed area image synthesizer 1022.

The mixed area image synthesizer 1022 illustrated in FIG. 87 generates a mixed area synthesized image by synthesizing the background component image supplied from the background component generator 1021 and a foreground component image, and then feeds the generated mixed area synthesized image to the image synthesizer 1023.

In response to the area information, the image synthesizer 1023 generates a synthesized image by synthesizing the foreground component image, the mixed area synthesized image supplied from the mixed area image synthesizer 1022, and any background image, and then outputs the synthesized image.

The synthesizer 1201 synthesizes any background image from the foreground component image.

The mixture ratio α is defined as a ratio of the background component in the pixel value. Alternatively, the mixture ratio α may be a ratio of the foreground component in the pixel value.

The movement of the object of the foreground is from left to right, but the direction of the foreground object is not limited to any particular direction.

In the above discussion, an image in actual space formed of three dimensional space and time axis information is projected onto a time space formed of two-dimensional space and time axis information using a video camera. The present invention is not limited to this example. When first information in a first space having more dimensions is projected into second information in a second space having less dimensions, a distortion caused by the projection may be corrected, meaningful information may be extracted, or a more natural image may be synthesized.

The sensor 11 is not limited the CCD. The sensor 11 may be any solid-state image pickup device, such as CMOS (Complementary Metal Oxide Semiconductor), a BBD (Bucket Bridge Device), a CID (Charge Injection Device), or a CPD (Charge Priming Device). The sensor 11 is not limited to a sensor which includes a matrix of detector elements, and may be a sensor in which a line of detector elements is arranged.

The computer readable medium storing a program for performing the signal processing of the present invention includes a package medium which is distributed to supply the user with a software program, separate from a computer, as shown in FIG. 3. The package medium may be a magnetic disk 51 (such as a floppy disk), an optical disk 52 (such as a CD-ROM (Compact-Disk Read-Only Memory), DVD (Digital Versatile Disk)), a magnetooptical disk 53 (such as MD (Mini-Disk)), a semiconductor memory 54. The computer readable medium also includes a ROM 22 or a hard disk contained in the storage unit 28.

The present invention includes a process in which steps describing a program stored in the computer readable medium are sequentially performed in the order described, and a process in which steps are performed in parallel or separately rather than being sequentially performed.

INDUSTRIAL APPLICABILITY

In accordance with a first invention, a mixture ratio indicating the mixed state of a plurality of objects is detected.

In accordance with a second invention, a mixture ratio indicating the mixed state of a plurality of objects is detected.

The invention claimed is:

1. An image processing apparatus for processing image data containing a predetermined number of pieces of pixel data obtained by an image pickup element having a predetermined number of pixels, each pixel having a time integration effect, the image processing apparatus comprising:
background pixel extractor means for extracting pixel data of a frame prior to or subsequent to a target frame, corresponding to a target pixel of the target frame in the image data, as the background pixel data of an object, which serves as a background, from among a plurality of objects of the image data;
target frame pixel extractor means for extracting pixel data of the target pixel in the target frame and pixel data of a pixel in the vicinity of the target pixel in the target frame;
relational equation generator means for generating a plurality of relational equations representing, in connection with the target pixel, the relationship between the data of the target pixel and the pixel in the vicinity of the target pixel and the background pixel data corresponding to the data of the target pixel and the pixel in the vicinity of the target pixel; and mixture ratio detector means for detecting a mixture ratio indicating a mixed state of the plurality of objects in the real world in connection with the target pixel by solving the plurality of relational equations through a least squares method.

2. An image processing apparatus according to claim 1, wherein the relational equation generator means generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

3. An image processing apparatus according to claim 1, wherein the relational equation generator means generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

4. An image processing apparatus according to claim 1, wherein the background pixel extractor means extracts, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extractor means extracts, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

5. An image processing apparatus according to claim 1, further comprising:

area information generator means for generating area information identifying, in the image data, a foreground area, a background area, and a mixed area containing a covered background area and an uncovered background area, wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

6. An image processing method for processing image data containing a predetermined number of pieces of pixel data obtained by an image pickup element having a predetermined number of pixels, each pixel having a time integration effect, the image processing method comprising:

a background pixel extracting step for extracting pixel data of a frame prior to or subsequent to a target frame, corresponding to a target pixel of the target frame in the image data, as background pixel data of an object, which serves as a background, from among a plurality of objects of the image data;

a target frame pixel extracting step for extracting pixel data of the target pixel in the target frame and pixel data of a pixel in the vicinity of the target pixel in the target frame;

a relational equation generating step for generating a plurality of relational equations representing, in connection with the target pixel, the relationship between the data of the target pixel and the pixel in the vicinity of the target pixel and the background pixel data corresponding to the data of the target pixel and the pixel in the vicinity of the target pixel; and a mixture ratio detecting step for detecting a mixture ratio indicating a mixed state of the plurality of objects in the real world in connection with the target pixel by solving the plurality of relational equations through a least squares method.

7. An image processing method according to claim 6, wherein the relational equation generating step generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

8. An image processing method according to claim 6, wherein the relational equation generating step generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

9. An image processing method according to claim 6, wherein the background pixel extracting step extracts, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extracting step extracts, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

10. An image processing method according to claim 9, further comprising:

an area information generating step for generating area information identifying, in the image data, a foreground area, a background area, and a mixed area containing a covered background area and an uncovered background area, wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

11. A computer readable medium for storing software program for processing image data containing a predetermined number of pieces of pixel data obtained by an image pickup element having a predetermined number of pixels, each pixel having a time integration effect, the image processing program comprising:
- a background pixel extracting step for extracting pixel data of a frame prior to or subsequent to a target frame, corresponding to a target pixel of the target frame in the image data, as background pixel data of an object, which serves as a background, from among a plurality of objects of the image data;
- a target frame pixel extracting step for extracting pixel data of the target pixel in the target frame and pixel data of a pixel in the vicinity of the target pixel in the target frame;
- a relational equation generating step for generating a plurality of relational equations representing, in connection with the target pixel, the relationship between data of the target pixel and the pixel in the vicinity of the target pixel and the background pixel data corresponding to the data of the target pixel and the pixel in the vicinity of the target pixel; and
- a mixture ratio detecting step for detecting a mixture ratio indicating a mixed state of the plurality of objects in the real world in connection with the target pixel by solving the plurality of relational equations through a least squares method.

12. The computer readable medium according to claim 11, wherein the relational equation generating step generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

13. The computer readable medium according to claim 11, wherein the relational equation generating step generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

14. The computer readable medium according to claim 13, wherein the background pixel extracting step extracts, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extracting step extracts, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

15. The computer readable medium according to claim 14, further comprising:
- area information generating step for generating area information identifying, in the image data, a foreground area, a background area, and a mixed area containing a covered background area and an uncovered background area,
- wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

16. An image pickup device, comprising:
- image pickup means for outputting, as image data containing a plurality of pieces of pixel data, an image of an object picked up by an image pickup element having a predetermined number of pixels, each pixel having a time integration effect;
- background pixel extractor means for extracting pixel data of a frame prior to or subsequent to a target frame, corresponding to a target pixel of the target frame in the image data, as background pixel data of an object, which serves as a background, from among a plurality of objects of the image data;
- target frame pixel extractor means for extracting pixel data of the target pixel in the target frame and pixel data of a pixel in the vicinity of the target pixel in the target frame;
- relational equation generator means for generating a plurality of relational equations representing, in connection with the target pixel, the relationship between data of the target pixel and the pixel in the vicinity of the target pixel and the background pixel data corresponding to the data of the target pixel and the pixel in the vicinity of the target pixel; and
- mixture ratio detector means for detecting a mixture ratio indicating a mixed state of the plurality of objects in the real world in connection with the target pixel by solving the plurality of relational equations through a least squares method.

17. An image pickup device according to claim 16, wherein the relational equation generator means generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

18. An image pickup device according to claim 16, wherein the relational equation generator means generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

19. An image pickup device according to claim 16, wherein the background pixel extractor means extracts, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extractor means extracts, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

20. An image pickup device according to claim 16, further comprising:
   area information generator means for generating area information identifying, in the image data, a foreground area, a background area, and a mixed area containing a covered background area and an uncovered background area,
   wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

21. An image processing apparatus for processing image data containing a predetermined number of pieces of pixel data obtained by an image pickup element having a predetermined number of pixels, each pixel having a time integration effect, the image processing apparatus comprising:
   background pixel extractor unit configured to extract pixel data of a frame prior to or subsequent to a target frame, corresponding to a target pixel of the target frame in the image data, as the background pixel data of an object, which serves as a background, from among a plurality of objects of the image data;
   target frame pixel extractor unit configured to extract pixel data of the target pixel in the target frame and pixel data of a pixel in the vicinity of the target pixel in the target frame;
   relational equation generator unit configured to generate a plurality of relational equations representing, in connection with the target pixel, the relationship between the data of the target pixel and the pixel in the vicinity of the target pixel and the background pixel data corresponding to the data of the target pixel and the pixel in the vicinity of the target pixel; and
   mixture ratio detector unit configured to detect a mixture ratio indicating a mixed state of the plurality of objects in the real world in connection with the target pixel by solving the plurality of relational equations through a least squares method.

22. An image processing apparatus according to claim 21, wherein the relational equation generator unit generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

23. An image processing apparatus according to claim 21, wherein the relational equation generator unit generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

24. An image processing apparatus according to claim 21, wherein the background pixel extractor unit extracts, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extractor unit extracts, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

25. An image processing apparatus according to claim 21, further comprising:
   area information generator unit configured to generate area information identifying, in the image data, a foreground area, a background area, and a mixed area containing a covered background area and an uncovered background area,
   wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

26. An image pickup device, comprising:
   image pickup unit configured to output as image data containing a plurality of pieces of pixel data, an image of an object picked up by an image pickup element having a predetermined number of pixels, each pixel having a time integration effect;
   background pixel extractor unit configured to extract pixel data of a frame prior to or subsequent to a target frame, corresponding to a target pixel of the target frame in the image data, as background pixel data of an object, which serves as a background, from among a plurality of objects of the image data;
   target frame pixel extractor unit configured to extract pixel data of the target pixel in the target frame and pixel data of a pixel in the vicinity of the target pixel in the target frame;
   relational equation generator unit configured to generate a plurality of relational equations representing, in connection with the target pixel, the relationship between data of the target pixel and the pixel in the vicinity of the target pixel and the background pixel data corresponding to the data of the target pixel and the pixel in the vicinity of the target pixel; and
   mixture ratio detector unit configured to detect a mixture ratio indicating a mixed state of the plurality of objects in the real world in connection with the target pixel by solving the plurality of relational equations through a least squares method.

27. An image pickup device according to claim 26, wherein the relational equation generator unit generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is linear with respect to the position of pixels within a mixed area where the plurality of objects is mixed.

28. An image pickup device according to claim 26, wherein the relational equation generator unit generates the plurality of equations based on a first approximation which regards, as identical, components of an object which serves as a foreground, from among the plurality of objects of the image data contained in the pixel data of the target pixel and the pixel in the vicinity of the target pixel, and based on a second approximation which assumes that a variation in the mixture ratio is planar with respect to the position of pixels within a mixed area where the plurality of objects is mixed.

29. An image pickup device according to claim 26, wherein the background pixel extractor unit extracts, as the background pixel data, the pixel data in the frame prior to the target frame when the target pixel, in the mixed area where the plurality of objects is mixed, belongs to a covered background area formed at the forward end side of a foreground object in the direction of motion thereof, while the background pixel extractor unit extracts, as the background pixel data, the pixel data in the frame subsequent to the target frame when the target pixel, in the mixed area where the plurality of objects is mixed, belongs to an uncovered background area formed at the backward end side of the foreground object in the direction of motion thereof.

30. An image pickup device according to claim 26, further comprising:
   area information generator unit configured to generate area information identifying, in the image data, a foreground area, a background area, and a mixed area containing a covered background area and an uncovered background area,
   wherein the foreground area is formed of an object, which serves as a foreground, from among the plurality of objects in the image data, the background area is formed of an object, which serves as a background, from among the plurality of objects in the image data, and the mixed area is formed of the covered background area and the uncovered background area.

* * * * *